US00RE49597E

(19) United States
(12) Reissued Patent
Ophardt et al.

(10) Patent Number: US RE49,597 E
(45) Date of Reissued Patent: Aug. 8, 2023

(54) VALVULAR CONDUIT

(71) Applicant: OP-Hygiene IP GmbH, Niederbipp (CH)

(72) Inventors: Heiner Ophardt, Arisdorf (CH); Andrew Jones, St. Anns (CA); Zhenchun Shi, Hamilton (CA)

(73) Assignee: OP-Hygiene IP GmbH, Niederbipp (CH)

(21) Appl. No.: 17/331,983

(22) Filed: May 27, 2021

Related U.S. Patent Documents

Reissue of:
(64) Patent No.: 10,299,636
Issued: May 28, 2019
Appl. No.: 15/458,597
Filed: Mar. 14, 2017

(30) Foreign Application Priority Data

Mar. 15, 2016 (CA) ..... CA 2923831

(51) Int. Cl.

| | |
|---|---|
| ***A47K 5/14*** | (2006.01) |
| ***B01F 23/235*** | (2022.01) |
| ***B01F 25/432*** | (2022.01) |
| ***B05B 7/04*** | (2006.01) |
| ***B01F 25/434*** | (2022.01) |
| *B01F 101/00* | (2022.01) |

(52) U.S. Cl.
CPC ..... *A47K 5/14* (2013.01); *B01F 23/235* (2022.01); *B01F 25/4342* (2022.01); *B01F 25/43231* (2022.01); *B05B 7/0491* (2013.01); *B01F 2101/4505* (2022.01)

(58) Field of Classification Search
CPC ... A47K 5/14; B01F 23/235; B01F 25/43231; B01F 25/4342; B01F 2101/4505; B05B 7/0491
USPC ..... 222/135, 190, 209, 321.2, 321.9
See application file for complete search history.

(56) References Cited

U.S. PATENT DOCUMENTS

| | | | | |
|---|---|---|---|---|
| 1,329,559 A | | 2/1920 | Tesla | |
| 2,231,477 A | * | 2/1941 | Palmer | A47K 5/14 222/190 |
| 3,532,316 A | * | 10/1970 | Mathes | B01F 5/0646 156/242 |
| 4,316,673 A | * | 2/1982 | Speer | B01F 5/0609 366/337 |
| 5,265,636 A | * | 11/1993 | Reed | F15C 1/146 137/14 |
| 5,271,530 A | | 12/1993 | Uehira et al. | |

(Continued)

FOREIGN PATENT DOCUMENTS

| | | |
|---|---|---|
| CA | 2875105 | 6/2015 |
| WO | 2014029035 | 2/2014 |
| WO | 2015089641 | 6/2015 |

*Primary Examiner* — Russell D Stormer
(74) *Attorney, Agent, or Firm* — Thorpe North & Western, LLP; Peter M. de Jonge; Kurt Hendricks

(57) ABSTRACT

A valvular conduit, preferably a Tesla valvular conduit, in which a plug member is coaxially received within a bore in a sleeve member and in which passageways are defined between the plug member and the sleeve member within interior walls configured to permit mixing of fluid flowing through the passageways in at least one direction, preferably, the relatively free passage of fluid through the passageways upstream but increased the resistance to downstream flow of the fluid through each passageway.

20 Claims, 31 Drawing Sheets

AMENDED

(56) References Cited

U.S. PATENT DOCUMENTS

| | | | | |
|---|---|---|---|---|
| 5,975,360 | A | 11/1999 | Ophardt | |
| 6,398,079 | B1 * | 6/2002 | Garcia | B05B 7/0031 222/190 |
| 6,478,197 | B2 * | 11/2002 | Bethune | B05B 11/3042 222/321.7 |
| 6,601,736 | B2 | 8/2003 | Ophardt et al. | |
| 7,337,930 | B2 | 3/2008 | Ophardt | |
| 8,079,497 | B2 * | 12/2011 | Brouwer | B05B 11/3087 222/321.9 |
| 8,291,976 | B2 * | 10/2012 | Schultz | E21B 43/12 137/811 |
| 8,297,475 | B2 * | 10/2012 | Limbert | B04B 11/3087 222/153.07 |
| 8,439,233 | B2 * | 5/2013 | Wang | B05B 11/3023 222/321.2 |
| 8,561,919 | B2 * | 10/2013 | Wang | B05B 7/0037 222/145.5 |
| 8,602,264 | B2 * | 12/2013 | Lee | B05B 11/3087 222/137 |
| 9,038,652 | B1 * | 5/2015 | Henry | F16K 15/20 137/223 |
| 9,403,290 | B2 * | 8/2016 | Frailey | B01F 5/0608 |
| 9,695,654 | B2 * | 7/2017 | Stephenson | E21B 21/01 |
| 2007/0119864 | A1 * | 5/2007 | Tsai | B05B 11/3025 222/137 |

* cited by examiner

AMENDED FIG. 14

VALVULAR CONDUIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

SCOPE OF THE INVENTION

This invention relates to a valvular conduit for serving as a mixing device and/or for control of the resistance to flow through the conduit and, more particularly, to a valvular conduit including a Tesla valvular conduit for mixing of fluid streams preferably gas and liquid streams as in the manner of a foam generator, preferably in a dispenser of hand cleaning and disinfecting fluids.

BACKGROUND OF THE INVENTION

Many foam generators are known particularly as in the context of hand cleaner dispensers generating a hand cleaning foam comprising a mixture of air and a foamable hand cleaning fluid. Typical foam generators include one or more screens providing small apertures for passage of the air and fluid therethrough to create turbulence and generate foam. Porous sponges are also used as foam generators. Combinations of screens and porous sponges are known for use as foam generators as, for example, in U.S. Pat. No. 6,601,736 to Ophardt et al, issued Aug. 5, 2003, the disclosure of which is incorporated herein by reference and U.S. Pat. No. 7,337,930 to Ophardt, issued Mar. 4, 2008, the disclosure of which is incorporated herein by reference.

The inventors of the present invention have appreciated that previously known pumps incorporating such foam generators suffer the disadvantages that they are formed from a number of parts, leading to increased cost for manufacture and assembly.

The present inventors have also appreciated that foam generators which utilize such screens and sponges for foam generation typically require supporting structure such as housings which increase the complexity of manufacture and increase the number of parts required to form a foam generator.

U.S. Pat. No. 1,329,559 to Tesla, the disclosure of which is incorporated herein by reference, teaches what is known and is referred to herein as a Tesla valvular conduit which provides for relatively low resistance flow in one direction through the conduit yet high resistance flow in an opposite direction. The present inventors have appreciated that valvular conduits similar to the Tesla valvular conduit have not been configured which are advantageous for ease of construction and manufacture.

Pumps are known for the simultaneous discharge of a liquid from a reservoir bottle and air from the atmosphere. One example of such a pump is U.S. Pat. No. 5,271,530 to Uehira et al, issued Dec. 21, 1993. The inventors of the present invention have appreciated that such previously known pumps suffer the disadvantages that they are formed from a large number of parts, and are complex in their manufacture of the different parts leading to increased costs for manufacture and assembly.

The present inventors have appreciated that pumps are known which use diaphragm members, however, it is appreciated that disadvantages arise in respect of the construction of known diaphragm members so as to facilitate their manufacture and advantageous sealing engagement with other elements of the pumps.

SUMMARY OF THE INVENTION

To at least partially overcome some of these disadvantages of the previously known devices, the present invention provides an improved construction for a valvular conduit, preferably a Tesla valvular conduit. To at least partially overcome some of these disadvantages of the previously known devices, the present invention provides a valvular conduit, preferably a Tesla valvular conduit, as a foam generator. To at least partially overcome some of these disadvantages of the previously known devices, the present invention provides a pump assembly and a dispenser including a valvular conduit for mixing and preferably generation of foam. To at least partially overcome some of these disadvantages of the previously known devices, the present invention provides the use of a valvular conduit, preferably a Tesla valvular conduit, for mixing and a method of using a valvular conduit to mix two or more fluid streams and, preferably, as a foam generator.

In a first aspect, the present invention uses a valvular conduit, preferably Tesla valvular conduit, as a foam generator, and provides a method of using a valvular conduit, preferably a Tesla valvular conduit, as a foam generator, preferably in a foaming pump assembly. In another aspect, the present invention provides an improved construction for a valvular conduit, preferably a Tesla valvular conduit, in which a plug member is coaxially received within a bore in a sleeve member and in which passageways are defined between the plug member and the sleeve member within interior walls configured to permit mixing of fluid flowing through the passageways in at least one direction, preferably, with the relatively free passage of fluid through the passageways upstream but increased the resistance to downstream flow of the fluid through each passageway. In another aspect, the present invention provides an improved construction for a valvular conduit, preferably a Tesla valvular conduit, in which a plug member is coaxially received within a bore in a sleeve member and the sleeve member is coaxially received within a bore in a tube member, and in which passageways are defined both between the plug member and the sleeve member and between the sleeve member and the tube within interior walls configured to permit mixing of fluid flowing downstream through the passageways and, preferably, relatively free passage of fluid through the passageways upstream but increased the resistance to flow of the fluid through each passageway downstream. In another aspect, the present invention provides a foaming piston pump assembly formed from a minimum of unitary elements, each preferably formed by injection molding, by the use of a valvular conduit as a foam generator.

In one preferred embodiment, the invention provides a valvular conduit comprising a plug member coaxially received within a sleeve bore in a sleeve member with a plug channelway in an outer wall surface of the plug member open radially outwardly in opposition with a sleeve inner wall surface of the sleeve bore to define between each plug channelway and the sleeve inner wall surface a plug passageway for flow of fluid and in which the plug passageway has plug passage interior walls configured to mix gas and/or fluids on passage downstream therethrough. Preferably, the plug passageway interior walls are configured to provide a plurality of mixing portions in series within the plug passageway, with each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel where the second channel merges with the first channel directing flow through the second channel in a second direction different than the first direction. The mixing portions preferably permit relatively free passage of fluid through the plug passageway upstream but increase the resistance to flow of the fluid through the plug passageway downstream. Preferably, fluids such as two liquids or air and a liquid are passed downstream through the conduit for mixing and, in the case of simultaneous passage of air and a foamable liquid through the conduit, foam is generated. Preferably, the conduit may be used to restrict or substantially prevent flow downstream yet permit relatively free flow upstream. Preferably, the valvular conduit is a Tesla valvular conduit. Preferably, each of the sleeve member and the plug member is injection molded as a unitary element. Preferably, at least one and preferably both of the sleeve member and the plug member carry a radially extending end wall with an array of openings axially through the end wall through which fluids such as air and liquids can be passed for mixing and, in the case of mixtures of air and foamable liquids, foam can be generated. Preferably, when each of the plug member and the tube member carry end walls with an array of openings through each, the openings at one end wall are in overlapping registry with the openings at the other end wall and provide an array of reduced cross-sectional area apertures for fluid flow and advantageous generation of foam.

In one aspect, the present invention provides a mixing pump assembly discharging a first fluid mixed with a second fluid, the pump assembly having:

a first pump to discharge the first fluid, a second pump to discharge the second fluid, a first element and a second element defining a passageway therebetween, the first element having a bore therethrough along an axis defined within a circumferential radially inwardly directed inner wall surface, the second element having a circumferential radially outwardly directed outer wall surface with a channelway in the outer wall surface open radially outwardly to the outer wall surface, the second element is received coaxially within the bore with the outer wall surface in opposed engagement with the inner wall surface defining between each channelway and the inner wall surface, the passageway with an entrance into the passageway and an exit from the passageway spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction, wherein the second fluid discharged by the second pump and first fluid discharged by the first pump are simultaneously forced through the entrance into the passageway, through the passageway, and out the exit, each passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction to mix the flow through the first channel and the flow through the second channel on the first channel merging with the second channel, the second direction and the first direction form a merge angle therebetween of greater than 90 degrees.

Preferably, in the second aspect, the pump assembly comprising a piston chamber-forming body about the longitudinal axis and a piston member, the piston member coupled to the piston chamber-forming body with the piston member reciprocally coaxially slidable about the axis relative the piston chamber-forming body in a cycle of operation between a retracted position and an extended position to define there between both: (a) a the first pump having a compartment with a variable volume to draw the first fluid from a first fluid reservoir and discharge the first fluid; and (b) the second pump with a fluid compartment having a variable volume to draw in the second fluid and discharge the second fluid, with the piston member comprising the first element and the second element. Preferably, the exit is open to a discharge outlet downstream from the exit, the first fluid and the second fluid forced from the exit flow from the exit downstream out the discharge outlet. Preferably, the second fluid is atmospheric air. Preferably, the first fluid is a hand cleaning fluid capable of foaming, the second fluid is atmospheric air; the exit is open to a discharge outlet downstream from the exit, the first fluid and the second fluid are forced from the exit to flow from the exit downstream out the discharge outlet, the passageway comprising a foam generator wherein in passage of the air and the first fluid downstream through the plurality of mixing portions, the air and the first fluid are mixed to form a foam of the air and the first fluid discharged from the exit and out the discharge outlet downstream from the exit. Preferably, the second pump draws in the atmospheric air via the discharge outlet upstream through the passageways. Preferably, a merge angle between the second direction and the first direction is greater than 90 degrees so that flow downstream provides a downstream resistance to flow and flow upstream opposite to flow provides an upstream resistance to flow that is less than the downstream resistance to flow.

In a third aspect, the present invention provides a foaming pump discharging a hand cleaning fluid mixed with air as a foam from a discharge outlet having:

a piston liquid chamber-forming body about a longitudinal axis, a piston member, the piston member coupled to the piston liquid chamber-forming body with the piston member reciprocally coaxially slidable about the axis relative the piston liquid chamber-forming body in a cycle of operation between a retracted position and an extended position to define therebetween both:

(a) a liquid pump to draw a fluid from a fluid reservoir and discharge the fluid, and (b) an air pump to draw in atmospheric air and discharge the air;

the piston member comprising a first piston element and a second piston element defining a foam generator therebetween, the first piston element having a bore therethrough along an axis defined within a circumferential radially inwardly directed inner wall surface, the second piston element having a circumferential radially outwardly directed outer wall surface with at least one channelway in the outer wall surface open radially outwardly to the outer wall surface, the second piston element received coaxially within in the central passageway with the outer wall surface in opposed engagement with the inner wall surface defining between each channelway and the inner wall surface a passageway with an entrance and an exit spaced downstream along the passageway from the entrance, wherein with reciprocal movement of the piston member axially relative the piston liquid chamber-forming body air discharged by the air pump and fluid discharged by the liquid pump are simultaneously forced through the entrance into the passageway, through the passageway, and out the exit to a discharge outlet, each plug passageway defined between each plug channelway and the inner wall surface to have passageway interior walls configured to provide the foam generator as a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction.

In a fourth aspect, the present invention provides a mixing conduit for mixing a first fluid and a second fluid simultaneously forced in a downstream direction through a passageway in the conduit, the conduit comprising a first element and a second element defining the passageway therebetween, the first element having a bore therethrough along an axis defined within a circumferential radially inwardly directed inner wall surface, the second element having a circumferential radially outwardly directed outer wall surface with a channelway in the outer wall surface open radially outwardly to the outer wall surface, the second element received coaxially within in the bore with the outer wall surface in opposed engagement with the inner wall surface defining between each channelway and the inner wall surface the passageway with an entrance into the passageway and an exit from the passageway spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction. The fourth aspect preferably includes:

a first feed channel for directing the first fluid to the entrance and a second feed channel for directing the second fluid to the entrance.

In a fifth aspect, the present invention provides a method of mixing a first fluid and a second fluid comprising:

simultaneously forcing the first fluid and the second fluid in a downstream direction through a passageway in the conduit, the conduit comprising a first element and a second element defining the passageway therebetween, the first element having a bore therethrough along an axis defined within a circumferential radially inwardly directed inner wall surface, the second element having a circumferential radially outwardly directed outer wall surface with at least one channelway in the outer wall surface open radially outwardly to the outer wall surface, the second element received coaxially within in the bore with the outer wall surface in opposed engagement with the inner wall surface defining between each channelway and the inner wall surface the passageway with an entrance and an exit spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction.

In a sixth aspect, the present invention provides use of a valvular conduit to mix a first fluid and a second fluid by simultaneously forcing the first fluid and the second fluid in a downstream direction through a passageway in the conduit, the conduit comprising a first element and a second element defining the passageway therebetween, the first element having a bore therethrough along an axis defined within a circumferential radially inwardly directed inner wall surface, the second element having a circumferential radially outwardly directed outer wall surface with at least one channelway in the outer wall surface open radially outwardly to the outer wall surface, the second element received coaxially within the bore with the outer wall surface in opposed engagement with the inner wall surface defining between each channelway and the inner wall surface the passageway with an entrance and an exit spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction.

In a seventh aspect, the present invention provides a valvular conduit comprising:

a first element and a second element defining the passageway therebetween, the first element having a bore therethrough along an axis defined within a circumferential radially inwardly directed inner wall surface, the second element having a circumferential radially outwardly directed outer wall surface with a channelway in the outer wall surface open radially outwardly to the outer wall surface, the second element received coaxially within the bore with the outer wall surface in opposed engagement with the inner wall surface defining between each channelway and the inner wall surface the passageway with an entrance into the passageway and an exit from the passageway spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction, a first feed channel for directing the first fluid to the entrance and a second feed channel for directing the second fluid to the entrance, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction.

In an eighth aspect, the present invention provides a valvular conduit comprising:

an elongate sleeve member and an elongate center plug member, the sleeve member extending from a first sleeve end to a second sleeve end about a longitudinal axis the plug member extending from a first plug end to a second plug end about the longitudinal axis, the sleeve member having a sleeve side wall with a circumferential inwardly directed sleeve inner wall surface, preferably circular in cross-section normal the axis, defining a sleeve bore within the sleeve member extending along the axis, the plug member having a cylindrical circumferential outwardly directed plug outer wall surface, preferably circular in cross-section normal the axis, at least one plug channelway in the plug outer wall surface of the plug member open radially outwardly along its length to the plug outer wall surface of the plug member, the plug member received coaxially within in the sleeve bore with the plug outer wall surface of the plug member in opposed engagement with the sleeve inner wall surface of the sleeve member defining between each plug channelway and the sleeve inner wall surface of the sleeve member a plug passageway for flow of fluid, each plug passageway defined between each plug channelway and the sleeve inner wall surface of the sleeve member to have plug passageway interior walls, the plug passageway interior walls configured to provide a plurality of mixing portions in series within the plug passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel where the second channel merges with the first channel directing flow through the second channel in a second direction different than the first direction. Preferably, the second direction is different from the first direction to mix the flow through the first channel and the flow through the second channel on the first channel merging with the second channel, as with the second direction and the first direction forming a merge angle therebetween of at least 90 degrees so that flow downstream provides a downstream resistance to flow and flow upstream opposite to flow downstream provides an upstream resistance to flow that is less than the downstream resistance to flow. Preferably, the plug passageway the interior walls are configured to permit the relatively free passage of fluid upstream but to subject the fluid to rapid reversals of direction when the fluid is forced through the plug passageway downstream to thereby increase resistance to movement of the fluid through the plug passageway downstream compared to resistance to movement of the fluid upstream, as with the valvular conduit preferably comprising a Tesla valvular conduit.

Preferably such a valvular conduit includes:

an elongate tube member, the tube member extending from a tube first end to a tube second end about the longitudinal axis, the tube member having a tube side wall with a circumferential inwardly directed tube inner wall surface, preferably circular in cross-section normal the axis, defining a tube bore within the tube member extending along the axis, the sleeve member having a cylindrical circumferential outwardly directed sleeve outer wall surface preferably circular in cross-section normal the axis, at least one sleeve channelway in the sleeve outer wall surface of the sleeve member open radially outwardly along its length to the sleeve outer wall surface, the sleeve member received coaxially within the tube bore with the sleeve outer wall surface of the sleeve member in opposed engagement with the tube inner wall surface of the tube member defining between each sleeve channelway and the tube inner wall surface of the tube member a sleeve passageway for flow of fluid, each sleeve passageway defined between each sleeve channelway and the tube inner wall surface of the tube member to have sleeve passageway interior walls, and the sleeve passageway interior walls configured to provide a plurality of the mixing portions in series along the sleeve passageway.

In a ninth aspect, the present invention provides a foam dispenser comprising:

as a foam generator, a valvular conduit including a passageway configured to mix air and fluid when forced in a flow through the passageway downstream by splitting the flow into at least two portions that are directed into different directions and merged in the passageway when the portions have different directions of flow, an air pump for discharge of the air from the atmosphere to the passageway for flow downstream through the passageway to a discharge outlet, a fluid pump for dispensing fluid to each passageway for flow downstream through each passageway to the discharge outlet simultaneously with the flow downstream through each passageway of the air discharged by the air pump. Preferably, the valvular conduit is a Tesla valvular conduit in which the passageway permits the relatively free passage of the air and the fluid through the passageway upstream but subjects the air and the fluid to the different directions of flow when the air and the fluid is forced through the passageway downstream. Preferably, the passageway increases resistance to movement of the fluid through the passageway downstream compared to resistance to movement of the fluid through the passageway upstream. Preferably, the foam dispenser is a hand cleaner dispenser that dispenses a hand cleaning fluid such as a foamable liquid soap and a foamable disinfecting fluid mixed with the air as a foam.

As a $1^{st}$ feature, the present invention provides a mixing pump assembly discharging a first fluid mixed with a second fluid, the pump assembly having:

a first pump to discharge the first fluid, a second pump to discharge the second fluid, a first element and a second element defining the passageway therebetween, the first element having a bore therethrough along an axis defined within a circumferential radially inwardly directed inner wall surface, the second element having a circumferential radially outwardly directed outer wall surface with a channelway in the outer wall surface open radially outwardly to the outer wall surface, the second element received coaxially within the bore with the outer wall surface in opposed engagement with the inner wall surface defining between each channelway and the inner wall surface, the passageway with an entrance into the passageway and an exit from the passageway spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction, wherein the second fluid discharged by the second pump and first fluid discharged by the first pump are simultaneously forced through the entrance into the passageway, through the passageway, and out the exit, each passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction to mix the flow through the first channel and the flow through the second channel on the first channel merging with the second channel, the second direction and the first direction form a merge angle therebetween of greater than 90 degrees.

As a $2^{nd}$ feature, the present invention provides a mixing pump assembly as claimed in the $1^{st}$ feature wherein:

the pump assembly comprising a piston chamber-forming body about the longitudinal axis and a piston member, the piston member coupled to the piston chamber-forming body with the piston member reciprocally coaxially slidable about the axis relative the piston chamber-forming body in a cycle of operation between a retracted position and an extended position to define there between both:

(a) the first pump having a compartment with a variable volume to draw the first fluid from a first fluid reservoir and discharge the first fluid; and (b) the second pump with a fluid compartment having a variable volume to draw in the second fluid and discharge the second fluid, the piston member comprising the first element and the second element.

As a $3^{rd}$ feature, the present invention provides a mixing pump assembly as claimed in the $1^{st}$ $2^{nd}$ feature wherein the exit is open to a discharge outlet downstream from the exit, the first fluid and the second fluid forced from the exit flow from the exit downstream out the discharge outlet.

As a $4^{th}$ feature, the present invention provides a mixing pump assembly as claimed in the $1^{st}$, $2^{nd}$ or $3^{rd}$ feature wherein the second fluid is atmosphere air.

As a $5^{th}$ feature, the present invention provides a mixing pump assembly as claimed in the $3^{rd}$ feature wherein:

the first fluid is a hand cleaning fluid capable of foaming, the second fluid is atmospheric air;

the exit is open to a discharge outlet downstream from the exit, the first fluid and the second fluid forced from the exit flow from the exit downstream out the discharge outlet, the passageway comprising a foam generator wherein in passage of the air and the first fluid downstream through the plurality of mixing portions, the air and the first fluid are mixed to form a foam of the air and the first fluid discharged from the exit and out the discharge outlet downstream from the exit.

As a $6^{th}$ feature, the present invention provides a mixing pump assembly as claimed in the $5^{th}$ feature wherein the second pump with a fluid compartment draws in the atmospheric air via the discharge outlet upstream through the passageways.

As a $7^{th}$ feature, the present invention provides a mixing pump assembly as claimed in any one of the $1^{st}$ to $6^{th}$ features wherein the merge angle therebetween is greater than 90 degrees so that flow downstream provides a downstream resistance to flow and flow upstream opposite to flow provides an upstream resistance to flow that is less than the downstream resistance to flow.

As an $8^{th}$ feature, the present invention provides a foaming pump discharging a hand cleaning fluid mixed with air as a foam from a discharge outlet having:

a piston liquid chamber-forming body about a longitudinal axis, a piston member, the piston member coupled to the piston liquid chamber-forming body with the piston member reciprocally coaxially slidable about the axis relative the piston liquid chamber-forming body in a cycle of operation between a retracted position and an extended position to define therebetween both:

(a) a liquid pump having a liquid compartment having a variable volume to draw a fluid from a fluid reservoir and discharge the fluid, and (b) an air pump having an air compartment having a variable volume to draw in atmospheric air and discharge the air;

the piston member comprising a first piston element and a second piston element defining a foam generator therebetween, the first piston element having a bore therethrough along an axis defined within a circumferential radially inwardly directed inner wall surface, the second piston element having a circumferential radially outwardly directed outer wall surface with at least one channelway in the outer wall surface open radially outwardly to the outer wall surface, the second piston element received coaxially within in the central passageway with the outer wall surface in opposed engagement with the inner wall surface defining between each channelway and the inner wall surface a passageway with an entrance and an exit spaced downstream along the passageway from the entrance, wherein with reciprocal movement of the piston member axially relative the piston liquid chamber-forming body air discharged by the air pump and fluid discharged by the liquid pump are simultaneously forced through the entrance into the passageway, through the passageway, and out the exit to a discharge outlet, each plug passageway defined between each plug channelway and the inner wall surface to have passageway interior walls configured to provide the foam generator as a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction.

As a $9^{th}$ feature, the present invention provides a mixing conduit for mixing a first fluid and a second fluid simultaneously forced in a downstream direction through a passageway in the conduit, the conduit comprising a first element and a second element defining the passageway therebetween, the first element having a bore therethrough along an axis defined within a circumferential radially inwardly directed inner wall surface, the second element having a circumferential radially outwardly directed outer wall surface with a channelway in the outer wall surface open radially outwardly to the outer wall surface, the second element received coaxially within in the bore with the outer wall surface in opposed engagement with the inner wall surface defining between each channelway and the inner wall surface the passageway with an entrance into the passageway and an exit from the passageway spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction, a first feed channel for directing the first fluid to the entrance and a second feed channel for directing the second fluid to the entrance.

As a $10^{th}$ feature, the present invention provides a method of mixing a first fluid and a second fluid comprising:

simultaneously forcing the first fluid and the second fluid in a downstream direction through a passageway in the conduit, the conduit comprising a first element and a second element defining the passageway therebetween, the first element having a bore therethrough along an axis defined within a circumferential radially inwardly directed inner wall surface, the second element having a circumferential radially outwardly directed outer wall surface with at least one channelway in the outer wall surface open radially outwardly to the outer wall surface, the second element received coaxially within in the bore with the outer wall surface in opposed engagement with the inner wall surface defining between each channelway and the inner wall surface the passageway with an entrance and an exit spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction.

As an $11^{th}$ feature, the present invention provides use of a valvular conduit to mix a first fluid and a second fluid by simultaneously forcing the first fluid and the second fluid in a downstream direction through a passageway in the conduit, the conduit comprising a first element and a second element defining the passageway therebetween, the first element having a bore therethrough along an axis defined within a circumferential radially inwardly directed inner wall surface, the second element having a circumferential radially outwardly directed outer wall surface with at least one channelway in the outer wall surface open radially outwardly to the outer wall surface, the second element received coaxially within the bore with the outer wall surface in opposed engagement with the inner wall surface defining between each channelway and the inner wall surface the passageway with an entrance and an exit spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction.

As a $12^{th}$ feature, the present invention provides a valvular conduit comprising:

a first element and a second element defining the passageway therebetween, the first element having a bore therethrough along an axis defined within a circumferential radially inwardly directed inner wall surface, the second element having a circumferential radially outwardly directed outer wall surface with a channelway in the outer wall surface open radially outwardly to the outer wall surface, the second element received coaxially within the bore with the outer wall surface in opposed engagement with the inner wall surface defining between each channelway and the inner wall surface the passageway with an entrance into the passageway and an exit from the passageway spaced downstream along the passageway from the entrance, the passageway defined between each channelway and the inner wall surface to have passageway interior walls configured to provide a plurality of mixing portions in series within the passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction, a first feed channel for directing the first fluid to the entrance and a second feed channel for directing the second fluid to the entrance, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel, where the second channel merges with the first channel, directing flow through the second channel in a second direction different than the first direction.

As a $13^{th}$ feature, the present invention provides a valvular conduit comprising:

an elongate sleeve member and an elongate center plug member, the sleeve member extending from a first sleeve end to a second sleeve end about a longitudinal axis, the plug member extending from a first plug end to a second plug end about the longitudinal axis, the sleeve member having a sleeve side wall with a circumferential inwardly directed sleeve inner wall surface circular in cross-section normal the axis defining a sleeve bore within the sleeve member extending along the axis, the plug member having a cylindrical circumferential outwardly directed plug outer wall surface circular in cross-section normal the axis, at least one plug channelway in the plug outer wall surface of the plug member open radially outwardly along its length to the plug outer wall surface of the plug member, the plug member received coaxially within in the sleeve bore with first plug end proximate the first sleeve end and the plug outer wall surface of the plug member in opposed engagement with the sleeve inner wall surface of the sleeve member defining between each plug channelway and the sleeve inner wall surface of the sleeve member a plug passageway for flow of fluid, each plug passageway defined between each plug channelway and the sleeve inner wall surface of the sleeve member to have plug passageway interior walls, the plug passageway interior walls configured to provide a plurality of mixing portions in series within the plug passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel where the second channel merges with the first channel directing flow through the second channel in a second direction different than the first direction.

As a $14^{th}$ feature, the present invention provides a valvular conduit as claimed in the $13^{th}$ feature wherein the second direction being different from the first direction to mix the flow through the first channel and the flow through the second channel on the first channel merging with the second channel.

As a $15^{th}$ feature, the present invention provides a valvular conduit as claimed in the $14^{th}$ feature wherein each mixing portion having the upstream main channel, a fork, the first channel, the second channel separate from the first channel, a merge, and the downstream main channel, each mixing portion configured to split the flow from the upstream main channel at the fork into the first channel and the second channel separate from the first channel, the first channel merging at the merge with the second channel into the downstream main channel with the first channel directing flow through the first channel at the merge in the first direction and the second channel directing flow through the second channel at the merge in the second direction different than the first direction, the second direction being different from the first direction to mix the flow through the first channel and the flow through the second channel at the merge.

As a $16^{th}$ feature, the present invention provides a valvular conduit as claimed in the $13^{th}$, $14^{th}$ or $15^{th}$ feature wherein mixing portions are configured so that flow downstream provides a downstream resistance to flow downstream and flow up stream opposite to flow downstream provides an upstream resistance to flow that is less than the downstream resistance to flow.

As a $17^{th}$ feature, the present invention provides a valvular conduit as claimed in the $13^{th}$, $14^{th}$, $15^{th}$ or $16^{th}$ feature wherein the second direction and the first direction form a merge angle therebetween of at least 90 degrees so that flow downstream provides a downstream resistance to flow and flow upstream opposite to flow provides an upstream resistance to flow that is less than the downstream resistance to flow.

As an $18^{th}$ feature, the present invention provides a valvular conduit as claimed in the $13^{th}$, $14^{th}$, $15^{th}$ or $16^{th}$ feature wherein the second direction and the first direction form a merge angle therebetween selected from the group consisting of: at least 90 degrees, at least 120 degrees, and of at least 150 degrees.

As a $19^{th}$ feature, the present invention provides a valvular conduit as claimed in any one of the $13^{th}$ to $18^{th}$ features wherein the interior walls are configured to permit the relatively free passage of fluid upstream but to subject the fluid to rapid reversals of direction when the fluid is forced through the plug passageway downstream to thereby increase resistance to movement of the fluid through the plug passageway downstream compared to resistance to movement of the fluid upstream.

As a $20^{th}$ feature, the present invention provides a valvular conduit as claimed in any one of the $13^{th}$ to $19^{th}$ features comprising a Tesla valvular conduit.

As a $21^{st}$ feature, the present invention provides a valvular conduit as claimed in any one of the $13^{th}$ to $20^{th}$ features wherein each plug passageway extends longitudinally along the plug member.

As a $22^{nd}$ feature, the present invention provides a valvular conduit as claimed in any one of the $13^{th}$ to $21^{st}$ features wherein the at least one plug channelway comprises a plurality of the plug channelways circumferentially spaced from each other about the plug member.

As a $23^{nd}$ feature, the present invention provides a valvular conduit as claimed in any one of the $13^{th}$ to $22^{nd}$ features including:

an elongate tube member, the tube member extending from a tube first end to a tube second end about the longitudinal axis, the tube member having a tube side wall with a circumferential inwardly directed tube inner wall surface circular in cross-section normal the axis defining a tube bore within the tube member extending along the axis, the sleeve member having a cylindrical circumferential outwardly directed sleeve outer wall surface circular in cross-section normal the axis, at least one sleeve channelway in the sleeve outer wall surface of the sleeve member open radially outwardly along its length to the sleeve outer wall surface, the sleeve member received coaxially within the tube bore with first plug end proximate the first sleeve end and the sleeve outer wall surface of the sleeve member in opposed engagement with the tube inner wall surface of the tube member defining between each sleeve channelway and the tube inner wall surface of the tube member a sleeve passageway for flow of fluid, each sleeve passageway defined between each sleeve channelway and the tube inner wall surface of the tube member to have sleeve passageway interior walls, the sleeve passageway interior walls configured to provide a plurality of the mixing portions in series along the sleeve passageway.

As a $24^{th}$ feature, the present invention provides a valvular conduit as claimed in the $23^{nd}$ feature wherein each sleeve passageway extends longitudinally along the sleeve member.

As a $25^{th}$ feature, the present invention provides a valvular conduit as claimed in the $23^{nd}$ or $24^{th}$ feature wherein the at least one sleeve channelway comprises a plurality of the sleeve channelways circumferentially spaced from each other about the sleeve member.

As a $26^{th}$ feature, the present invention provides a valvular conduit as claimed in the $23^{nd}$, $24^{th}$ or $25^{th}$ feature including a transfer passage directing flow of the fluid radially between each plug passageway at the first end of the plug member and each sleeve passageway at the first end of the sleeve member, downstream flow in the plug passageways being axially from the second end of the plug member toward the first end of the plug member, and downstream flow in the sleeve passageways being axially from the first end of the sleeve member toward the second end of the sleeve member.

As a $27^{th}$ feature, the present invention provides a valvular conduit as claimed in any one of the $13^{th}$ to $25^{th}$ features wherein downstream flow in the sleeve passageways being axially from the first end of the sleeve member toward the second end of the sleeve member, the sleeve member including a radially extending sleeve end wall closing the sleeve bore at the second end of the sleeve member but for an array of end wall openings axially through the sleeve end wall, the end wall openings in communication with the plug passageway at the second end of the sleeve member.

As a 28$^{th}$ feature, the present invention provides a valvular conduit as claimed in any one of the 13$^{th}$ to 25$^{th}$ features wherein downstream flow in the plug passageways being axially from the second end of the plug member toward the first end of the plug member;

the plug member including a radially extending end flange at the second end of the plug member received in the sleeve bore at the second end to close the sleeve bore but for an array of end flange openings axially through the end flange, the end flange openings in communication with the plug passageway at the second end of the sleeve member.

As a 29$^{th}$ feature, the present invention provides a Tesla valvular conduit as claimed in the 27$^{th}$ feature wherein the plug member including a radially extending end flange at the second end of the plug member received in the sleeve bore at the second end axially inwardly of the end wall to close the sleeve bore but for an array of end flange openings axially through the end flange, the end flange openings in communication with the plug passageway at the second end of the sleeve member, the end wall openings in communication with the plug passageway at the second end of the sleeve member via the end flange openings.

As a 30$^{th}$ feature, the present invention provides a valvular conduit as claimed in the 29$^{th}$ feature wherein:

the end wall has an end wall inner surface directed axially inwardly into the sleeve bore;

the end wall openings passing through the end wall inner surface with each opening providing a respective cross-sectional area for fluid flow in the end wall inner surface, the end flange has an end flange outer surface directed axially outwardly, the end flange openings passing through the end flange inner surface with each opening providing a respective cross-sectional area for fluid flow in the end flange outer surface, the end flange inner surface engaged with the end wall inner surface with each of the end flange openings in overlapping registry with a respective one of the end wall openings providing at the interface of the end flange inner surface and the end wall outer surface a cross-sectional area for fluid flow less than both the cross-sectional area for fluid flow of the respective end flange openings in the end flange outer surface and the cross-sectional area for fluid flow of the respective end wall openings in the end wall inner surface.

As a 31$^{st}$ feature, the present invention provides a valvular conduit as claimed in the 26$^{th}$ feature wherein the tube bore is closed at the first end of the tube member, the first end of the sleeve member is spaced axially away from the first end of the tube member toward the second end of the tube member, and the transfer passage is defined axially between the closed first end of the tube member and the first end of the sleeve member.

As a 32$^{nd}$ feature, the present invention provides a valvular conduit as claimed in the 31$^{st}$ feature wherein at the second end of the sleeve member, the sleeve outer wall surface sealable engaging with the tube inner wall surface to form a circumferential seal preventing fluid flow axially between the sleeve member and the tube member, spaced toward the second end of the sleeve member from the sleeve passageways.

As a 33$^{rd}$ feature, the present invention provides a valvular conduit as claimed in the 30$^{th}$ feature wherein the tube bore is open at the second end of the tube member, the tube member extending beyond the end wall of the sleeve member, the tube bore beyond the end wall of the sleeve member providing a discharge passage extending to a discharge outlet provided as an open second end of the tube member.

As a 34$^{th}$ feature, the present invention provides a valvular conduit as claimed in any one of the 23$^{rd}$ to 26$^{th}$ features wherein the tube member is injection molded as an integral element.

As a 35$^{th}$ feature, the present invention provides a valvular conduit as claimed in any preceding feature wherein the plug member is injection molded as an integral element.

As a 36$^{th}$ feature, the present invention provides a valvular conduit as claimed in any preceding feature wherein the sleeve member is injection molded as an integral element.

As a 37$^{th}$ feature, the present invention provides a valvular conduit as claimed in any one of the 13$^{th}$ to 22$^{nd}$ features wherein:

an air pump for discharge of air from the atmosphere to each plug passageway for flow downstream through the plug passageway to a discharge outlet, a fluid pump for dispensing fluid from a fluid containing reservoir to each plug passageway for flow downstream through each plug passageway to the discharge outlet simultaneously with the flow downstream through each plug passageway of the air discharged by the air pump.

As a 38$^{th}$ feature, the present invention provides a valvular conduit as claimed in the 37$^{th}$ feature wherein the liquid pump comprises a piston pump with a piston chamber-forming body defining a fluid chamber coaxially about the axis, the fluid chamber open at an outer axial end, a piston member coaxially slidably received in the fluid chamber for coaxial reciprocal sliding along the axis relative the piston chamber-forming body to dispense the fluid to each plug passageway, the piston-forming element comprising the sleeve member.

As a 39$^{th}$ feature, the present invention provides a valvular conduit as claimed in the 38$^{th}$ feature wherein the piston-forming element comprising the tube member.

As a 40$^{th}$ feature, the present invention provides a valvular conduit as claimed in any one of the 35$^{th}$ to 36$^{th}$ features wherein the piston-forming element including the tube member is injection molded as an integral element.

As a 41$^{st}$ feature, the present invention provides a valvular conduit as claimed in any one of the 35$^{th}$ to 37$^{th}$ features wherein the plug member is injection molded as an integral element.

As a 42$^{nd}$ feature, the present invention provides a valvular conduit as claimed in any one of the 35$^{th}$ to 37$^{th}$ features wherein the sleeve member is injection molded as an integral element.

As a 43$^{rd}$ feature, the present invention provides a foaming pump discharging a hand cleaning fluid mixed with air as a foam from a discharge outlet having:

a piston liquid chamber-forming body about a longitudinal axis, a piston member, a foam generator carried by the piston member having a passageway with an entrance and an outlet, the piston member coupled to the piston liquid chamber-forming body with the piston member reciprocally coaxially slidable about the axis relative the piston liquid chamber-forming body in a cycle of operation between a retracted position and an extended position to define therebetween both:

(a) an air pump having an air compartment having a variable volume to draw in atmospheric air into the air compartment and discharge the air into the entrance; and (b) a liquid pump having a liquid compartment having a variable volume to draw a fluid from a fluid reservoir and discharge the fluid to the entrance, wherein with reciprocal movement of the piston member axially relative the piston chamber-forming body air discharged by the air pump and fluid discharged by the liquid pump are simultaneously forced through the entrance into the passageway, downstream through the passageway, and out the exit to a discharge outlet, characterized by:

the piston member comprising an elongate sleeve member and an elongate center plug member, the sleeve member extending from a first sleeve end to a second sleeve end about the axis, the plug member extending from a first plug end to a second plug end about the axis, the sleeve member having a sleeve side wall with a circumferential radially inwardly directed sleeve inner wall surface about the axis defining a sleeve bore within the sleeve member extending along the axis, the plug member having a circumferential radially outwardly directed plug outer wall surface about the axis, at least one plug channelway in the plug outer wall surface of the plug member open radially outwardly relative the axis along its length to the plug outer wall surface of the plug member, the plug member received coaxially within in the sleeve bore with first plug end proximate the first sleeve end and the plug outer wall surface of the plug member in opposed engagement with the sleeve inner wall surface of the sleeve member defining between each plug channelway and the sleeve inner wall surface of the sleeve member a plug passageway forming a first portion of the passageway, each plug passageway defined between each plug channelway and the sleeve inner wall surface of the sleeve member to have plug passageway interior walls, the plug passageway interior walls configured to provide a plurality of mixing portions in series within the plug passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel where the second channel merges with the first channel directing flow through the second channel in a second direction different than the first direction to mix the flow through the first channel and the flow through the second channel on the first channel merging with the second channel, wherein in passage of the air and the fluid downstream through the plurality of mixing portions, the air and the first fluid are mixed to form a foam of the air and the fluid discharged from the exit and out the discharge outlet downstream from the exit.

As a 44$^{th}$ feature, the present invention provides a foaming pump as claimed in the 43$^{rd}$ feature wherein:

the inwardly directed sleeve inner wall surface is circular in cross-section normal the axis, and the outwardly directed plug outer wall surface is circular in cross-section normal the axis.

As a 45$^{th}$ feature, the present invention provides a foaming pump as claimed in the 43$^{rd}$ or 44$^{th}$ feature wherein:

the discharge outlet is open to atmospheric air, and the air pump draws in the atmospheric air via the discharge outlet upstream through the foam generator into the air compartment.

As a 46$^{th}$ feature, the present invention provides a foaming pump as claimed in the 43$^{rd}$ feature wherein each mixing portion having the upstream main channel, a fork, the first channel, the second channel separate from the first channel, a merge, and the downstream main channel, each mixing portion configured to split the flow from the upstream main channel at the fork into the first channel and the second channel separate from the first channel, the first channel merging at the merge with the second channel into the downstream main channel with the first channel directing flow through the first channel at the merge in the first direction and the second channel directing flow through the second channel at the merge in the second direction different than the first direction, the second direction being different from the first direction to mix the flow through the first channel and the flow through the second channel at the merge.

As a 47$^{th}$ feature, the present invention provides a foaming pump as claimed in any one of the 43$^{rd}$ to 46$^{th}$ features wherein the interior walls are configured so that flow downstream provides a downstream resistance to flow downstream and flow up stream opposite to flow downstream provides an upstream resistance to flow that is less than the downstream resistance to flow.

As a 48$^{th}$ feature, the present invention provides a foaming pump as claimed in any one of the 43$^{rd}$ to 47$^{th}$ features wherein the second direction and the first direction form a merge angle therebetween of at least 90 degrees so that flow downstream provides a downstream resistance to flow and flow upstream opposite to flow provides an upstream resistance to flow that is less than the downstream resistance to flow.

As a 49$^{th}$ feature, the present invention provides a foaming pump as claimed in any one of the 43$^{rd}$ to 48$^{th}$ features wherein the interior walls are configured to permit the relatively free passage of fluid upstream but to subject the fluid to rapid reversals of direction when the fluid is forced through the passageway downstream to thereby increase resistance to movement of the fluid through the passageway downstream compared to resistance to movement of the fluid upstream.

As a 50$^{th}$ feature, the present invention provides a foaming pump as claimed in any one of the 43$^{rd}$ to 49$^{th}$ features wherein:

the at least one plug channelway comprises a plurality of the plug channelways circumferentially spaced from each other about the plug member, and each plug passageway extends longitudinally along the plug member.

As a 51$^{st}$ feature, the present invention provides a foaming pump as claimed in any one of the 43$^{rd}$ to 50$^{th}$ features including:

an elongate tube member, the tube member extending from a tube first end to a tube second end about the longitudinal axis, the tube member having a tube side wall with a circumferential inwardly directed tube inner wall surface circular in cross-section normal the axis defining a tube bore within the tube member extending along the axis, the sleeve member having a cylindrical circumferential outwardly directed sleeve outer wall surface circular in cross-section normal the axis, at least one sleeve channelway in the sleeve outer wall surface of the sleeve member open radially outwardly along its length to the sleeve outer wall surface, the sleeve member received coaxially within the tube bore with first plug end proximate the first sleeve end and the sleeve outer wall surface of the sleeve member in opposed engagement with the tube inner wall surface of the tube member defining between each sleeve channelway and the tube inner wall surface of the tube member a sleeve passageway forming a second portion of the passageway, each sleeve passageway defined between each sleeve channelway and the tube inner wall surface of the tube member to have sleeve passageway interior walls, the sleeve passageway interior walls configured to provide a plurality of the mixing portions in series along the sleeve passageway.

As a $52^{nd}$ feature, the present invention provides a foaming pump as claimed in the $51^{st}$ feature wherein:

the at least one sleeve channelway comprises a plurality of the sleeve channelways circumferentially spaced from each other about the sleeve member, and each sleeve passageway extends longitudinally along the sleeve member.

As a $53^{rd}$ feature, the present invention provides a foaming pump as claimed in the $51^{st}$ or $52^{nd}$ feature including a transfer passage directing flow of the fluid radially between each plug passageway at the first end of the plug member and each sleeve passageway at the first end of the sleeve member, downstream flow in the plug passageways being axially from the second end of the plug member toward the first end of the plug member, and downstream flow in the sleeve passageways being axially from the first end of the sleeve member toward the second end of the sleeve member.

As a $54^{th}$ feature, the present invention provides a foaming pump as claimed in any one of the $51^{st}$ to $53^{rd}$ features wherein downstream flow in the sleeve passageways being axially from the first end of the sleeve member toward the second end of the sleeve member, the sleeve member including a radially extending sleeve end wall closing the sleeve bore at the second end of the sleeve member but for an array of end wall openings axially through the sleeve end wall, the end wall openings in communication with the plug passageway at the second end of the sleeve member.

As a $55^{th}$ feature, the present invention provides a foaming pump as claimed in any one of the $51^{st}$ to $53^{rd}$ features wherein downstream flow in the plug passageways being axially from the second end of the plug member toward the first end of the plug member;

the plug member including a radially extending end flange at the second end of the plug member received in the sleeve bore at the second end to close the leeve bore but for an array of end flange openings axialy through the end flange, the end flange openings in communication with the plug passageway at the second end of the sleeve member.

As a $56^{th}$ feature, the present invention provides a foaming pump as claimed in the $55^{th}$ feature wherein the plug member including a radially extending end flange at the second end of the plug member received in the sleeve bore at the second end axially inwardly of the end wall to close the sleeve bore but for an array of end flange openings axially through the end flange, the end flange openings in communication with the plug passageway at the second end of the sleeve member, the end wall openings in communication with the plug passageway at the second end of the sleeve member via the end flange openings.

As a $57^{th}$ feature, the present invention provides a foaming pump as claimed in the $53^{rd}$ feature wherein the tube bore is closed at the first end of the tube member, the first end of the sleeve member is spaced axially away from the first end of the tube member toward the second end of the tube member, and the transfer passage is defined axially between the closed first end of the tube member and the first end of the sleeve member, at the second end of the sleeve member, the sleeve outer wall surface sealable engaging with the tube inner wall surface to form a circumferential seal preventing fluid flow axially between the sleeve member and the tube member, spaced toward the second end of the sleeve member from the sleeve passageways, and the tube bore is open at the second end of the tube member, the tube member extending beyond the end wall of the sleeve member, the tube bore beyond the end wall of the sleeve member providing a discharge passage extending to the discharge outlet provided as an open second end of the tube member.

BRIEF DESCRIPTION OF THE DRAWINGS

Further aspects and advantages of the present invention will become apparent from the following description taken together with the accompanying drawings in which.

DETAILED DESCRIPTION OF THE DRAWINGS

First Embodiment

Figure 1:
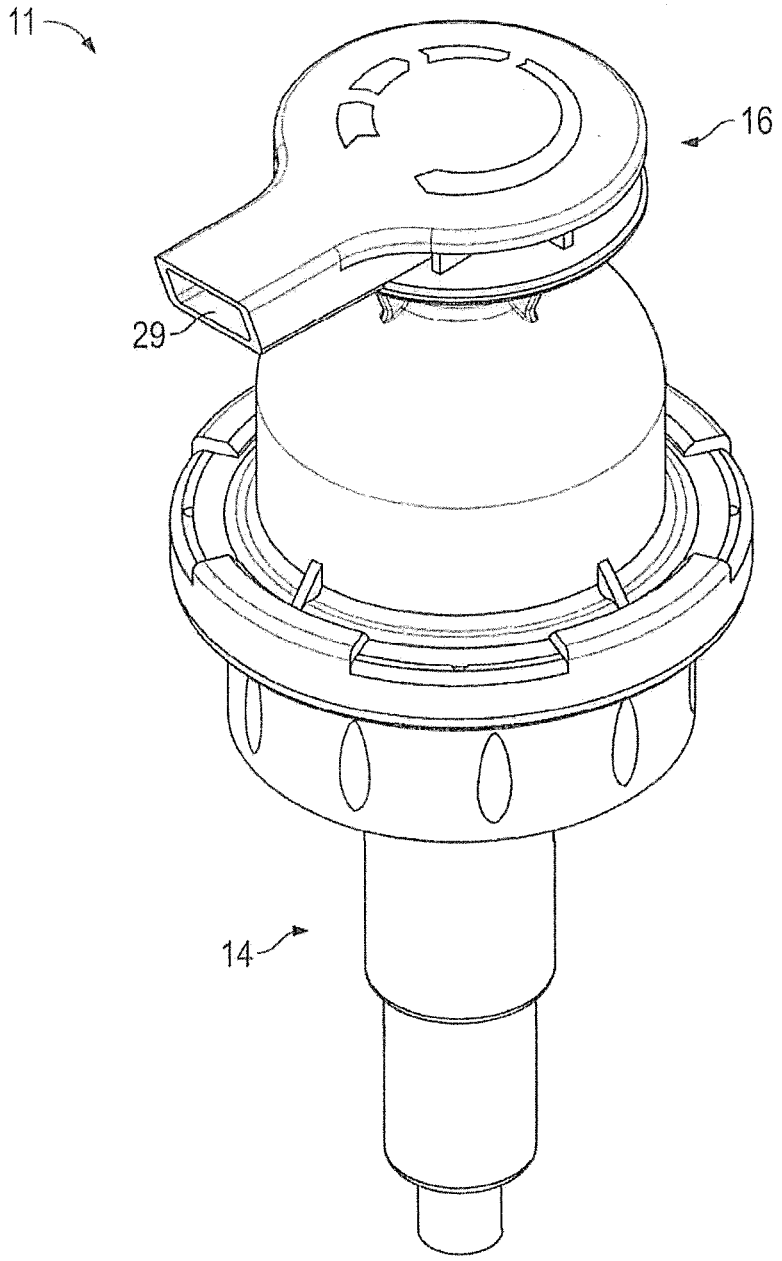
FIG. 1 is a pictorial view of a foaming pump assembly in accordance with a first embodiment of the present invention in an extended position.
Figure 2:
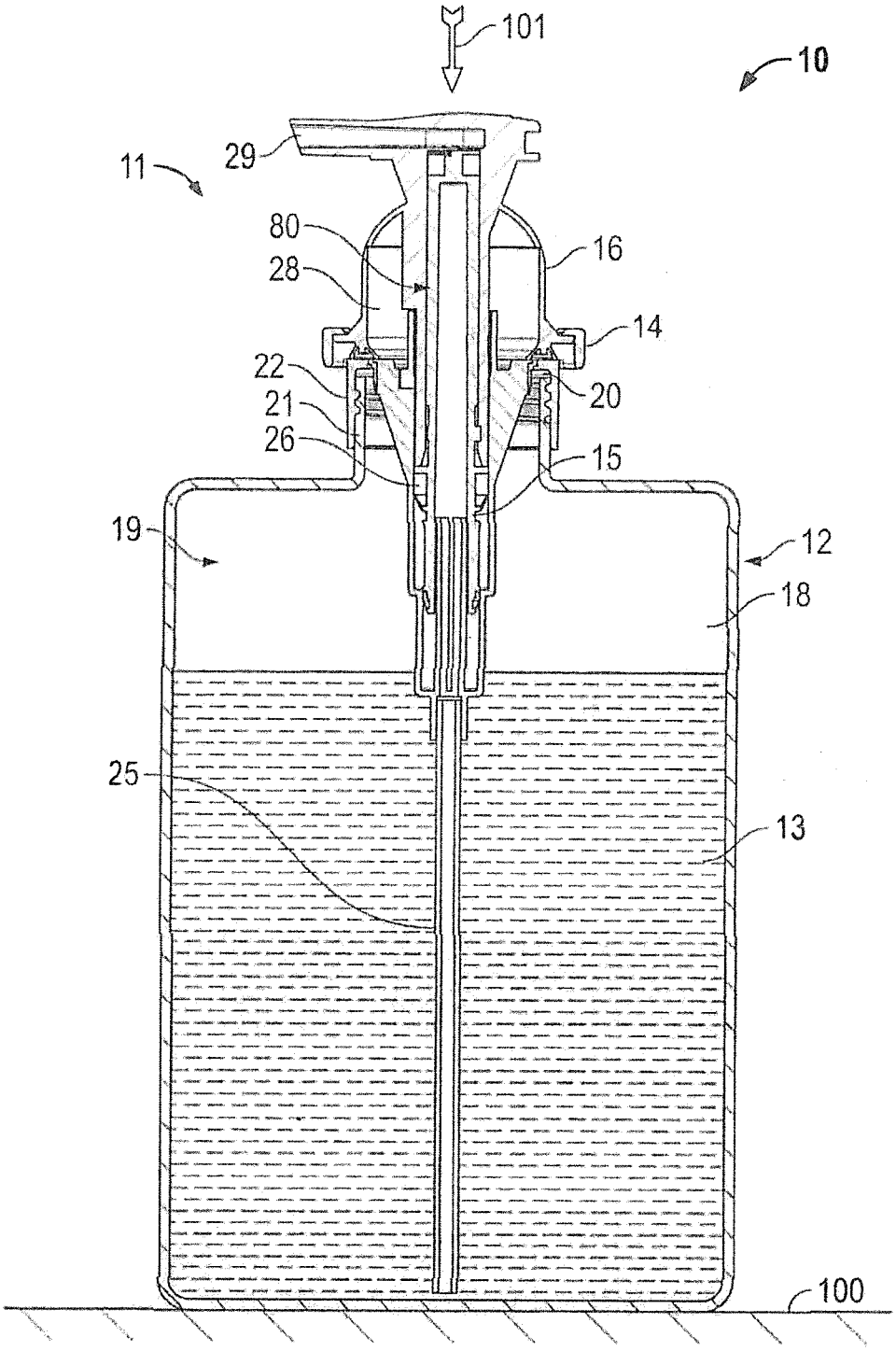
FIG. 2 is a cross-sectional side view of a foam dispenser incorporating the foaming pump assembly of FIG. 1.

Reference is made to FIG. 2 showing a foam dispenser 10 having a foaming pump assembly 11 as shown in FIG. 1 secured to a reservoir 12 containing a foamable fluid 13 to be dispensed. The fluid 13 is preferably a liquid and, more preferably, a fluid capable of foaming and, preferably, a foamable hand cleaning fluid. The foam dispenser 10 is preferably a dispenser of hand cleaning fluid as foam. The pump assembly 11 includes a piston chamber-forming body 14, a piston-forming element 15 and a diaphragm-forming component 16. As seen in FIG. 2, a dip tube 25 extends from the piston chamber-forming body 14 downwardly into the reservoir 12.

The reservoir 12 is a non-collapsible reservoir in the sense that as the fluid 13 is drawn from the reservoir 12 by operation of the pump assembly 11 with the discharge of the liquid 13 from the reservoir a vacuum comes to be developed within the reservoir as in the gas 18, being substantially air, in the reservoir 12 above the fluid 13.

The reservoir 12 defines an interior 19 with the interior 19 enclosed but for having an outlet port 20 formed in a cylindrical externally threaded neck 21 of the reservoir 12. The neck 21 of the reservoir 12 is sealably engaged on an internally threaded downwardly extending collar tube 22 on the piston chamber-forming body 14 with a preferred but optional resilient annular seal ring 22 (best seen in FIG. 3) axially compressed between the outlet port 20 and the piston chamber-forming body 14 to form a seal therebetween.

Figure 3:
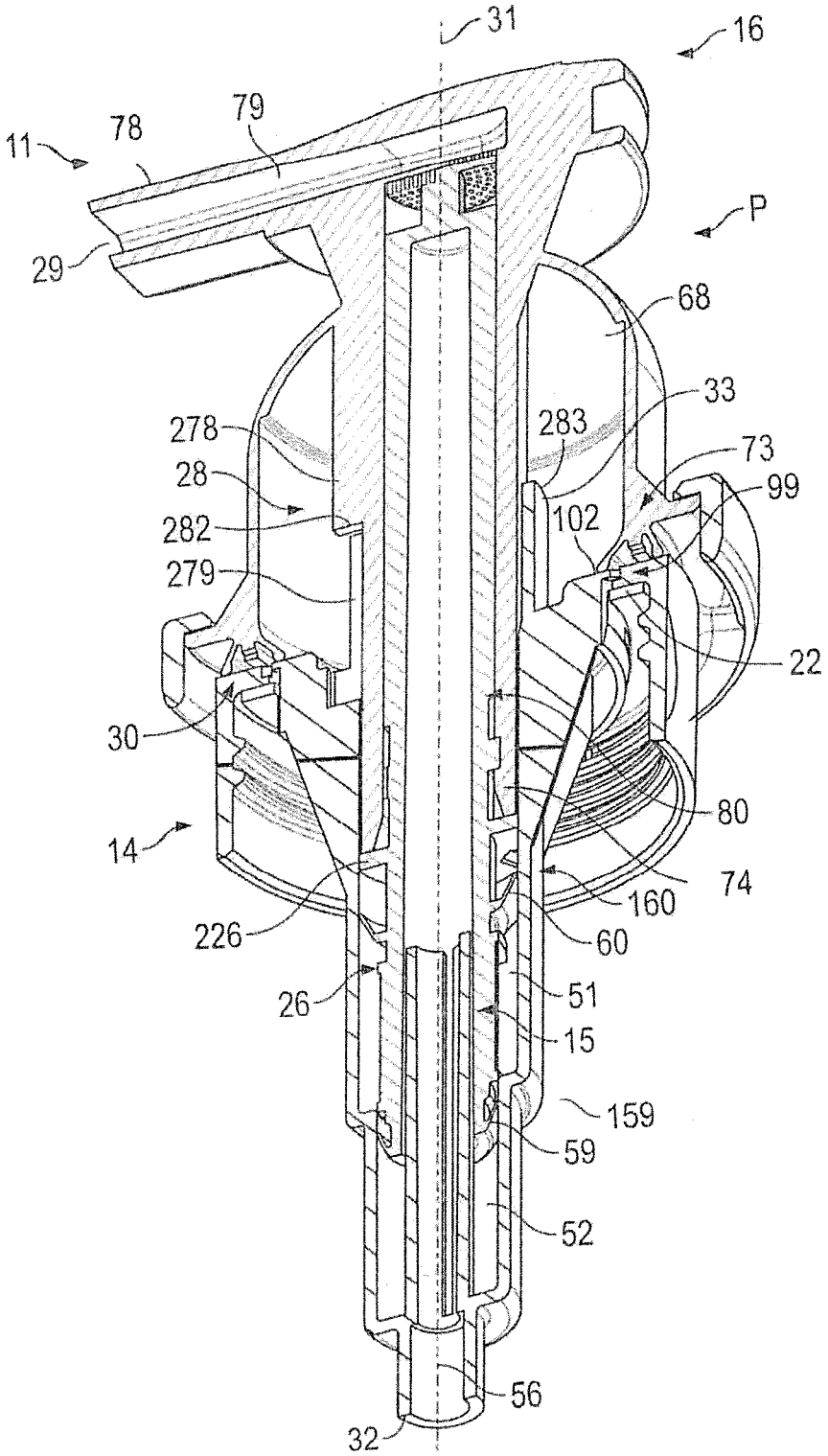
FIG. 3 is a cross-sectional pictorial view of the foaming pump assembly of FIG. 1 in an extended position.
Figure 4:
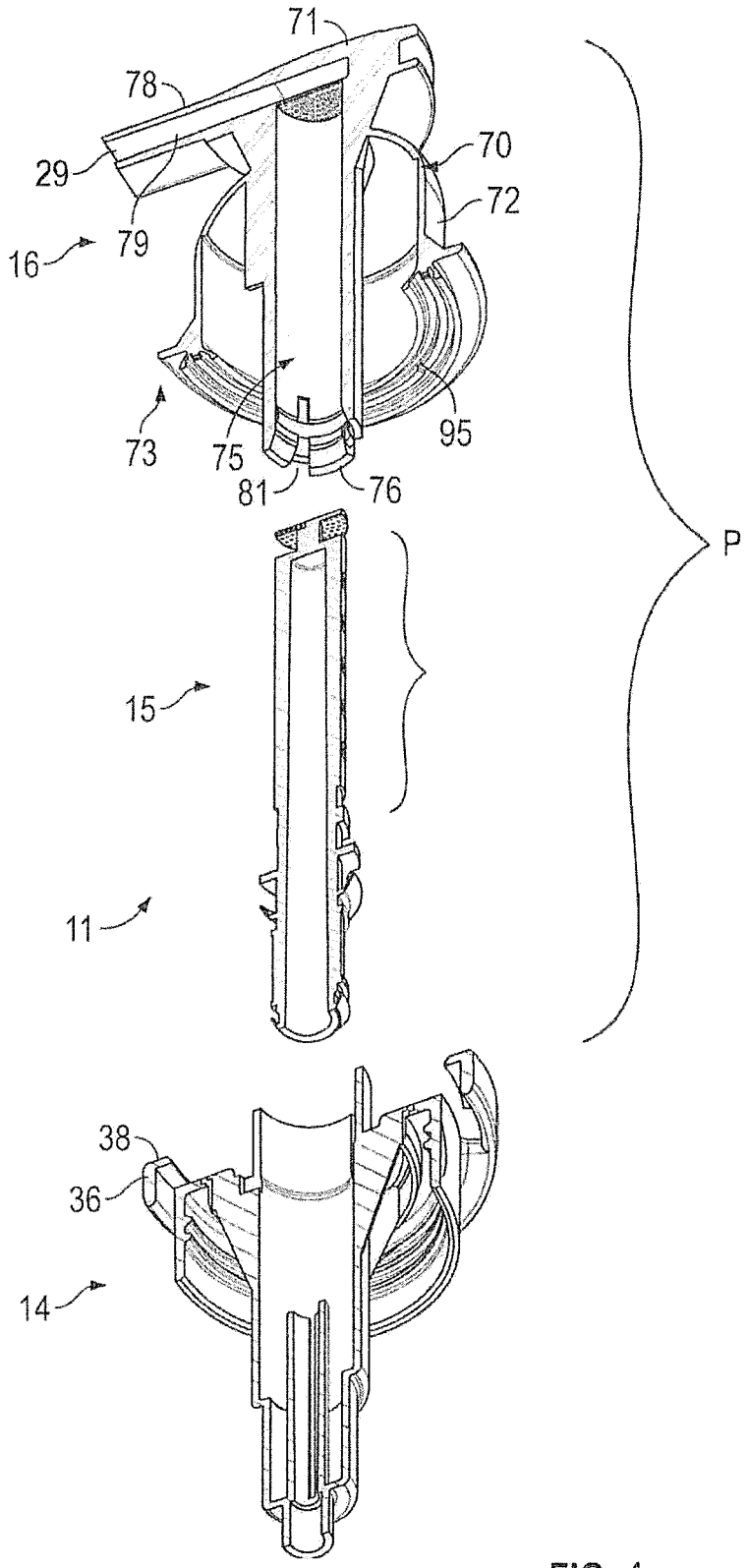
FIG. 4 is a cross-sectional exploded perspective view of the pump assembly of FIG. 1 as seen from below.

In the preferred embodiment as seen in FIGS. 3 and 4, each of the piston chamber-forming body 14, the piston-forming element 15 and the diaphragm-forming component 16 is formed as an integral element preferably by injection molding so as to provide the foaming pump assembly 11 from a minimal of parts. Aside from the major three elements, namely, the piston chamber-forming body 14, the piston-forming element 15 and the diaphragm-forming component 16, the pump assembly 11 has merely the dip tube 25 and the optional seal ring 22.

Figure 5:
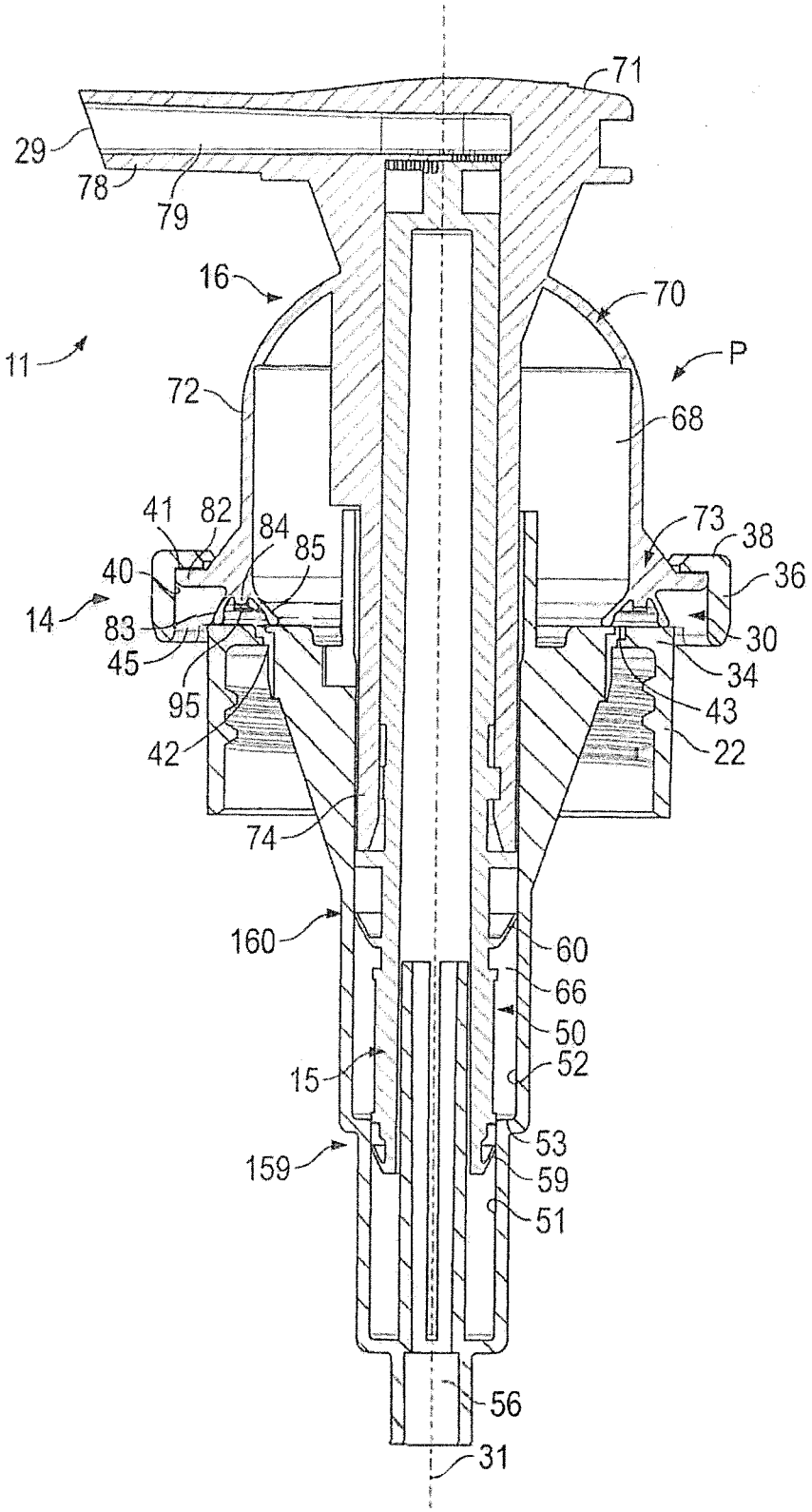
FIG. 5 is a cross-sectional side view of the pump assembly of FIG. 1 in an extended position.
Figure 6:
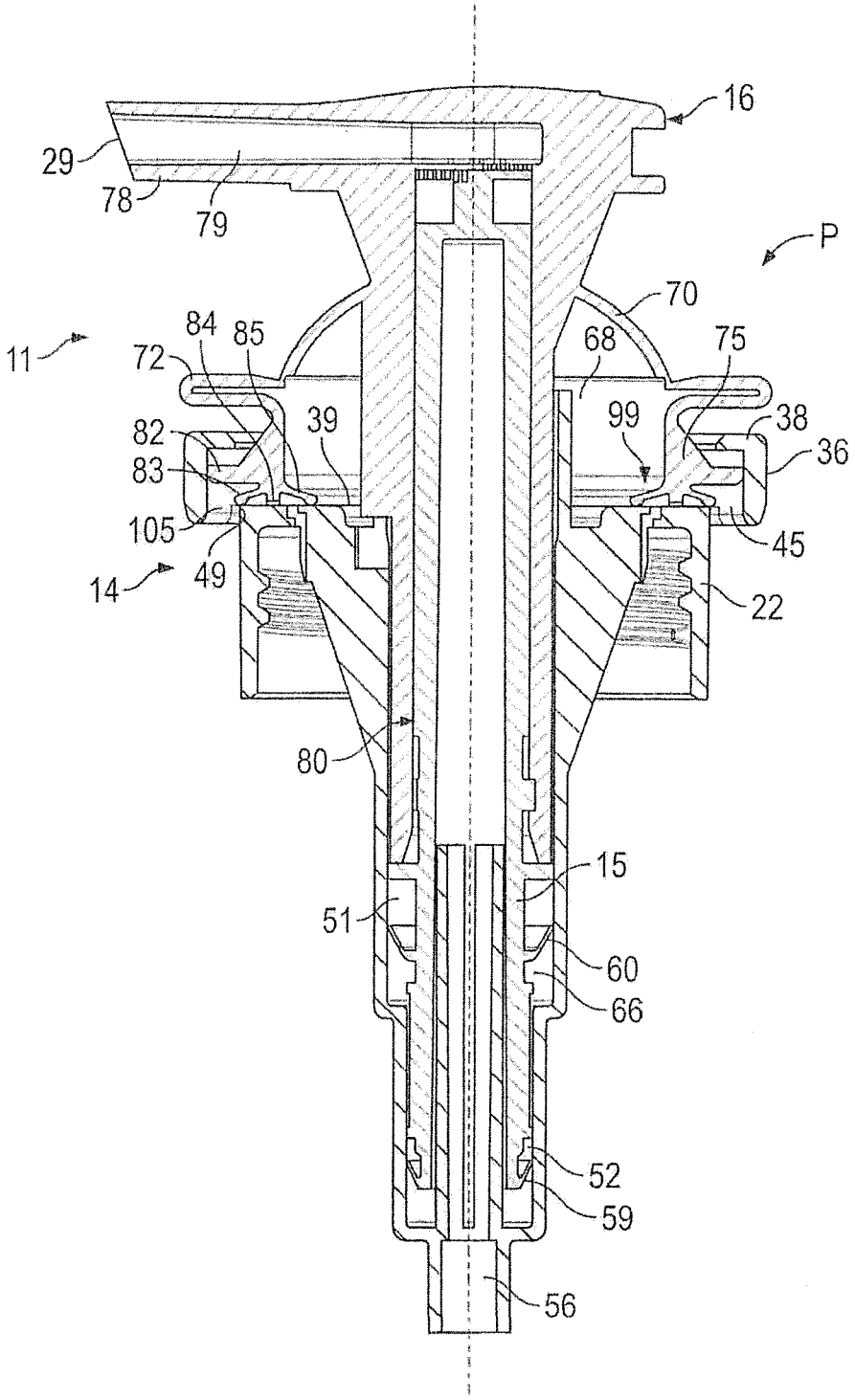
FIG. 6 is a cross-sectional side view the same as FIG. 5 but with the pump assembly of FIG. 1 in a retracted position.

The three major elements are assembled with the piston-forming element 15 affixed to the diaphragm-forming component 16 to form a piston member P and with the piston member P coupled to the piston chamber-forming body 14 for movement between an extended position as seen in FIG. 5 and a retracted position as seen in FIG. 6.

A liquid pump generally indicated 26 is formed by the interaction of the piston-forming element 15 and the piston chamber-forming body 14 and an air pump generally indicated 28 is formed notably by interaction of the diaphragm-forming component 16 and the piston chamber-forming body 14. In moving from the extended position of FIG. 5 to the retracted position of FIG. 6, the liquid pump 26 discharges the liquid 13 from the reservoir 12 simultaneously with the air pump discharging air such that air and liquid may simultaneously be passed through a foam generator 80 and out a dispensing or discharge outlet 29. In moving from the retracted position of FIG. 6 to the extended position of FIG. 5, atmospheric air is drawn in by the air pump 28.

An optional air relief valve 30 is provided between the diaphragm-forming component 16 and the piston chamber-forming body 14 to permit atmospheric air to flow from the atmosphere into the interior 19 of the reservoir 12 to relieve any vacuum that may develop within the reservoir 12.

Figure 7:
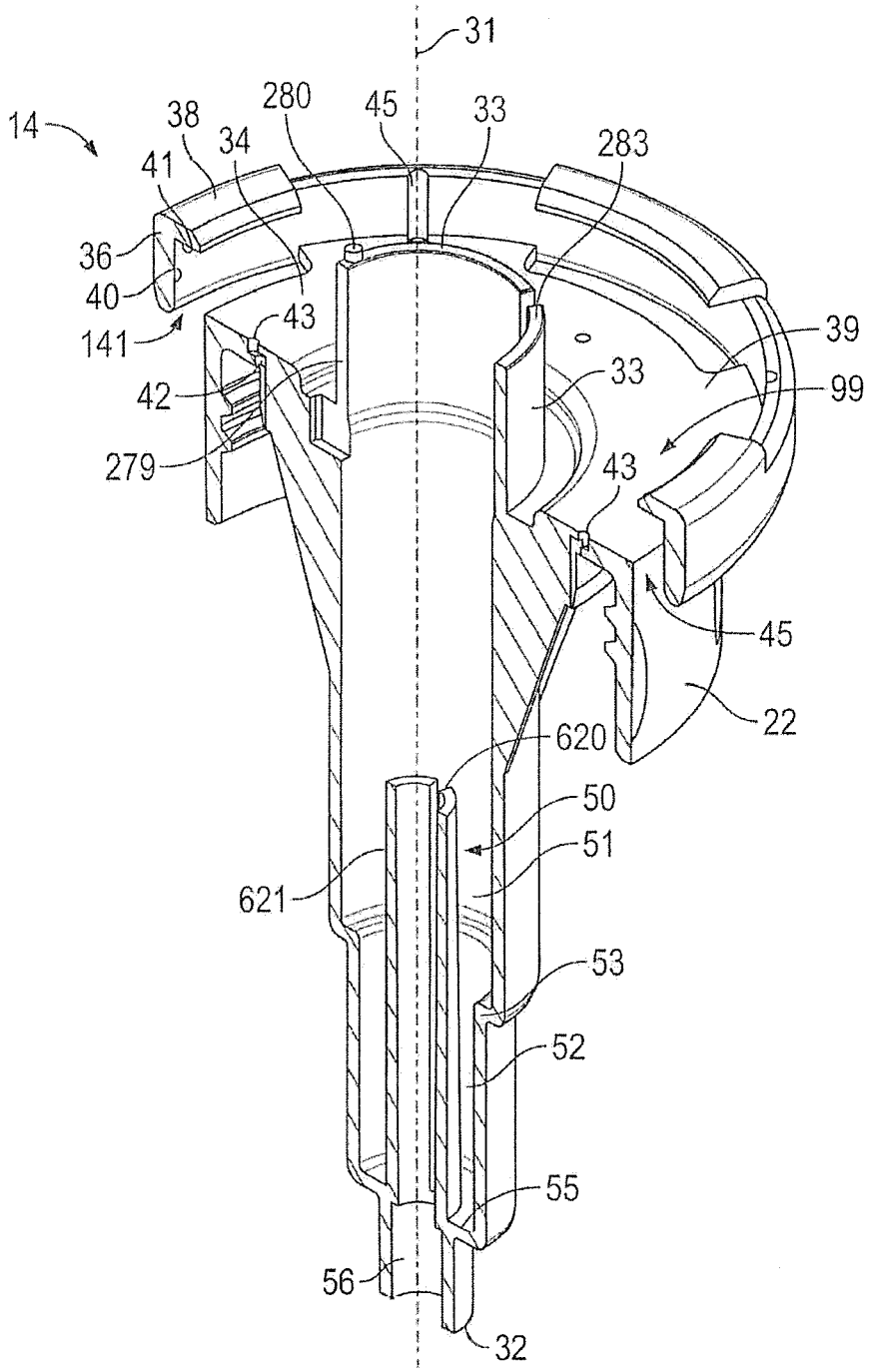
FIG. 7 is a cross-sectional pictorial view of the piston chamber-foaming body of FIG. 4 as seen from above.

As seen on FIG. 7, the piston chamber-forming body 14 is disposed about a central axis 31 and has an axially inner end 32 and an axially outer end 33. The piston chamber-forming body 14 includes a center tube 33 disposed coaxially about the axis 31 and open at both axial ends. The piston chamber-forming body 14 includes an annular bridge flange 34 which extends radially outwardly from the open upper end of the center tube 33. The threaded downwardly extending collar tube 22 extends downwardly from the annular bridge flange 34 coaxially about the center tube 33. The annular bridge flange 34 carries an outer tube 36 extending axially outwardly from the annular bridge flange 34 to an axial outer end of the outer tube 36 which carries a radially inwardly extending return flange 38 comprising circumferentially spaced segments. The bridge flange 34 provides a radially extending axially outwardly directed upper surface 39. The outer tube 36 provides a radially inwardly directed locating surface 40. The return flange 38 presents a radially extending axially inwardly directed stopping surface 41 opposed to the axially directed upper surface 39 and spaced axially a first distance. A plurality of vent passages 42 extend axially through the annular bridge flange 34 from a first opening 43 in the upper surface 39 to a lower opening. At similar circumferential locations to the vent passages 42, a number of vent channels 45 are provided open to the atmosphere.

Inside the center tube 33, a stepped fluid chamber 50 is defined having a cylindrical outer chamber 51 and a cylindrical inner chamber 52 with the diameter of the inner chamber 52 being less than the diameter of the outer chamber 51. Each chamber is coaxial about the axis 31. Each chamber has a cylindrical chamber wall, an inner end and an outer end. The outer end of the inner chamber 52 opens into the inner end of the outer chamber 51. An annular shoulder 53 closes the inner end of the inner chamber 51 about the outer end of the outer chamber 52. The inner chamber is open via slotways 620 in a centering guide tube 621 at an axial inner end 55 of the fluid chamber 50 into an axially inwardly opening socket 56 at the inner end 32 of the piston chamber-forming body 14 which socket 56 is adapted to secure an upper end of the dip tube 25 such that the dip tube 25 provides communication for fluid 13 from the bottom of the reservoir 12 into the inner chamber 52.

The piston-forming element 15 is coaxially slidably received within the piston chamber-forming body 14 providing the liquid pump 26 therebetween. The configuration of the liquid pump 26 has some similarities to a pump as disclosed in U.S. Pat. No. 5,975,360 to Ophardt, issued Nov. 2, 1999, the disclosure of which is incorporated herein by reference.

Figure 10:
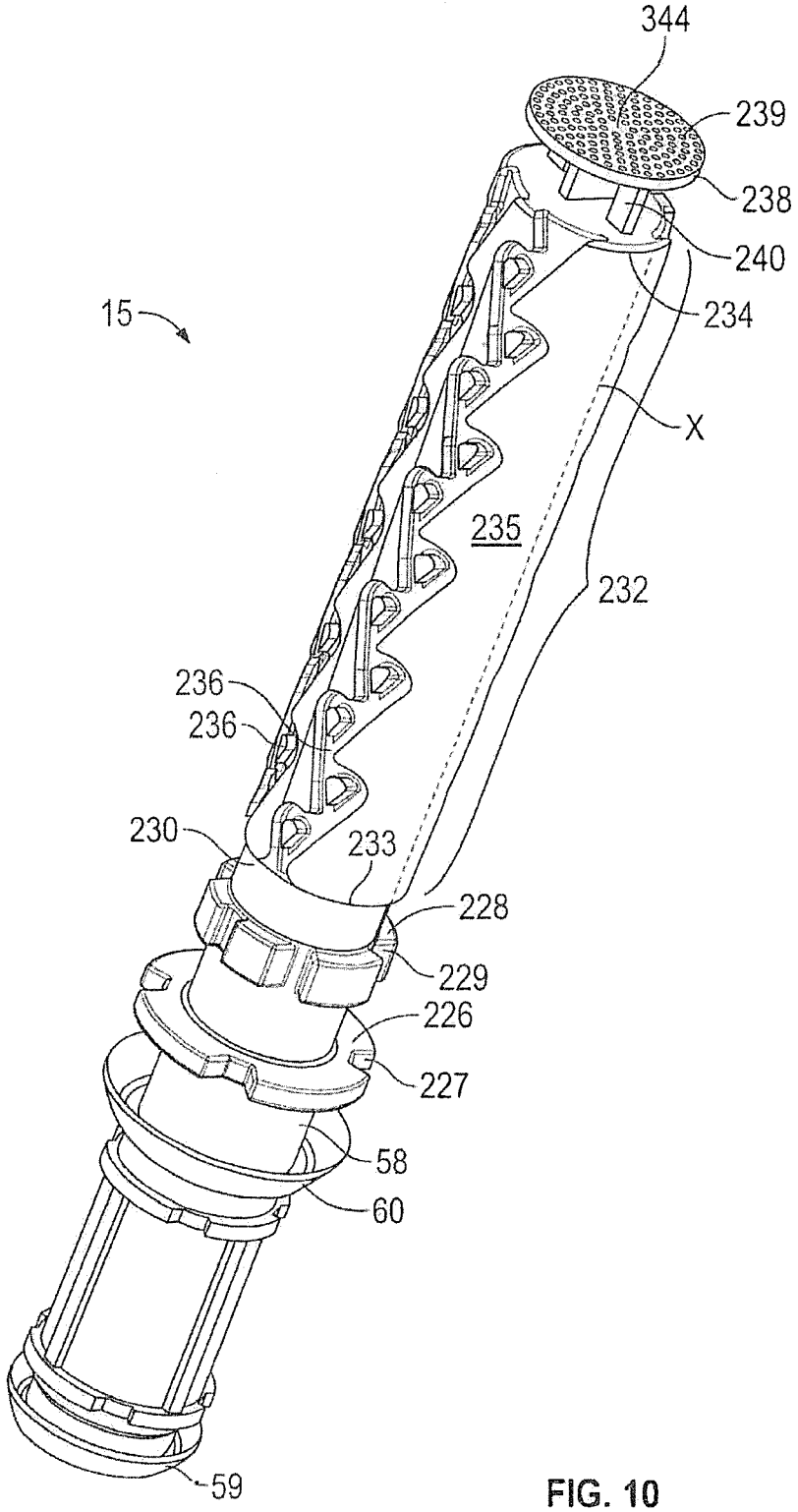
FIG. 10 is a pictorial view of the piston-forming element of the foaming pump assembly of FIG. 4 as seen from above.
Figure 11:
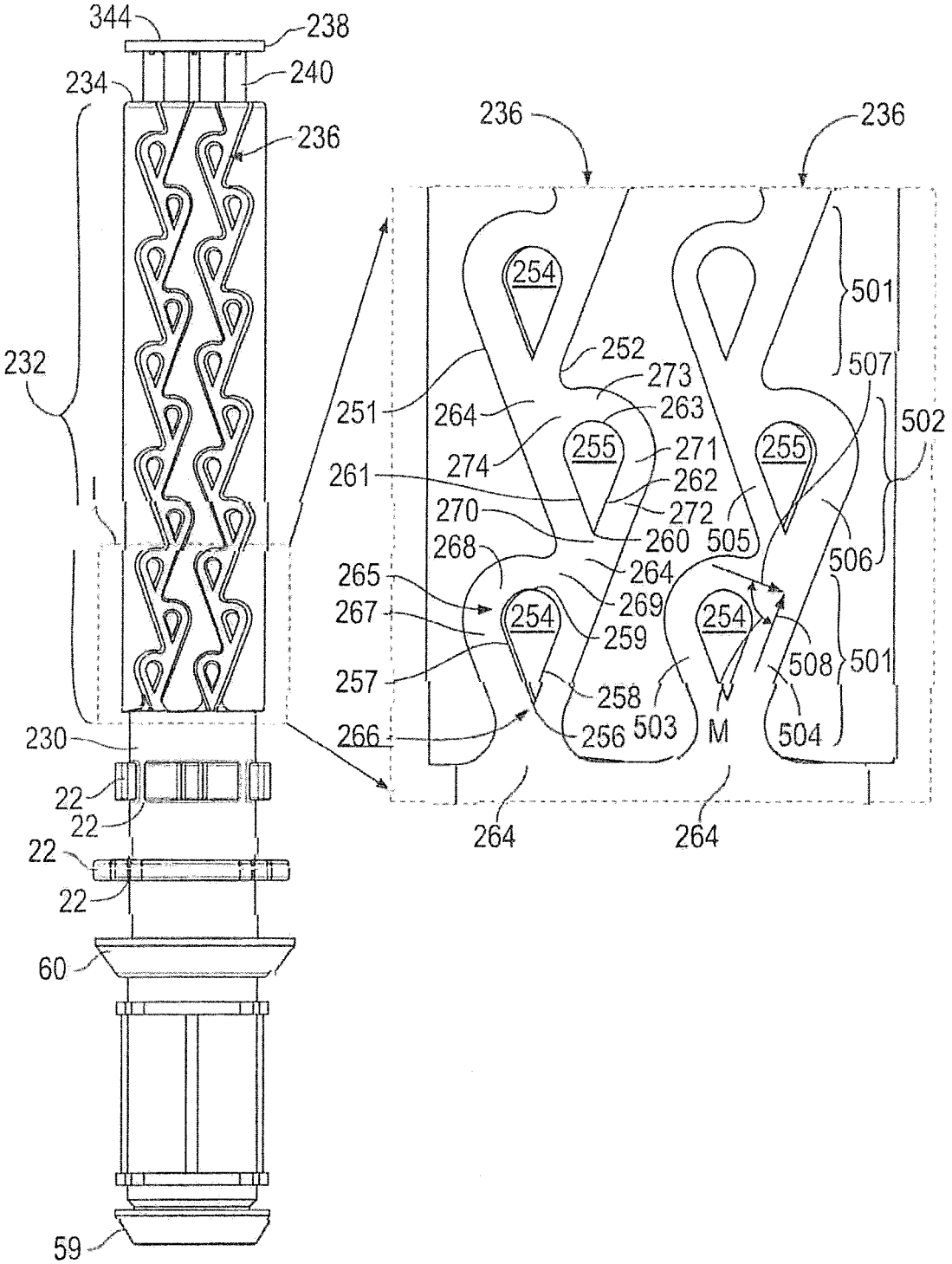
FIG. 11 is a front view of the piston-forming element shown in FIG. 10 with an inlet portion I in broken lines enlarged.

FIGS. 10 and 11 illustrate the piston-forming element 15 which has a central stem 58 from which there extends an inner disc 59 and an intermediate disc 60. Axially outwardly from the intermediate disc 60, the central stem 58 carries a locating divider flange 226 having axially extending openings 227 therethrough permitting fluid flow axially therethrough. The central stem 58 carries a locking flange 228 having axial openings 229 permitting fluid flow axially therethrough. Axially inwardly from the locking flange 228, the diameter of the stem 58 is reduced as an annular distribution groove 230. Axially outwardly of the annular distribution groove 230, the stem 58 forms an elongate plug member 232 extending axially between an axially inwardly first plug end 233 and an axially outwardly second plug end 234. The plug member 232 has a plug outer wall surface 235 which is circular in any cross-section normal the axis 31 and is preferably cylindrical between the first plug end 233 and the second plug end 234. Four identical plug channelways 236 are provided in the plug outer wall surface 235. Each plug channelway 236 is cut radially inwardly into the plug member 232 from the plug outer wall surface 235 and is open radially outwardly along its length to the plug outer wall surface 235. Each of the plug channelways 236 is open axially at the first plug end 233 and at the second plug end 234.

The piston member P is coaxially slidable relative to the piston chamber-forming body 14 between a retracted position as seen in FIG. 5 and an extended position as seen in FIG. 6. In a cycle of operation, the piston member P including the piston-forming element 15 is moved relative to the piston chamber-forming body 14 from the extended position to the retracted position in a retraction stroke and from the retracted position to the extended position in a withdrawal stroke. During a cycle of operation, the inner disc 59 on the piston-forming element 15 is maintained within the inner chamber 52 and the intermediate disc 60 on the piston-forming element 15 is maintained within the outer chamber 51. The inner disc 59 and the inner chamber 51 form a first one-way liquid valve 159 permitting liquid flow merely outwardly therebetween. The inner disc 59 has an elastically deformable edge portion for engagement with the inner wall of the inner chamber 52. The inner disc 59 is biased outwardly into the wall of the inner chamber 52 to prevent fluid flow axially inwardly therepast, however, the inner disc 59 has its end portion deflect radially inwardly away from the wall of the inner chamber 52 to permit fluid flow axially outwardly therepast.

The intermediate disc 60 has an elastically deformable edge portion which engages the side wall of the outer chamber 51 to substantially prevent fluid flow axially inwardly therepast yet to deflect away from the side wall of the outer chamber 51 to permit fluid to pass axially outwardly therepast. The intermediate disc 60 with the outer chamber 52 form a second one-way liquid valve 160 permitting liquid flow merely outwardly therebetween.

An annular fluid compartment 66 is defined in the fluid chamber 50 radially between the center tube 33 and the piston-forming element 15 axially between the inner disc 59 and the intermediate disc 60 with a volume that varies in a stroke of operation with axial movement of the piston-forming element 15 relative to the piston chamber-forming body 14. The fluid compartment 66 has a volume in the extended position greater than its volume in the retracted position. Operation of the liquid pump 26 is such that in a retraction stroke, the volume of the fluid compartment 66 decreases creating a pressure within the fluid compartment 66 which permits fluid flow radially outwardly past the inner disc 59 and axially outwardly past the intermediate disc 60 such that fluid is discharged axially outwardly past the intermediate disc 60 through openings 81, best seen on FIG. 14, and into the foam generator 80. In a withdrawal stroke, the volume of the liquid compartment 66 increases such that with the intermediate disc 60 preventing fluid flow axially outwardly therepast, the increasing volume in the liquid compartment 66 between the inner disc 59 and the intermediate disc 60 draws fluid from the reservoir 12 axially outwardly past the inner disc 59 from the reservoir 12.

Figure 8:
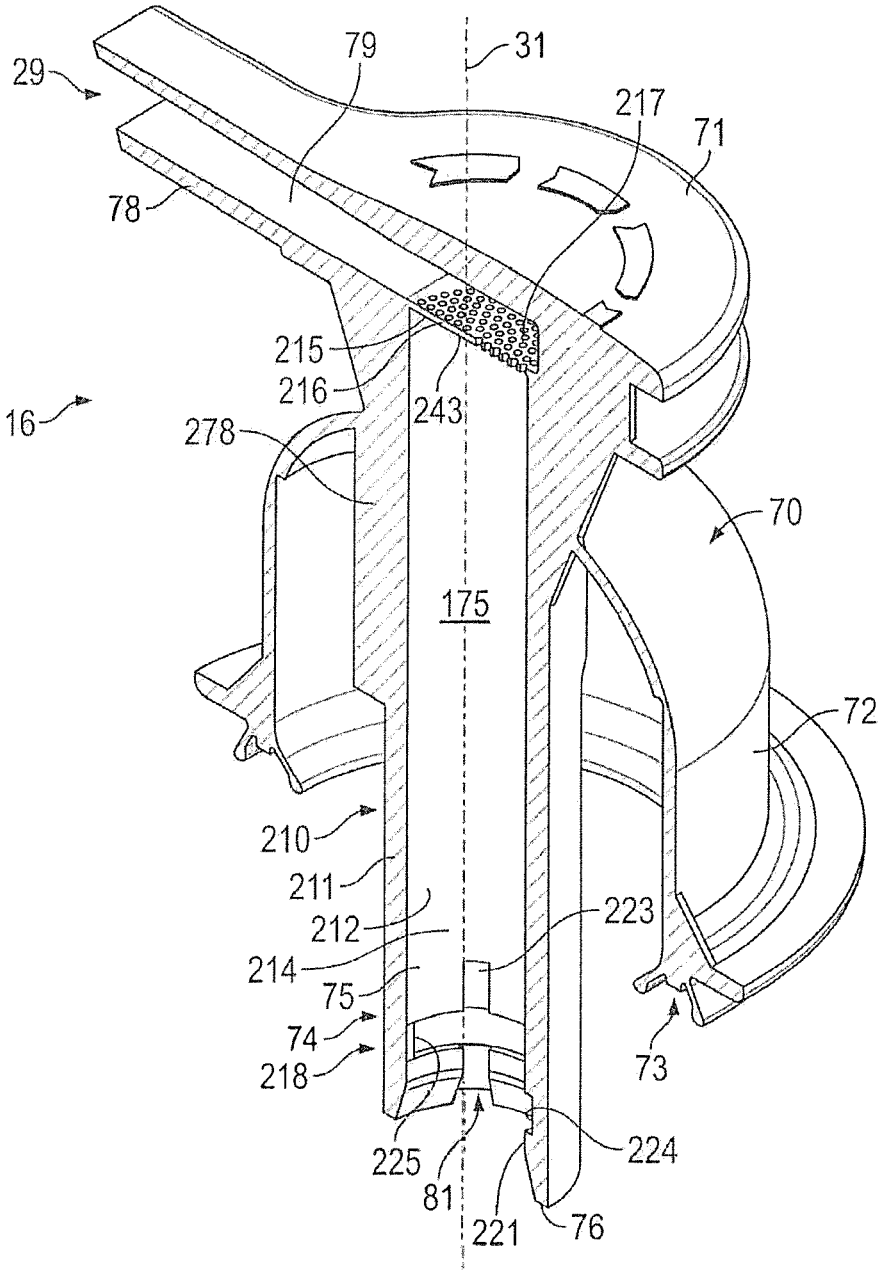
FIG. 8 is a cross-sectional pictorial view of the diaphragm-forming component of FIG. 4 as seen from above.

As best seen on FIG. 8, the diaphragm-forming component 16 comprises a flexible annular diaphragm member 70 having at an axially outer end an end cap 71 and an annular flexible diaphragm side wall 72 that extends axially inwardly to an annular first end 73 of the diaphragm member 70. The diaphragm member 70 also includes a central tube 74 that extends coaxially about the axis 31. The annular first end 73 of the diaphragm member 70 engages on an annular seat arrangement 99 provided on the piston chamber-forming body 14 and formed by the annular bridge flange 34 with its upper surface 39, the outer tube 36 with its locating surface 40 and the return flange 38 with its axially inwardly directed stopping surface 41. The central tube 74 has a central bore 75 therein open axially inwardly at a bore inner end 76 and at a bore outer end 77.

The diaphragm member 70 includes a discharge tube 78 that extends radially outwardly on the end cap 71 defining therein a discharge passageway 79 and providing communication from the central bore 75 outwardly to the dispensing or discharge outlet 29 open to the atmosphere. A plurality of openings 81 are provided through the side wall 72 of the central tube 74 to provide communication radially through the central tube 74 proximate the bore inner end 76.

The piston member P is provided by the piston-forming element 15 and the diaphragm-forming component 16 fixedly secured together against removal under normal operation of the pump assembly 11 with the central stem 58 received in a frictional force-fit relation within the central tube 74. With the piston-forming element 15 and the diaphragm-forming component 16 fixed together, the piston-forming element 15 is coaxially engaged within the fluid chamber 50 and the diaphragm-forming component 16 is engaged with the piston chamber-forming body 14 with the annular first end 73 of the diaphragm member 70 coupled to the piston chamber-forming member 14 against removal and forming a seal with the annular seal arrangement 99 preventing flow therebetween into and out of the annular air compartment 68 of the air pump 28.

The diaphragm-forming component 16 is preferably formed as an integral member from a resilient material having an inherent bias such that the diaphragm side wall 72 will assume an expanded inherent condition as shown in FIGS. 1 to 5. The side wall 72 is deflectable from the inherent condition with the inherent bias attempting to return the diaphragm side wall 72 to its inherent condition. The air pump 28 is formed with the annular diaphragm member 70 coaxially about the piston-forming element 15 spanning between an axial outer end of the piston-forming element 15 and the piston chamber-forming body 14 to define the annular air compartment 68 therebetween having a variable volume. The diaphragm member 70 sealably engages with the piston-forming element 15 by reason of the axially outer end of the central stem 58 being engaged within the central bore 75 of the center tube 74 of the diaphragm member 70 in a fixed manner.

With the piston member P formed by the piston-forming element 15 and the diaphragm-forming component 16 coupled to the piston chamber-forming body 14 as shown in FIGS. 5 and 6, the air compartment 68 is defined as an annular space axially between the end cap 71 of the diaphragm-forming component 16 and the bridge flange 34 of the piston chamber-forming body 14 and radially between the diaphragm side wall 72 and the central tube 74. The air compartment 68 is in communication with the openings 81. The air compartment 68 has a volume which varies with displacement of the diaphragm member 70 between the extended position of FIG. 5 and the retracted position of FIG. 6.

In use of the foam dispenser 10 as shown in FIG. 2, with the reservoir 12 sitting a support surface 100, a user with one hand may apply downwardly directed force 101 onto the end cap 71 the diaphragm-forming component 16 as indicated by the schematic arrow so as to dispense fluid 13 mixed with air as a foam out of the discharge outlet 29 with the movement of the piston member P formed by the diaphragm-forming component 16 and the piston chamber-forming body 14 relative to the piston chamber-forming body 14 from the extended position of FIG. 5 to the retracted position of FIG. 6. Under the application of the axially directed force 101, the diaphragm side wall 72 deflects from the expanded position of FIG. 5 to the compressed and deflated position in FIG. 6 and with such deflection of the annular side wall 72, the volume of the air compartment 68 reduces forcing air from the air compartment 68 through openings 81 and, hence, to the foam generator 80. Such discharge of air via the air pump 28 to the foam generator 80 is simultaneous with the discharge of the fluid 13 via the liquid pump 26 to the foam generator 80 such that the discharged liquid and air will simultaneously be passed through the foam generator 80 and, hence, via to the discharge passageway 79 to discharge as foam out the discharge outlet 29. On release of the manually applied force 101, from the end cap 71, the inherent bias of the diaphragm side wall 72 urges the diaphragm side wall 72 to assume its inherent configuration as shown in FIG. 5 and, in doing so, diaphragm member 70 returns the piston-forming element 15 to the extended position as shown in FIG. 5. The inherent resiliency of the diaphragm side wall 72 acts, in effect, as a piston spring member to bias the piston-forming element 15 to the extended position of FIG. 5 relative to the piston chamber-forming body 14. In movement in the withdrawal stroke from the position of FIG. 6 to the position of FIG. 5, the volume of the air compartment 68 increases drawing atmospheric air into the air compartment 68 via the discharge outlet 29, the discharge passageway 79, the foam generator 80 and the openings 81.

Figure 14:
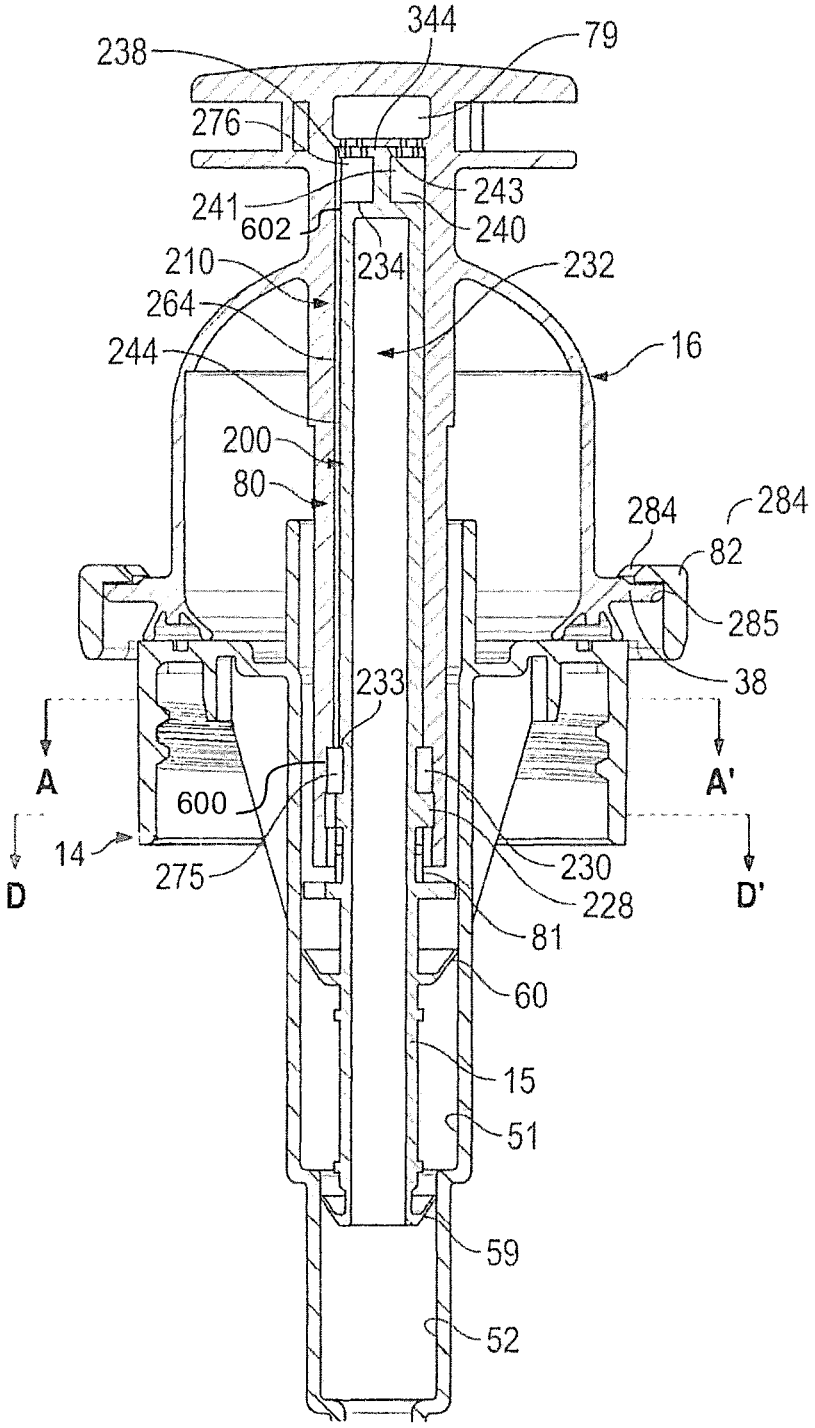
FIG. 14 is a cross-sectional side view of the foaming pump assembly of FIG. 1 the same as the section line through the piston-chamber forming body as in FIG. 3 but through the piston-forming element and the diagram forming component along section line B-B' in FIG. 13.

The foam generator 80 includes notably a valvular conduit 200 seen on FIG. 14 including an axially extending plug passageway 244 defined within the piston member P radially between a sleeve member 210 of the diaphragm forming component 16 and the plug member 232 of the piston-forming element 15.

Figure 9:
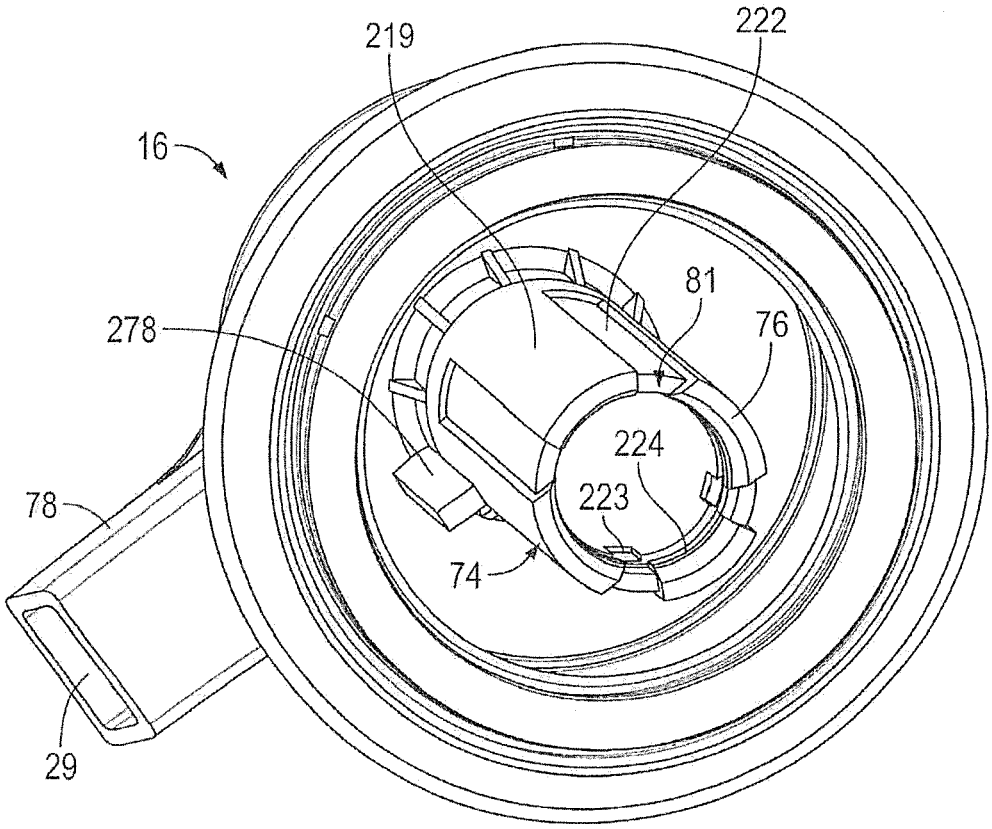
FIG. 9 is a pictorial view of the diaphragm-forming component of FIG. 8 as seen from below.

Reference is made to FIGS. 8 and 9 showing the diaphragm-forming component 16. The diaphragm-forming component 16 comprises a flexible annular diaphragm member 70 having the annular flexible diaphragm 72 that extends axially inwardly to the annular first end 73 that engages on the annular seat arrangement 99 provided on the piston chamber-forming body 14 to, on one hand, form the optional air relief valve 30 to permit atmospheric air to flow from the atmosphere into the interior of the reservoir to relieve any vacuum that may develop within the reservoir and, secondly, to form the annular seal 102 preventing flow between the diaphragm member 70 and the annular seat arrangement 99 into and out of the annular air compartment 68 of the air pump 28 in the same manner as is the case with the first embodiment.

As best seen in FIG. 8, the diaphragm-forming component includes the central tube 74 having the central bore 75. The central tube 74 forms the elongate sleeve member 210 having a sleeve side wall 211 with a sleeve inner wall surface 212 that is circular in any cross-section, normal the longitudinal axis 31. In this regard, the sleeve side wall 211 is preferably cylindrical. The sleeve side wall 211 extends from a first sleeve end 214 to a second sleeve end 215 defining a portion of the central bore 75 to be a sleeve bore 175 within the sleeve member 210 extending along the axis 31.

Figure 16:
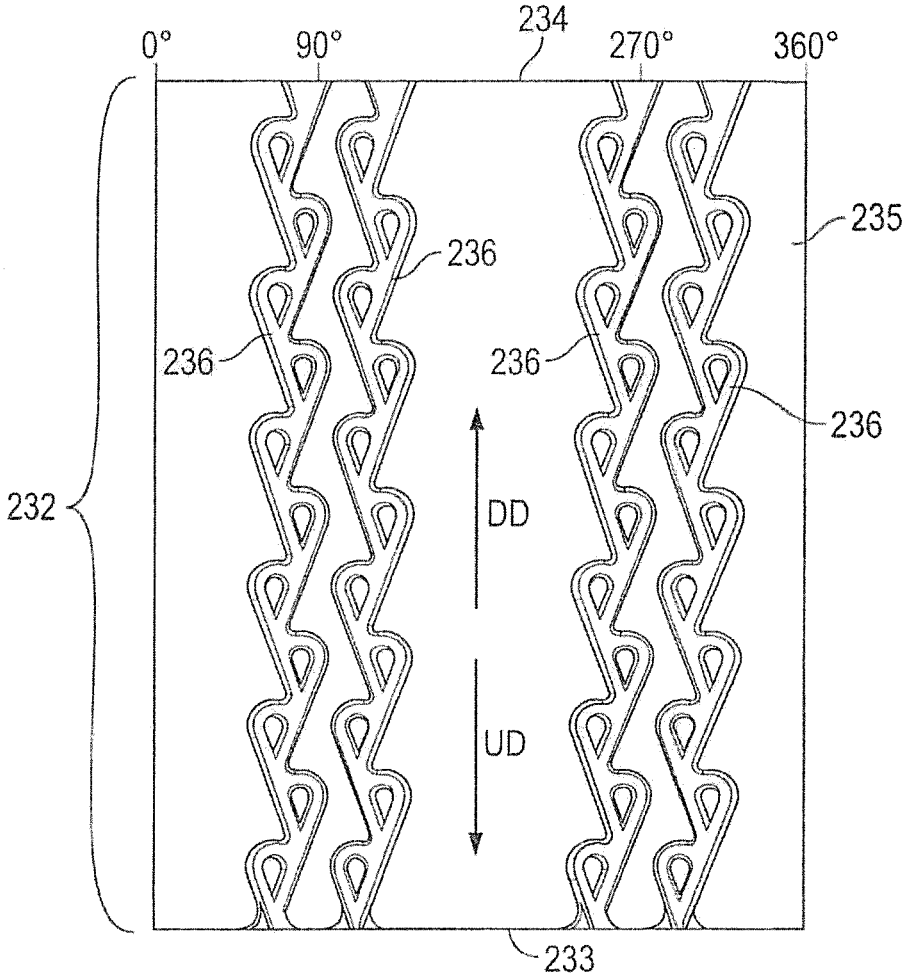
FIG. 16 shows an orthographic projection of a plug member of the piston-forming element of FIG. 10 as seen viewed radially normal to the center axis at each circumferential point about the axis starting at 0 degrees at the broken line X on FIG. 10 and ending at 360 degrees at the same broken line X on FIG. 10.

Reference is made to FIG. 16 which shows an orthographic projection of the plug member 232 axially between the first plug end 233 and the second plug end 234 as seen viewed radially normal to the center axis 31 at each circumferential point about the axis 31 starting at the broken line X on FIG. 10 and extending 360 degrees from one edge indicated as 0 degrees to a second edge indicated as 360 degrees also representing the broken line X on FIG. 10. As seen on FIG. 16, each of the plug channelways 236 extends axially from the first plug end 233 to the second plug end 234. Each of the plug channelways 236 is spaced circumferentially from adjacent plug channelways 236 about the plug member 232 in the plug outer wall surface 235. On FIG. 16, a downstream direction is indicated by the arrow DD and an upstream direction is indicated by the arrow UD. A first pair of the channelways 236 are centered about an axially extending line with a 90 degree position and the second set of plug channelways 236 are centered about an axial line at a 270 degree location. Such locations facilitate the injection molding of the plug channelways 236 in the plug member 232 formed between two portions of a mold which are withdrawn from each other normal the axis 31 at the 90 degree and 270 degree locations.

The plug member 232 is securely fixedly coupled to the sleeve member 210 within the sleeve bore 175 yet permits axial flow therebetween of air and fluid in the valvular conduit 200 via the plug passageways 244 defined between the sleeve inner wall surface 212 and the plug channelways 236 in the plug member 232.

Figure 13:
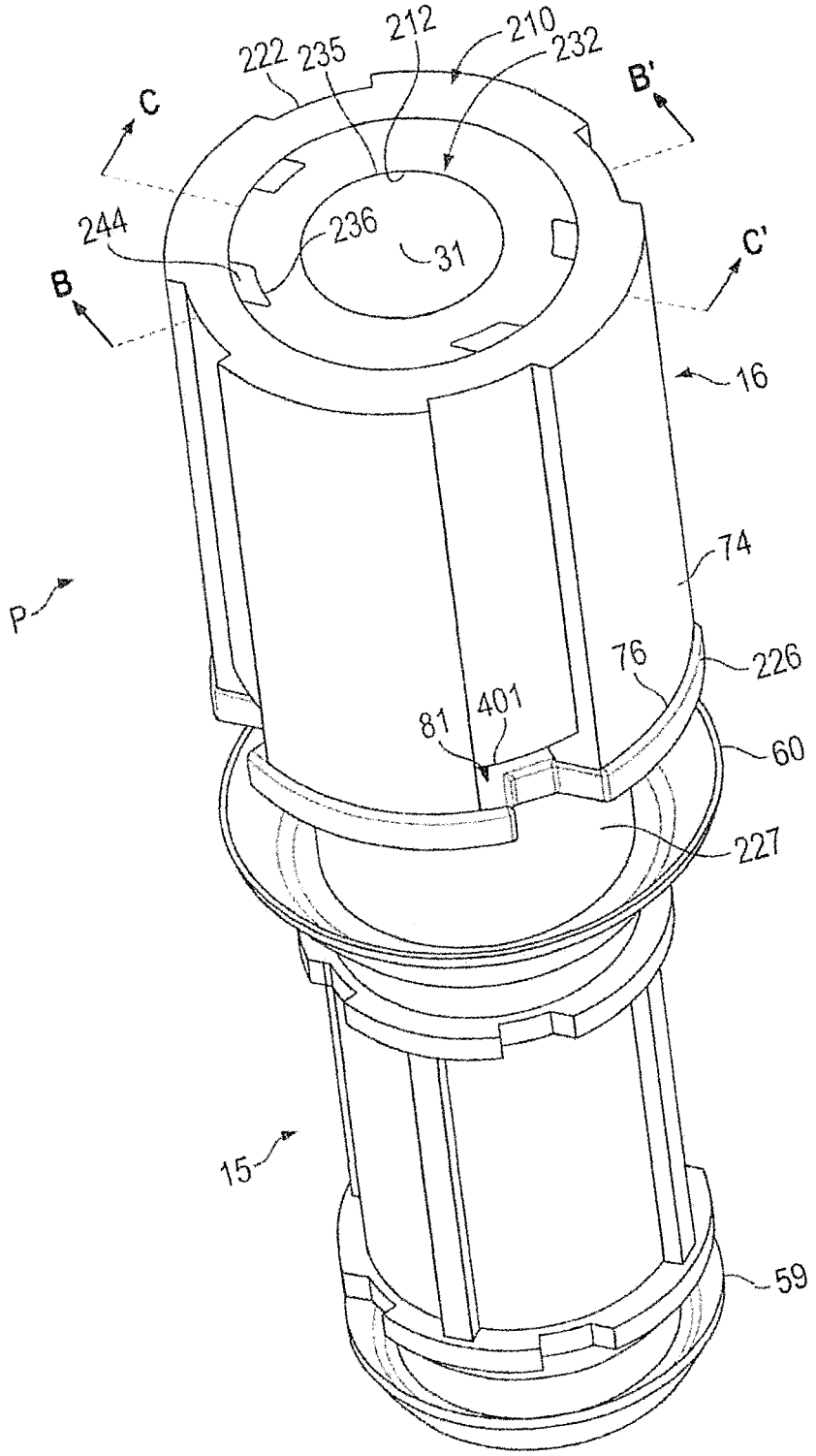
FIG. 13 is a cross-sectional pictorial view along section line A-A' in FIG. 12.

As can be seen in FIG. 13 with the plug member 232 received coaxially within the sleeve member 210 in the sleeve bore 175, the plug outer wall surface 235 is in opposed close opposition or engagement with the sleeve inner wall surface 212 and defines between each plug channelway 236 and the sleeve inner wall surface 235, the plug passageway 244 for flow of fluid. Four such plug passageways 244 are provided with each providing for fluid flow longitudinally between an axially inner end of the plug passageway 244 opening axially inwardly at the first plug end 233 into the annular distribution groove 230 and an axially outer end of the plug passageway 244 at the second plug end 234 opening axially outwardly into an annular mixing cavity 240. As can also be seen in FIG. 13 other than where the plug channelways 236 are provided, the cylindrical plug outer wall surface 235 is in opposed close opposition or engagement with the cylindrical sleeve inner wall surface 212 so as to prevent any substantial air or fluid flow therebetween other than through the plug passageways 244.

FIG. 5 shows a cross-section piston-forming element 15 and the diaphragm-forming component 16 along section line C-C' in FIG. 13 which does not pass through any of the plug channelways 236. FIG. 14 is a cross-sectional side view through the pump assembly 11 having similarities to FIG. 5. In FIG. 14, the piston member P is shown as cross-sectioned along section line B-B' in FIG. 13 and thereby axially and longitudinally through one of the four plug channelways 236. In FIG. 14, the piston chamber-forming member is shown in a cross-section through the axis 31 normal to the cross-section in FIG. 5.

As seen in FIGS. 11 and 13, each plug channelway 236 is defined circumferentially between a left side wall 251 and a right side wall 252 and radially between the sleeve inner wall surface 212 and a radially outwardly directed circumferential inner wall 253 lying in a plane of a cylindrical surface disposed about the axis 31 such that the plug channelway 236 has an approximately constant radial extent relative to the axis 31 at any location in the plug channelway 236. Between the left side wall 251 and the right side wall 252, left divider vanes 254 and right divider vanes 255 are provided extending from the inner wall 253 to the plug outer wall surface 235. Each left divider vane 254 has an axially inwardly directed apex 256 from which a left side wall 257 and a right side wall 258 diverge axially outwardly to an arcuate end wall 259 directed axially outwardly. Similarly, each right divider vane 255 has an axially inwardly directed apex 260 with a left side wall 261 and a right side wall 262 diverging away from each other to merge with an arcuate end wall 263.

For flow from the first plug end 233 towards the second plug end 234, all flow is initially entirely within an upstream portion of the main channel 264 defined circumferentially between the left side wall 251 and the right side wall 252. The flow through the main channel 264 is split by the left divider vane 254 into two portions, each to flow through a separate channel. A first channel is a left side channel 265 which extends to the left of the left divider vane 254 between the left divider vane 254 and the left side wall 251 while a second channel is a remaining portion of the main channel 264 defined to the right of the left divider vane 254 between the left divider vane 254 and the right side wall 252. The plug passageway 244 may be considered to have a left fork 266 at the apex 256 where the left side channel 265 splits from the main channel 264. The left side channel 265 is shown to extend as a substantially linear portion 267 past the left side wall 257 of the left divider vane 254 to where the left side channel 265 is provided with an arcuate return portion 268 that directs flow towards the right and, preferably, at least partially, axially inwardly and into a left merge 269 where the left side channel 265 merges with the remaining portion of the main channel 264 forming after the left merge 269 a downstream portion of the main channel 264 defined circumferentially between the left side wall 251 and the right side wall 252. Axially outwardly of the left merge 269, all flow is within another upstream portion of the main channel 264 between the left side [all] *wall* 251 and the right side wall 252 until the flow engages the right divider vane 255 where the apex 260 of the right divider vane 255 splits flow at a right fork 270 into two portions each to flow through a separate channel. A first channel is a right side channel 271 to the right of the right divider vane 255 while a second channel is a remaining portion of the main channel 264 extending to the left of the right divider vane 255. The right side channel 271 is defined between the right side wall 262 of the right divider vane 255 and the right side wall 252. The right side channel 271 extends as a substantially linear portion 272 past the right side wall 262 of the right divider vane 255 to where the right side channel 271 is provided with an arcuate return portion 273 spaced from the arcuate end wall 263 of the right divider vane 255 which directs flow towards the left and, preferably, at least partially axially inwardly and into a right merge 274 where the right side channel 271 merges with the remaining portion of the main channel 264 forming after right merge 274 another downstream portion of the main channel 264 defined circumferentially between the left side wall 251 and the right side wall 252. Axially outwardly of the right merge 274, all flow is within another upstream portion of the main channel 264 between the left side wall 251 and the right side wall 252 until the flow engages the next left divider vane 254.

A left mixing portion 501 is defined in the plug passageway 244 by the combination of: the upstream portion of the main channel 264; the left divider vane 254; the left fork 266; as a first channel 503, the left side channel 265; as a second channel 504, the remaining portion of the main channel 264; the left merge 269; and a downstream portion of the main channel 264. A right mixing portion 502 is defined in the plug passageway 244 by the combination of: the upstream portion of the main channel 264; the right divider vane 255: the right fork 270: as a first channel 505, the right side channel 271; as a second channel 506, the remaining portion of the main channel 264; the right merge 274 and a downstream portion of the main channel 264. The left mixing portion 501 alternate with the right mixing portions 502 providing in series successive mixing portions, each defined in the plug passageway 244 by the combination of: the upstream portion of the main channel 264; a divider vane; a fork; a first channel; a second channel; a merge; and a downstream portion of the main channel 264. The plug passageway interior walls are configured to provide a plurality of such mixing portions in series within the plug passageway. Each mixing portion is configured to split flow downstream from the upstream main channel into the first channel and the second channel separate from the first channel. The first channel merges with the second channel into a downstream main channel with the first channel directing flow through the first channel where the first channel merges with the second channel in a first direction and the second channel where the second channel merges with the first channel directing flow through the second channel in a second direction different than the first direction. The second direction is different from the first direction to mix the flow through the first channel and the flow through the second channel on the first channel merging with the second channel. The mixing portions are configured so that flow downstream provides a downstream resistance to flow downstream and flow upstream opposite to flow downstream provides an upstream resistance to flow that is less than the downstream resistance to flow. Preferably, the second direction indicated by the arrow 507 on FIG. 11 and the first direction indicated by the arrow 508 form a merge angle M also shown on FIG. 11 therebetween of at least 90 degrees, more preferably greater than 90 degrees, so that flow downstream provides a downstream resistance to flow and flow upstream opposite to flow provides an upstream resistance to flow that is less than the downstream resistance to flow. Preferably, the second direction and the first direction form a merge angle therebetween selected from the group consisting of: greater than 90 degrees, at least 120 degrees, and of at least 150 degrees. Preferably, the interior walls are configured to permit the relatively free passage of fluid upstream but to subject the fluid to rapid reversals of direction when the fluid is forced through the plug passageway 244 downstream to thereby increase resistance to movement of the fluid through the plug passageway 244 downstream compared to resistance to movement of the fluid upstream.

As illustrated in FIG. 11, alternate left divider vanes 254 and right divider vanes 255 are provided such that the main channel 264 has alternatively left side channels 265 and right side channels 271 which split flow from the main channel 264 and return flow to the main channel 264. In flow downstream from the first plug end 233 towards the second plug end 234, at each left merge 269 where flow from each left side channel 265 merges with flow of the main channel 264, and at each right merge 273 where flow from each right side channel 271 merges with flow of the main channel 264, there is a mixing of the flows. Such mixing is advantageous for mixing of the air and the fluid passing through the plug passageways 244. Preferably, the velocity of the flow downstream at each left merge 269 and each right merge 273 creates turbulence that assists in such mixing so as to enhance the mixing of air and fluid and generate a foam of the air and the fluid. The merger of the flow downstream through the plug passageway 244 between the left side channel 271 and the main channel 264 and the right side channel 271 and the main channel 264, particularly when turbulence is created, increases the resistance to downstream flow of the fluid axially outwardly, that is, flow from the first plug end 233 to the second plug end 234.

In contrast, with downstream flow through the plug passageway 244 that is axial outward flow through the plug passageway 244 from the first plug end 233 to the second plug end 234, in upstream flow through the plug passageway 244, that is axial inward flow from the second plug end 234 towards the first plug end 233, the upstream flow is typically principally through the main channel 264 with the flow effectively bypassing the left side channel 265 and the right side channel 271 and thus upstream flow is relatively freely with less resistance to downstream flow. As can be seen in FIG. 11, in upstream, axial inward flow from the second plug end 234 towards the first plug end 233, the upstream flow is initially through the main channel 264 and the upstream flow on engaging the arcuate end wall 259 of the left divider vane 254 tends to direct the upstream flow into the main channel 264 and not into the left side channel 265. Similarly, on upstream, axial inward flow through the main channel 264 engaging the arcuate end wall 263 of the right divider vane 255, the upstream flow tends to be directed to continue in the main channel 264 rather than into the right side channel 271. The upstream flow from the second plug end 234 to the first plug end 233 is to be considered flow in a primary direction and the downstream flow from the first plug end 233 to the second plug end 234 may be considered flow in a secondary direction opposite to the primary direction. The plug passageway 244 is defined between the interior walls to permit the relatively free passage through the plug passageway 244 upstream in the primary direction but to subject flow to reversals of direction when the fluid is forced through the plug passageway 244 downstream, in the secondary direction opposite to the primary direction to thereby increase mixing and downstream resistance to flow through the plug passageway 244 in the secondary direction compared to upstream resistance to flow through the plug passageway 244 in the primary direction. Downstream flow through the plug passageway 244 in the secondary direction in subjects the flow to splitting and flow through side channels to merge downstream with the flow through the main channel. At each merger, the split flow moves in a different direction than the flow through the main channel which induces mixing at the merger preferably inducing turbulence and with such mixing enhancing the generation of foam.

In accordance with the preferred embodiments of the present invention, at the left merge 269 the direction of downstream flow from the left side channel 265 is at a left merge angle approximately 90 degrees to the downstream flow through the main channel 264 and similarly at the right merge 273, the direction of downstream flow from the right side channel 271 is at a right merge angle approximately normal to the downstream flow through the main channel 264. The left merge angle and the right merge angle can be selected so as to provide for a desired interference between the downstream flow in the main channel 264 at each merger as can be advantageous, on one hand, to provide advantageous mixing at the merger and, on the other hand, to provide advantageous resistance to downstream flow.

As will be apparent to a person skilled in the art, the mixing and the resistance to flow which will occur due to flow through each plug passageways 244 will be dependent on factors including the nature of the material being passed through the passageway 244, that is, the nature of the liquid from the reservoir, the relative proportions of the air and the fluid from the reservoir, their temperatures and the speed or velocity of the flows of each. The speed or velocity of the downstream flows will be, to some extent, a function of the volume of the fluid from the reservoir and volume of the air that are injected into the plug passageway 236 at the first plug end 233 with time as well as the cross-sectional areas of the plug channelway 244 along its length recognizing that with increased volumetric discharge into the first plug end 233 of the plug passageway 244, the resistance to downstream flow will increase. By reducing the merge angles as, for example, from 90 degrees to, say, 60 degrees or less, the resistance to flow in the secondary direction can be reduced albeit with some reduction of mixing and turbulence at each merger. By increasing the merge angles from 90 degrees to say 120 degrees, the resistance to downstream flow at each merger can increase the mixing and turbulence at each merger. The mere splitting of the downstream flow at each fork into a side channel and the main channel which is then combined at each merger, in effect, provides a repeated splitting and mixing action which is advantageous for mixing of the air and fluid. The left merge angle and the right merge angle may each be increased from 90 degrees as, for example, to 150 degrees or to approach 180 degrees. When the angles are 180 degrees, then the downstream flow from the left side channel 265 and the right side channel 271 is approximately opposite to the flow through the main channel 264 so as to increase the resistance to fluid flow downstream and with such resistance at sufficiently high volumetric flow rates can, depending on the ratio of volumetric flow through a side channel at each merger compared to that though the main channel, substantially prevent downstream flow of the air and the fluid. Providing the resistance to flow downstream to substantially increase with an increase in the pressure of the air and the volume of the fluid injected with time into the first plug end 233 can be advantageous so as, for example, to act as a dampening mechanism so as to prevent in the case of the application of an excess force 101 downwardly onto the end cap 71 to resist undue downward movement of the piston-forming element 15 and the diaphragm-forming component 16 relative to the piston chamber-forming body 14 as may be advantageous, for example, to prevent the undesired high velocity discharge of the air and/or the fluid from the discharge outlet 29.

In the preferred embodiment, as shown in FIG. 11, the cross-sectional area of each first channel 503 and 505 is shown to be substantially the same as the cross-sectional area of each second channel 504 and 506 and the sum of the cross-sectional area of each of the first channels and the second channels is shown to be approximately equal to the cross-sectional area of the main channel 264 all downstream flow axially through the main channel. This is not necessary and by selecting the relative proportion of the cross-sectional area of each first channel and second channel to the main channel 264, the extent to which there is an increase in resistance to flow downstream and mixing may be adjusted. As well, the cross sectional area of each of the channels may change with location downstream as, for example, increasing with distance downstream.

As seen in FIG. 8, at the second sleeve end 215, the sleeve member 210 includes a radially extending sleeve end wall 216 closing the sleeve bore 175 at the second sleeve end 215 but for an array of end wall openings 217 axially through the sleeve end wall 216. The end wall openings 217 provide for communication from the sleeve bore 75 into the discharge passageway 79 of the discharge tube 78 and hence to the discharge outlet 29. Axially inwardly from the first sleeve end 214 between the first sleeve end 214 and the bore inner end 76, there is provided a sleeve coupling mechanism 218 for securely fixedly coupling the center tube 74 and its sleeve member 210 to the piston-forming element 15 yet permitting axial flow therebetween of air and fluid.

Figure 23:
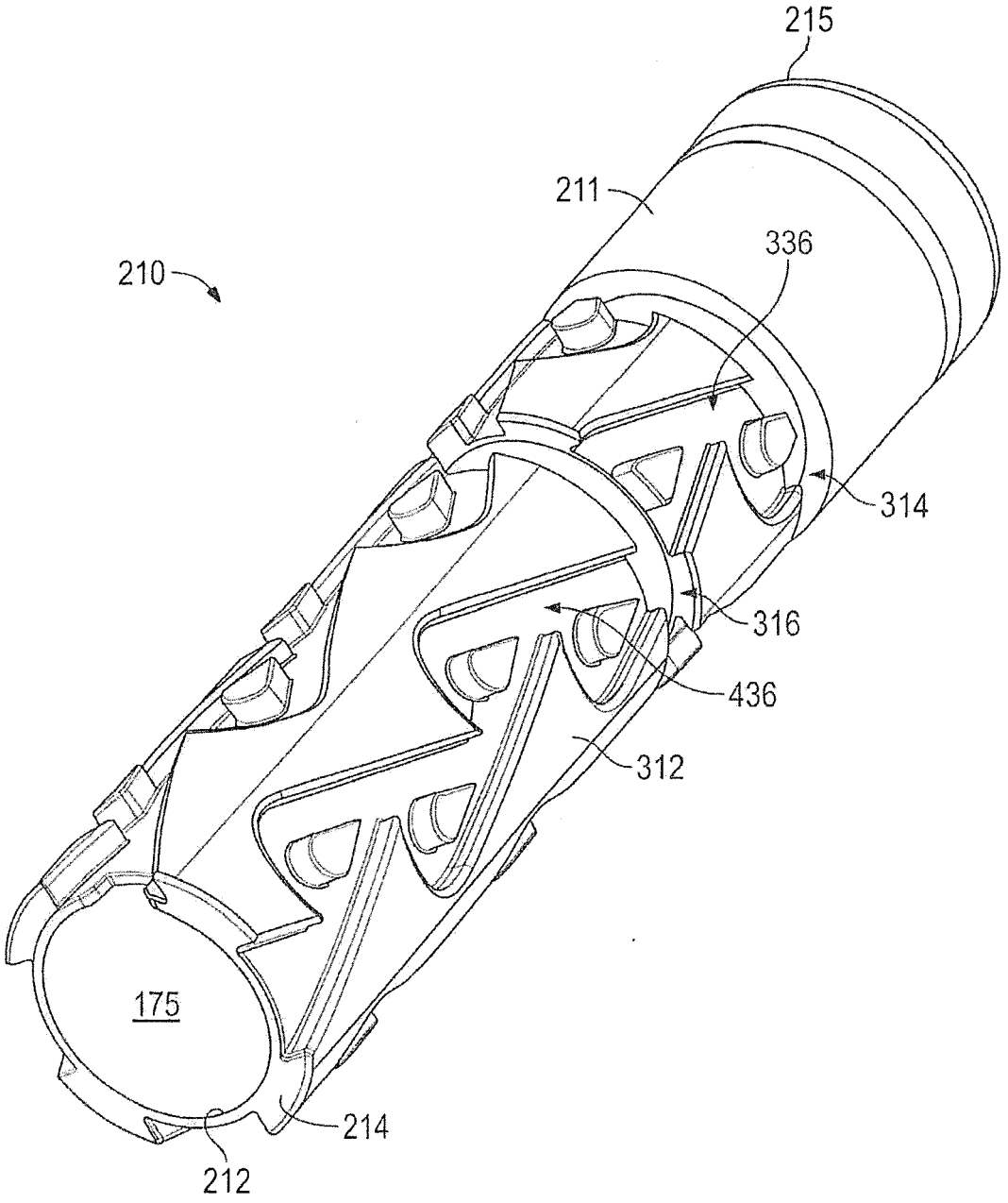
FIG. 23 is a perspective view of a sleeve member of the foaming pump assembly as seen in FIG. 21.

Referring to FIG. 9, the central tube 74 has on as radially outwardly directed outer surface 219 a number of circumferentially spaced axially extending exterior channels 222 that extend axially inwardly to openings 81. The openings 81 each provide communication radially through the central tube 74 proximate the bore inner end 76. At circumferentially spaced locations corresponding to the locations of the exterior channels 222, the central tube 74 has on its radially inwardly directed surface 221 internal channels 223 that extend axially outwardly from the openings 81. The inner surface 221 of the central bore 75 has an annular locking groove 224 extending circumferentially but for where a spline key 225 extends radially inwardly as best seen in FIGS. 13 and 23.

As seen in FIGS. 10 and 11, axially outwardly from the second plug end 234, the plug member 232 carries an end flange 238 having an array of end flange openings 239 extending axially therethrough. The end flange 238 is coupled to the center plug member 232 by axially extending support beams 240 which effectively define between the second plug end 234 and the end flange 238, an annular mixing cavity 241.

As seen in FIG. 8, the sleeve end wall 216 has an end wall inner surface 243 directed axially inwardly into the sleeve bore 175 with the end wall openings 217 passing through the end wall inner surface 243 with each opening 217 providing a respective cross-sectional area for fluid flow in the end wall inner surface 243.

As seen in FIG. 10, the end flange 238 of the plug member 232 has an end flange outer surface 344 directed axially outwardly. The end flange openings 239 pass through the end flange outer surface 344 with each opening 239 providing a respective cross-sectional area for fluid flow in the end flange outer surface 344.

As can be seen in FIG. 14, the end flange outer surface 344 is engaged with the end wall inner surface 243 with each of the end flange openings 239 in overlapping registry with a respective one of the end wall openings 217 providing at the interface of the end flange outer surface 344 and the end wall inner surface 243 a cross-sectional area for fluid flow less than both (1) the cross-sectional areas for fluid flow of the respective end flange openings 239 in the end flange outer surface 344 and (2) the cross-sectional area for fluid flow of the respective end wall openings 217 in the end wall inner surface 243. For example, each of the end flange openings 239 and each of the end wall openings 217 may be preferably formed as by injection molding to have a diameter in the range of 1 mm to 10 mm. Each end wall openings 217 may overlap with a respective end flange opening 239 so as to merely provide a resultant cross-sectional area for fluid flow at the interface of the end flange outer surface 344 and the end wall inner surface 243 of, for example, one half to one tenth the cross-sectional area of each of the openings 217 and 239. By accurate keying of the piston-forming element 15 to the diaphragm-forming component 16 and thus keying of the sleeve member 210 to the plug member 232 suitable overlapping registry of the openings 217 and the openings 239 results so as to provide a desired resultant area for flow. Providing such a reduced cross-sectional area for fluid flow can assist in the advantageous production of advantageous foam from air and liquid simultaneously being passed therethrough, and in particular foam having homogenous sizing of foam bubbles.

In the preferred embodiment as illustrated, for example, in FIG. 14, the plug end flange 238 is provided on the plug member 232 is axially adjacent and engaged with the sleeve end wall 216 on the sleeve member 210. This location of the plug end flange 238 engaged with the sleeve end wall 216 is not necessary and other configurations of the foam generator 80 may be provided as with the end flange 238 located axially inwardly from the sleeve end wall 216 so as to provide a mixing cavity within the sleeve bore 175 between the end flange 238 and the sleeve end wall 216 as may be advantageous for different fluids as desired to be foamed, particularly, if the openings 217 through the sleeve end wall 216 and the openings 239 through the end flange 238 may be selected to individually be a sufficiently small area, and suitable size for advantageously foaming. In addition, while not necessarily preferred, where such a mixing cavity is provided separate foaming members such as a porous member or sponge and screens may be provided intermediate the end flange 238 and the sleeve end wall 216.

Figure 22:
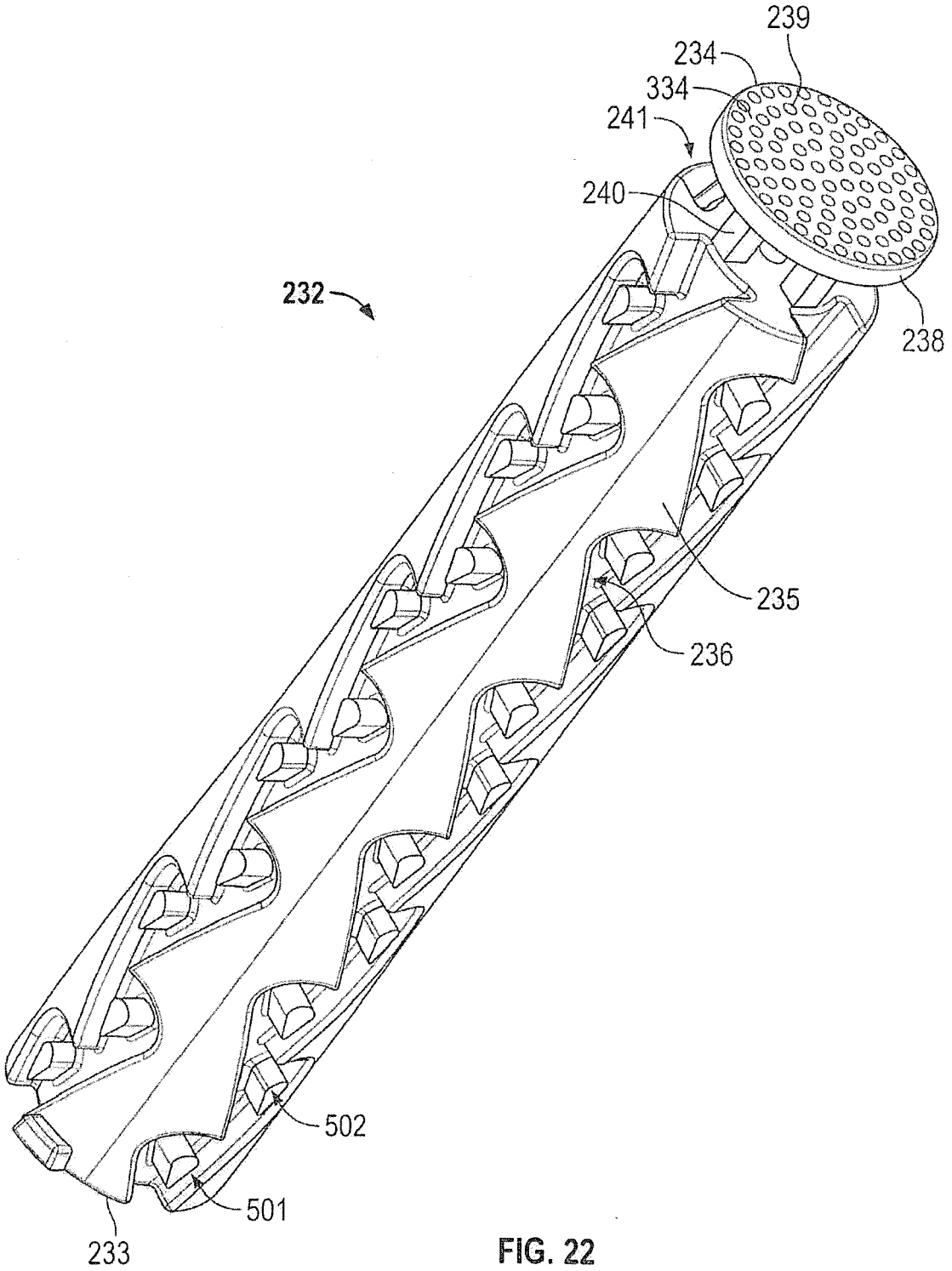
FIG. 22 is a perspective view of a plug member of the foaming pump assembly as seen in FIG. 20.

The radially extending sleeve end wall 216 closes the sleeve bore 75 at the second sleeve end 215 but for the end wall openings 217. When inserted into the sleeve bore 75, as shown in FIG. 22, the plug end flange 238 closes the sleeve bore 75 but for the end flange openings 239. In an alternative embodiment, either one or both of the plug end flange 238 and the sleeve end wall 216 may be eliminated.

Figure 12:
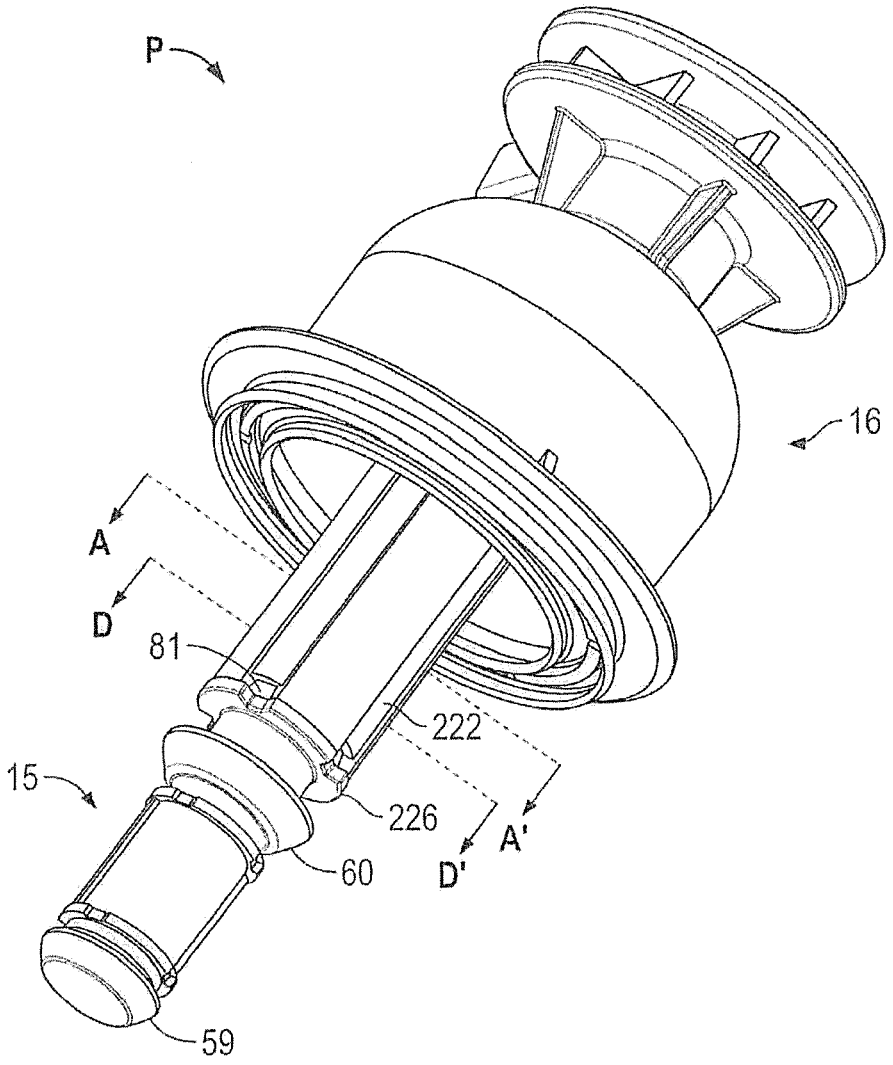
FIG. 12 is a pictorial view of the piston-forming element of FIG. 10 and the diaphragm-forming component of FIG. 8 assembled to form a piston member.
Figure 15:
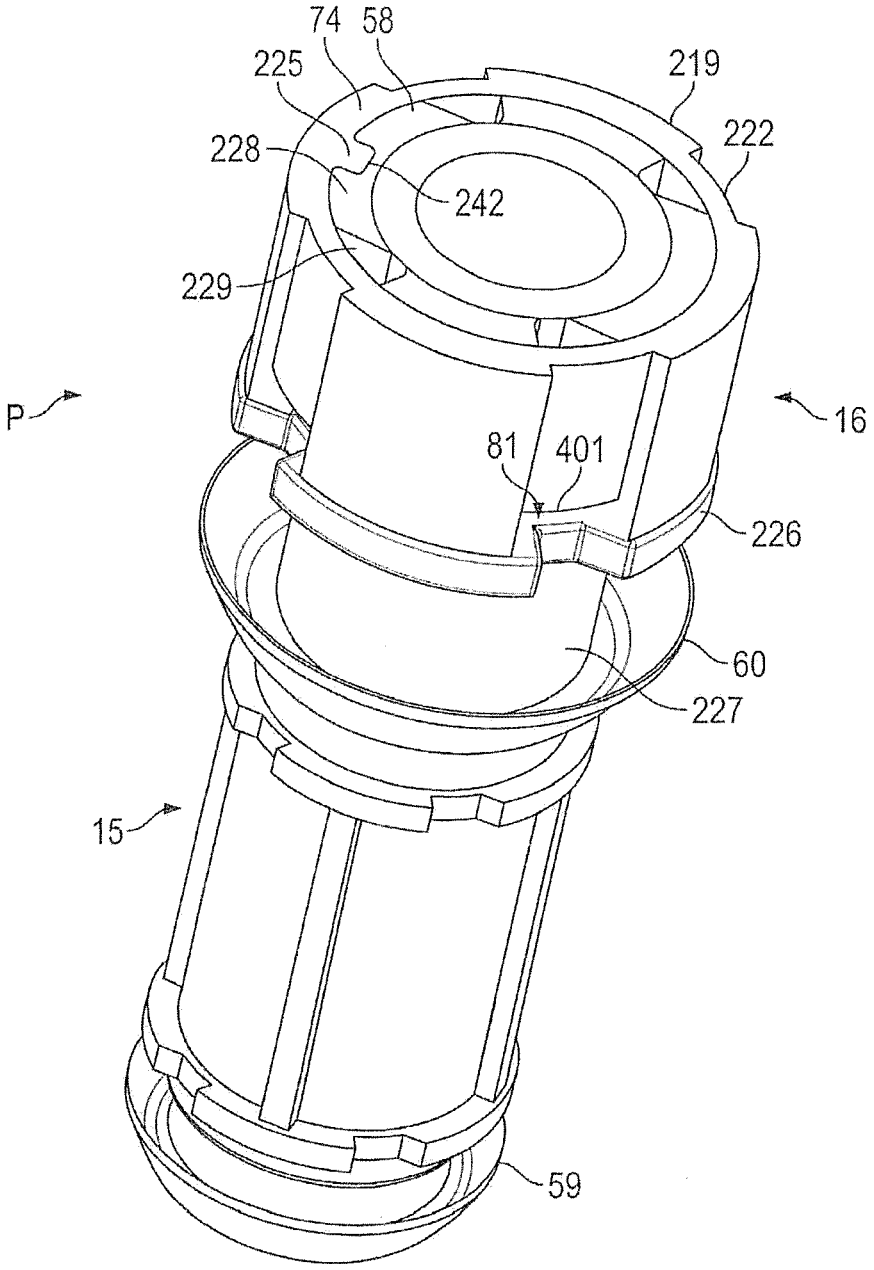
FIG. 15 is a cross-sectional pictorial view along section line D-D' in FIG. 12.

FIGS. 12, 13 and 15 show the piston-forming element 15 and the diaphragm-forming component 16 fixedly secured together against removal as the piston member P. FIG. 14 shows the piston-forming element 15 and the diaphragm-forming component 16 fixedly secured together as the piston member P and coupled to the piston chamber-forming body 14 with the annular first end 73 of diaphragm member 70 engaged with the annular seat arrangement 99 of the piston chamber-forming body 14 forming the air pump 28 between the diaphragm-forming component 16 and the piston chamber-forming body 14, and forming the liquid pump 26 between the piston chamber-forming body 14 and the piston-forming element 15.

As can be seen in FIGS. 3 and 14, the diaphragm-forming component 16 is fixedly secured to the piston-forming element 15 with the bore inner end 76 of the central tube 74 engaged on an axially outwardly directed surface of the locating divider flange 226 and the locking flange 228 of the stem 58 of the piston-forming element 15 securely received in a snap-fit within the annular locking groove 224. On FIG. 14 for convenience, cross-sections A-A' and D-D' are shown corresponding to the same cross-sections A-A' and D-D' in FIG. 12. FIG. 15 is a pictorial cross-sectional view of the piston-forming element 15 and the diaphragm-forming component 16 as assembled in FIG. 12 along section line D-D'. FIG. 15 shows the spline key 225 carried on the locking flange 228 of central tube 74 engaged in a complementary keyway 242 in the stem 58 so as to locate the plug member 232 in desired angular rotation about the axis 31 relative to the sleeve member 210. FIG. 15 also shows the axial openings 229 through the locking flange 228 providing for axial flow. Each of FIGS. 13 and 15 show the exterior channels 222 in the outer surface 219 of the central tube 74 ending at the opening 81 thereby spacing the ends 401 of the exterior channels 222 axially from the locating divider flange 226 so as to provide each opening 81 as a radially extending port radially through the center tube 74. FIGS. 13 and 15 also show clearly the axial openings 227 through the locating divider flange 226 for axial outwardly flow past the locating divider flange 226 to the openings 81, and the exterior channels 222 providing for flow axially inwardly to the openings 81.

FIGS. 3 and 14 illustrate the pump assembly 11 in an extended condition. By the application of forces 101 such as shown in FIG. 2 to the end cap 71, the flexible annular diaphragm member 70 is compressed to assume a retracted position similar to that shown in FIG. 6 and in moving to the retracted position, the piston-forming element 15 is moved axially from the extended position to a retracted position similar to that shown in FIG. 6.

In movement between the extended and retracted positions, the inner disc 59 on the stem 58 of the piston-forming element 15 is received within the smaller diameter cylindrical inner chamber 52 of the piston chamber-forming body 14 and the intermediate disc 60 is received within the larger diameter cylindrical outer chamber 51 of the piston chamber-forming body 14 with each of the inner disc 59 and the intermediate disc 60 effectively acting respectively as the first one-way valve 159 and the second one-way valve 160 such that in a cycle of operation in a retraction stroke moving from an extended position to a retracted position, fluid from the reservoir is discharged in the outer chamber 51 axially outwardly past the intermediate disc 60 to flow axially outwardly past the locating divider flange 226 through its openings 227 and into the openings 81. Thus, the liquid pump 26 in a retraction stroke discharges fluid from the reservoir axially upwardly. The air pump 28 in the retraction stroke with a reduction of volume of the annular air compartment 68 compresses the air within the air compartment 68 so as to discharge air axially outwardly via the exterior channels 222 annularly between the center tube 33 and the center tube 74 outwardly to the openings 81. The liquid pump 26 and the air pump 28 in a retraction stroke simultaneously discharge fluid from the reservoir and air from the atmosphere radially inwardly through the openings 81 and hence axially outwardly notably through the plug passageways 244 to the discharge passageway 79.

Reference is made to FIG. 14 which schematically shows in cross-section the main channel 264 of one plug channelway 244 as extending between the first plug end 233 and the second plug end 234. FIG. 14 shows the piston-forming element 15 and the diaphragm-forming component 16 fixed together as the piston member P and the piston chamber-forming body 14 coupled to the piston member P in an extended position. On the application of forces 101 such as shown in FIG. 3, on movement towards the retracted position similar to that show on FIG. 6, the liquid pump 26 discharges fluid from the reservoir to the openings 81 simultaneously with the air pump 28 discharging air to the openings 81. This mixture of air and fluid passes axially outwardly annularly between the stem 58 of the piston-forming element 15 and the central tube 74 axially through the locking flange 228 an into an annular axially inner mixing chamber 275 formed between the annular distribution groove 230 on the stem 58 and the central tube 74. From the inner mixing chamber 275, the fluid flows into the plug passageways 244 *at an entrance 600 to each of the plug passageways 224* at the first plug end 233 and downstream through the plug passageways 244 formed between the plug member 232 and the sleeve inner wall surface 212 to exit the plug passageways 244 *at an exit 602 to each of the plug passageways 224* at the second plug end 234 where the mixture of air and the fluid flows into an annular axially outer mixing chamber 276 formed within the annular mixing cavity 241 inside the sleeve bore 175. Subsequently, the mixture of air and liquid flows downstream axially outwardly through the plug end flange 238 and the sleeve end wall 216 through the overlapping portions of the end flange openings 239 and the end wall openings 217 into the discharge passageway 79 and hence out the discharge outlet 29. The foam generator 80 provides for the mixing of the air and the fluid from the reservoir and provides for the formation of a foam of the air and the fluid by such mixing. Foam generation is imparted notably by downstream passage through the plug passageways 244 and by passage through the end flange openings 239 and the end wall openings 217, however, merely the plug passageway 244 are required to provide an advantageous resultant foam. The inclusion of the end flange 236 with its end flange openings 239 and the sleeve end wall 217 with its end wall openings 217 is advantageous but not necessary. Similarly the inclusion of the inner mixing cavity 275 and the outer mixing cavity 276 as elements of the foam generator 80 is advantageous but not necessary.

In the preferred embodiment as illustrated in FIG. 11, the plug passageways 244 extend longitudinally between the plug member 232 and the sleeve member 210. In FIG. 11, the main channel 264 extends longitudinally in a slightly serpentine path wavering left and right along a line parallel to the axis 31. In the alternate, the plug passageways 244 may, for example, extend helically about the plug member 232 as, for example, to increase the relative length of each plug passageway 244. In the preferred embodiment as illustrated in FIG. 11, there are four plug passageways 244, each of which provides an independent path from the other plug passageways 244, however, this is not necessary and two or more of the plug passageways 244 can interconnect with flow being transferred between the plug passageways 244 as, for example, to provide as an interconnected maze of channels. For example, some of the main channel and the left and right side channels of one plug channelway 236 can connect with, or be split to connect and merge with, the main channel or the left and right side channels of adjacent plug channelways 236. Such merging connections between channels of different plug passageways 244 may preferably provide for mixing and the creation of turbulence by selecting the angle at which the merging downstream flows intersect.

FIGS. 8 and 9 illustrate a stop rib 278 which extends radially outwardly from the central tube 74. The inner tube 33 of the piston chamber-forming body 14 includes, as best seen in FIG. 3, an axially extending slotway 279. The diaphragm-forming component 16 together with the piston-forming element 15 fixed together as the piston member P are rotatable relative to the piston chamber-forming body 14 about the axis 31 between an operative position as shown in FIG. 3 in which the stop rib 278 is coaxially aligned with the slotway 279 and the diaphragm-forming component 16 may be moved axially relative to the piston chamber-forming body 14 from the extended position as shown in FIG. 3 to a retracted position similar to that shown in FIG. 6.

From the extended and operative position of FIG. 3, the piston member P and its diaphragm-forming component 16 may be rotated counter-clockwise about the axis 31 to positions in which an axially inwardly directed stop surface 282 on the stop rib 278 engages with an axially outwardly directed stopping surface 283 on the axial outer end of inner tube 33 to place the diaphragm-forming component 16 in an inoperative position in which engagement between the stop surface 282 of the stop rib 278 and the stopping surface 283 on the outer end of inner tube 33 prevents axial movement of the diaphragm-forming component 16 from the extended position towards the retracted position. As seen in FIG. 7, the axially inner end of the inner tube 33 carries a stop button 280 adapted to engage the stop rib 278 and locate the stop rib 278 axially aligned with the slotway 279 in the operative position when the diaphragm-forming component 16 is rotated from inoperative positions clockwise relative the piston chamber-forming body 14.

In accordance with the preferred embodiments, the major components of the pump assembly 11, namely, the piston chamber-forming body 14, the piston-forming element 15 and the diaphragm-forming component 16 are each formed as an integral element preferably by injection molding. This has the advantage of reducing the number of elements required as is of assistance in reducing the ultimate costs of manufacturing and assembling the resultant product. The diaphragm-forming component 16 in the preferred first embodiment is preferably configured so as to facilitate injection molding of the diaphragm-forming component 16 as from a resilient preferably elastomeric matter.

It is not necessary but preferred that the diaphragm-forming component 16 may be formed as an integral element. It could be formed from a plurality of elements which are subsequently assembled. Each of the piston chamber-forming body 14 and the piston-forming element 15 which, while preferably are unitary elements, may each be formed from a plurality of elements.

The diaphragm-forming component 16 and its diaphragm member 70 preferably have sufficient resiliency that from an unassembled condition as illustrated, for example, in FIG. 4, the first end 73 of the diaphragm member 70 can be resiliently deformed so that the locating flange 82 may be manipulated to become engaged axially inwardly of the return flange 38. The engagement of the radial distal end 87 of the locating flange 82 with the locating surface 40 of the outer tube 36 of the piston chamber-forming body 14 can assist in preventing radially outward movement of the first end 73 of the diaphragm member 70 as during application of the force 101. Referring to FIG. 14, the locating flange 82 is provided on its axially inwardly directed surface with a beveled surface 284 and the return flange 38 at its radial inner edge is provided with a complementary axially outwardly directed bevel surface 285 to assist by mutual engagement in facilitating the downward movement of the locating flange 82 axially inwardly of the return flange 38.

In the preferred embodiment, the piston chamber-forming body 14 is preferably formed from relatively rigid plastic material.

The return flange 38 is shown as being a number of circumferentially spaced segments on the outer tube 36 with portions of the outer tube 36 between the return flange segments where the vent channels 45 are provided. Providing the return flange 38 as circumferentially spaced segments can assist in manufacture of the piston chamber-forming body 14, however, is not necessary and the return flange 38 may extend circumferentially about the entirety of the outer tube 36.

The foam generator 80 preferably creates turbulence on the simultaneous passage of liquid and air therethrough as is advantageous to provide for preferred foam of the fluid and air.

While the piston-forming element 15 is preferably formed as a unitary element from injection molding, this is not necessary and the piston-forming element may be formed from a plurality of elements. The liquid pump 26 is illustrated as comprising a stepped pump arrangement so as to minimize the number of components forming the liquid pump 26. Rather than provide the liquid pump 26 to be formed merely between the stepped fluid chamber 50 and the piston-forming element 15, a fluid chamber could be utilized having a constant diameter and a separate one-way inlet valve may be provided between this chamber and the reservoir as in a manner, for example, disclosed in the liquid pump of U.S. Pat. No. 7,337,930 to Ophardt et al, issued Mar. 4, 2008, the disclosure of which is incorporated herein by reference.

In the first preferred embodiment, the diaphragm-forming component 16 is illustrated as including and formed with the discharge tube 78. This is a preferred arrangement for providing the pump assembly 11 to have the diaphragm-forming component 16 and the piston-forming element 15 each formed as a separate integral element. In other arrangements, however, the discharge tube 78 may form part of the piston-forming element 15 extending radially from an upper end of the piston-forming element 15 and with the diaphragm-forming component 16 simplified so as to have the central bore 75 extend upwardly through the end cap 17 to an opening for annular engagement about the piston-forming element 15 axially inwardly from the radially outwardly extending discharge tube. Such a modified diaphragm-forming component would continue to have a flexible annular diaphragm member coaxially about the piston-forming element 15 spanning between an axial outer piston end of the piston-forming element 15 and the piston chamber-forming body 14 to define a variable volume annular air compartment therebetween.

In accordance with the first embodiment, it is preferred that the diaphragm member 70 be utilized in a position that the central axis 31 is generally vertical, however, this is not necessary and generally a principal requirement in any oriented use of the pump assembly 11 is that the fluid 13 in the reservoir 12 be at a height below the entranceway in the reservoir 12 to the air relief passageway 106. In one modification of the dispenser as illustrated in FIG. 2, the neck 21 on the reservoir 12 could be located proximate the upper end of the reservoir 12 albeit disposed about a horizontal axis in which case the axis 31 of the embodiment illustrated in FIG. 5 would be horizontal and the discharge outlet 29 would discharge fluid liquid downwardly. In another variant of such an arrangement, the discharge tube could be modified to be coaxial about the axis 31 and extend horizontally rather than downwardly.

Optional Air Relief Valve

As seen on FIG. 5, the annular first end 73 of the diaphragm member 70 includes a radially outwardly extending locating flange 82, an air relief valve member 83, a stop foot member 84 and a sealing member 85.

The diaphragm-forming component 16 is engaged with the piston chamber-forming body 14 with the sealing member 85 and the air relief valve member 83 engaged on the upper surface 39 of the bridge flange 34 and the locating flange 82 disposed axially inwardly of the stopping surface 41 of the return flange 38 as seen in FIG. 5. The locating flange 82 includes an axially outwardly directed outer flange stop surface opposed to and, in FIG. 6, engaging the stopping surface 41 on the return flange 38 of the piston chamber-forming body 14 to restrict actual outward movement of the annular first end 73 of the diaphragm member 70 relative to the piston chamber-forming body 14. The locating flange 82 is joined at a radially inner end to the diaphragm side wall 72 and extends radially outwardly as an annular flange to a radial distal end.

The air relief valve member 83 comprises an annular disc which extends from an axially outwardly and radially inwardly inner end axially inwardly and radially outwardly to a distal end in engagement with the upper surface 39 of the bridge flange 34.

The sealing member 85 extends from an axially outwardly and radially outwardly inner end radially inwardly and axially inwardly to a distal end in engagement with the upper surface 39 of the bridge flange 34.

The stop foot member 84 is provided in between the air relief valve member 83 and the sealing member 85 and extends axially inwardly from an axially outer end to a foot stop surface at a distal end.

As seen in FIG. 5, the foot stop surface of the stop foot member 84 in the extended position is spaced axially outwardly from the upper surface 39. As seen in FIG. 4, at circumferentially spaced locations, a number of vent ports 95 are provided radially through the stop foot member 84 and provide for communication radially through the stop foot member 84.

Referring to FIGS. 5 and 6, the annular first end 73 of the diaphragm member 70 engages with the annular seat arrangement 99 of the piston chamber-forming body 14 annularly about the piston chamber-forming body 14 for limited reciprocal axial movement of the first end 73 of the diaphragm member 70 relative the annular seat arrangement 99 between an axially outer position shown in FIG. 5 and an axially inner position shown in FIG. 6.

As can be seen in FIG. 5, the first end 73 of the diaphragm member 70 is engaged on the annular seat arrangement 99 of the piston chamber-forming body 14 with the locating flange 82 axially disposed between the bridge flange 34 and the return flange 38 with the axially outwardly directed outer flange stop surface on the locating flange 82 in opposition to the axially inwardly directed stopping surface 41 on the return flange 38 so as to limit axial outward movement of the first end 73 of the diaphragm member 70 relative the annular seat arrangement 99 at the axially outer position as seen in FIG. 5. The stop foot member 84 has its axially inwardly directed foot stop surface opposed to the upper surface 39 of the bridge flange 34 such that engagement between the foot stop surface and the upper surface 39 of the bridge flange 34 limits axial inward movement of the first end 73 of the diaphragm member 70 in the axially inner position as shown in FIG. 6. An annular portion of the upper surface 39 of the bridge flange 34 where the annular foot stop member 84 engages provides an axially inwardly directed stopping surface.

The first end 73 of the diaphragm member 70 includes the sealing member 85 which is an annular disc that extends axially inwardly and radially inwardly to the distal end 91 that is in sealed engagement with the upper surface 39 of the bridge flange 34 of the annular seat arrangement 99 of the piston-forming body 14 to form an annular seal preventing flow between the sealing member 85 and the annular seat arrangement 99 in all positions of the first end 73 of the diaphragm member 70 and the annular seat arrangement 99 between the outer position of FIG. 7 and the inner position of FIG. 6. The sealing member 85 is formed of resilient material and has an inherent bias to adopt an inherent position and when deflected from the inherent position attempts to return to the inherent position. In moving from the axial outer position of FIG. 5 to the axially inner position of FIG. 6, the sealing member 85 is deflected and its distal end displaced marginally radially inwardly on the upper surface 39 yet maintaining the annular seal therewith to prevent fluid flow. The distal end of the sealing member 85 engages the upper surface 39 to form the annular seal therewith radially inwardly of the first opening 43 such that the annular seal 102 formed between the sealing member 85 and the upper surface 39 prevents flow into or out of the annular air compartment 68 between the first end 73 of the diaphragm member 70 and the annular seat arrangement 99 of the piston chamber-forming body 14. An annular portion of the upper surface 39 of the bridge flange 34 where the sealing member 85 engages provides an axially inwardly directed sealing seat surface 197. In movement of the first end 73 of the diaphragm member 70 from the axially outer position of FIG. 5 to the axially inner position of FIG. 6, the sealing member 85 is deflected and the inherent bias of the sealing member 85 will attempt to remove the first end 73 of the diaphragm member 70 to the axially outer position of FIG. 5.

The first end 73 of the diaphragm member 70 carries the air relief valve member 83 which extends axially inwardly and radially outwardly to its distal end which is in engagement with the upper surface 39 of the bridge flange 34. The air relief valve member 83 is resilient with an inherent bias to return to an inherent position and when deflected from the inherent position attempts to return to the inherent position. The distal end of the air relief valve member 83 is in engagement with the upper surface 39 of the bridge flange 34 in all positions between the outer position of FIG. 5 and the inner position of FIG. 6. In axial movement of the outer end 73 of the diaphragm member 70 from the axial outer position of FIG. 7 to the axially inner position of FIG. 6, the distal end of the air relief valve member 83 slides radially outwardly on the upper surface 39 as the air relief valve member 83 is deflected against its inherent bias. An annular portion of the upper surface 39 of the bridge flange 34 where the air relief valve member 83 engages provides an axially inwardly directed annular air relief valve seat surface. The inherent bias of the air relief valve member 83 biases the first end 73 of the diaphragm member 70 from the axially inner position of FIG. 8 to the axially outer position of FIG. 5.

In use of the foam dispenser 10, when a user applies the downward force 101 to the end cap 71 as indicated by the schematic arrow in FIG. 2, the first end 73 of the diaphragm member 70 is moved from the axially outer position of FIG. 5 to the axially inner position of FIG. 6 during which movement each of the sealing member 85 and the air relief valve member 83 are deflected from their inherent position. On release of the downwardly directed force 101 onto the end cap 71, the inherent bias of each of the sealing member 85 and the air relief valve member 83 on the first end 73 of the diaphragm member 70 act on the annular seat arrangement 99 to bias the first end 73 of the diaphragm member 70 from the axial inner position of FIG. 8 to the axially outer position of FIG. 5. In this regard, each of the sealing member 85 and the air relief valve member 83, individually and collectively, act as a resilient positioning spring member to bias the first end 73 from the inner position towards the outer position.

Referring to FIG. 5 showing the axially outer position, the air relief valve member 83 has its distal end engage the upper surface 39 radially inwardly of the radial inner end of the vent channels 45. On moving from the axially outer position of FIG. 5 to the axially inner position of FIG. 6, the distal end of the air relief valve member 83 slides radially outwardly on the upper surface 39 so that an opening 105 is provided radially inwardly of the distal end of the air relief valve member 83 and radially outwardly of the radially inwardly end 49 of the vent channels 45.

As can be seen in FIG. 6, an air relief passageway is defined through the piston liquid chamber-forming body 14 providing communication between external atmospheric air and the interior 19 of the reservoir 12. The air relief passageway includes (a) the vent passage 42 providing communication through the piston chamber-forming body 14 to the first opening 43 on the upper surface 39 of the annular seat arrangement 99; (b) an outer portion including the vent channel 45 providing communication between external atmospheric air and the opening 105 on the axially outwardly directed upper surface 39; and (c) an intermediate portion between the first opening 43 and the second opening 105 which, as can be seen in FIG. 6, passes through the vent port 95 through the stop foot member 84. The air relief valve member 83 engages the air relief valve seat surface to close and to open the air relief passageway dependent upon the axial position of the first end 73 of the diaphragm member 70 relative the annular seat arrangement 99 between the axially inner position and the axially outer position.

As seen in FIG. 6 in the axial outer position, the air relief valve member 83 engages the air relief valve seat surface of the upper surface 39 so as to open the air relief passageway. As seen in FIG. 5 in the axial outer position, the air relief valve member 83 has moved radially inwardly of the radial inner end of the vent channel 45 and engages the air relief valve seat surface of the upper surface 39 in a sealed manner so as to close the air relief passageway 106.

The interaction of the air relief valve member 83, the air relief valve seat surface and the air relief passageway forms the air relief valve 30 across the air relief passageway that opens and closes the air relief passageway dependent upon the relative axial position of the piston-forming member 15 and the liquid chamber-forming body 14. In the position of FIG. 5, the air relief valve 30 closes the air relief passageway and thus encloses the interior 19 of the reservoir 12. In the axially inner position of FIG. 6, the air relief valve 30 opens the air relief passageway so as to permit air from the atmosphere to flow into the interior 19 of the reservoir 12 as to relieve any vacuum condition which may have arisen in the interior 19 due to discharge of the liquid 13 from the reservoir 12 by the liquid pump 26.

The optional air relief valve 30 is not necessary and the annular first end 73 of the diaphragm member 70 may merely be fixedly sealably engaged on the bridge flange 34.

Second Embodiment

Reference is made to FIGS. 17 to 25 which illustrate a second embodiment of the foaming pump assembly 11 in accordance with the present invention. The foaming pump assembly 11 has similarities to a pump assembly as shown in Canadian patent application Serial No. 2,875,105 to Ophardt et al, published Jun. 20, 2015, the disclosure of which is incorporated herein by reference.

Figure 17:
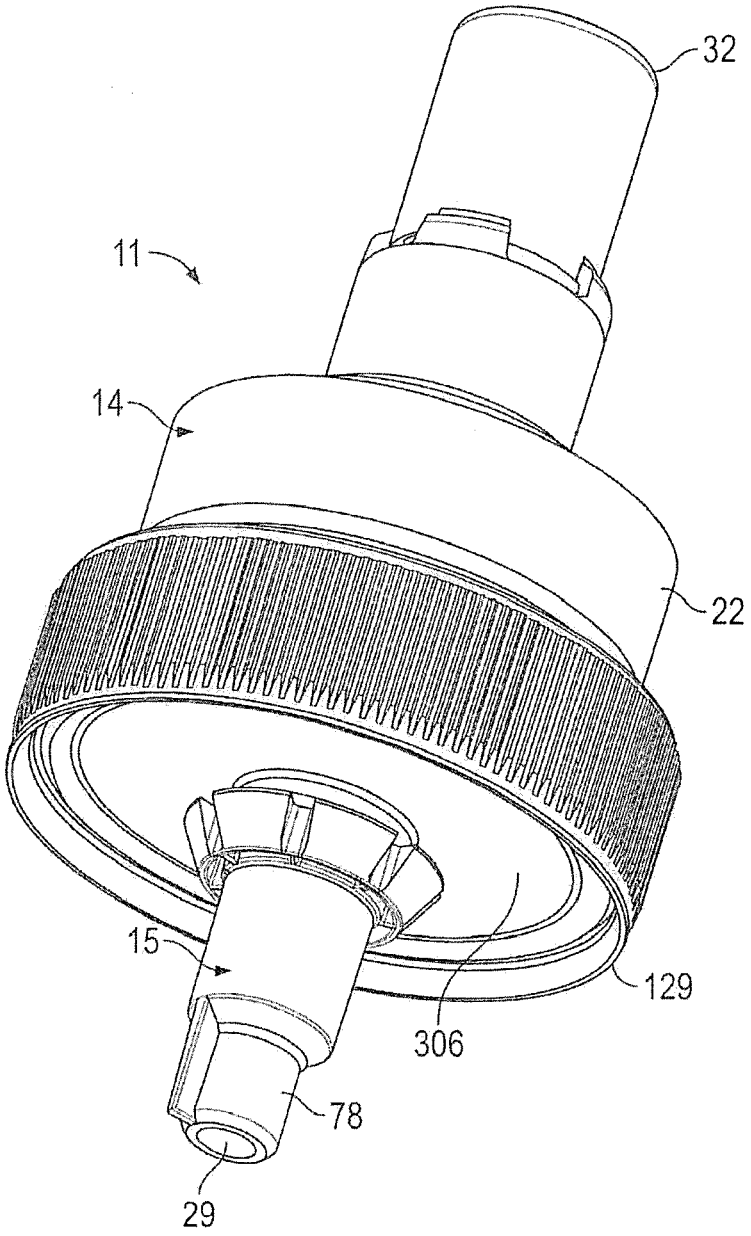
FIG. 17 is a perspective view of a foaming pump assembly in accordance with a second embodiment of the present invention.
Figure 18:
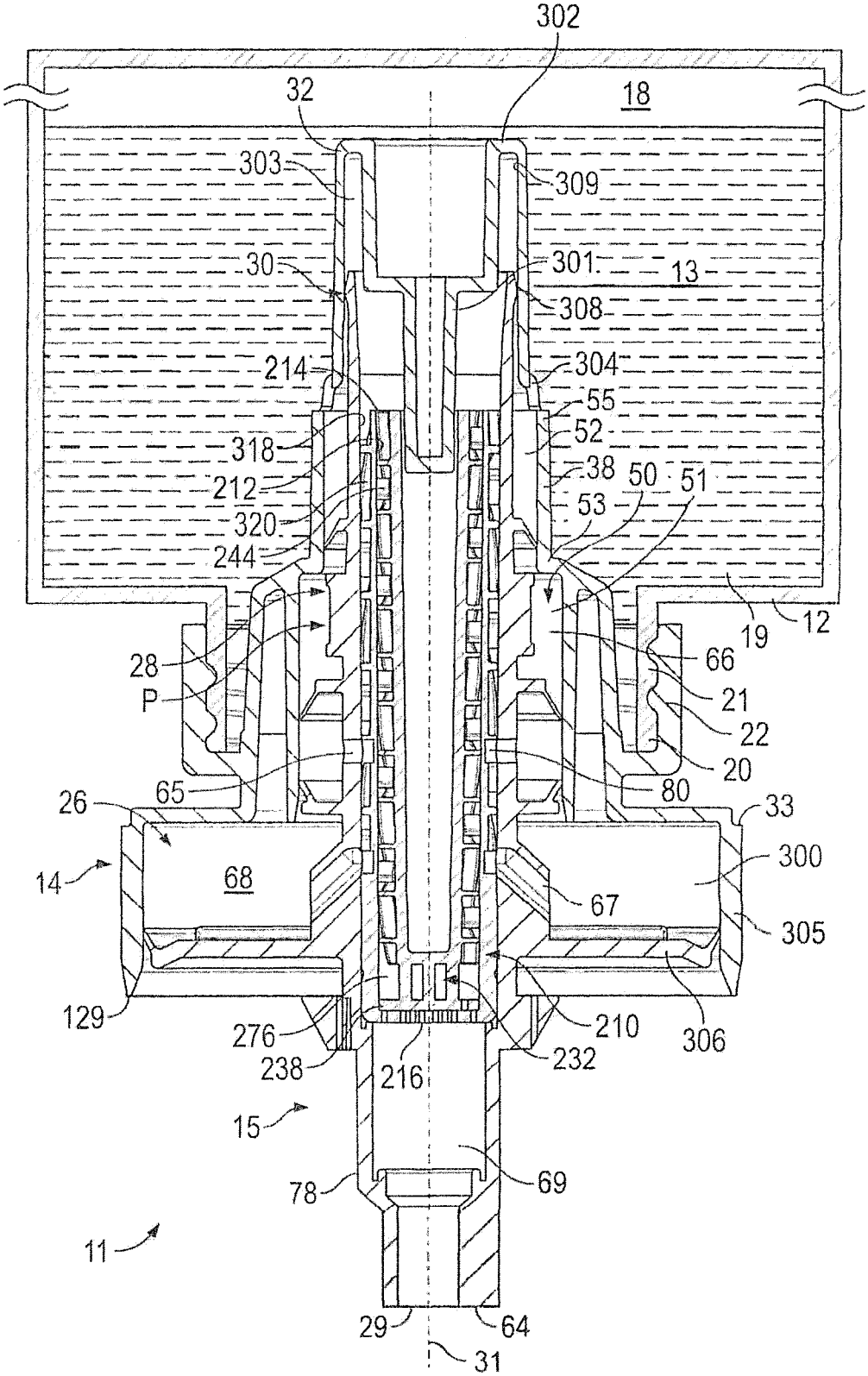
FIG. 18 is a cross-sectional side view of a foam dispenser incorporating the foaming pump assembly of FIG. 17 in an extended position.

Reference is made to FIG. 18 showing a foam dispenser 10 having a foaming pump assembly 11 of the second embodiment of FIG. 17 secured to a reservoir 12 containing a foamable fluid 13 to be dispensed. The fluid 13 is preferably a liquid. The pump assembly 11 includes a piston chamber-forming body 14, a piston-forming element 15, a sleeve member 210 and a plug member 232. The reservoir 12 is a non-collapsible reservoir in the sense that as the fluid 13 is drawn from the reservoir 12 by operation of the pump assembly 11 with the discharge of the liquid 13 from the reservoir, a vacuum comes to be developed within the reservoir 12 as in the gas 18, being substantially air, in the reservoir 12 above the fluid 13. The reservoir 12 defines an interior 19 with the interior 19 enclosed but for having an outlet port 20 formed in a cylindrical externally threaded neck 21 of the reservoir 12. The neck 21 of the reservoir 12 is sealably engaged on an internally threaded upwardly extending collar tube 22 on the piston chamber-forming body 14 with the outlet port 20 and the piston chamber-forming body 14 engaged to form a seal therebetween.

In the second preferred embodiment as seen in FIGS. 17 to 25, each of the piston chamber-forming body 14, the piston-forming element 15, the sleeve member 210 and the plug member 232 is formed as an integral element preferably by injection molding so as to provide the foaming pump assembly 11 from a minimal of parts, namely these major four elements.

Figure 19:
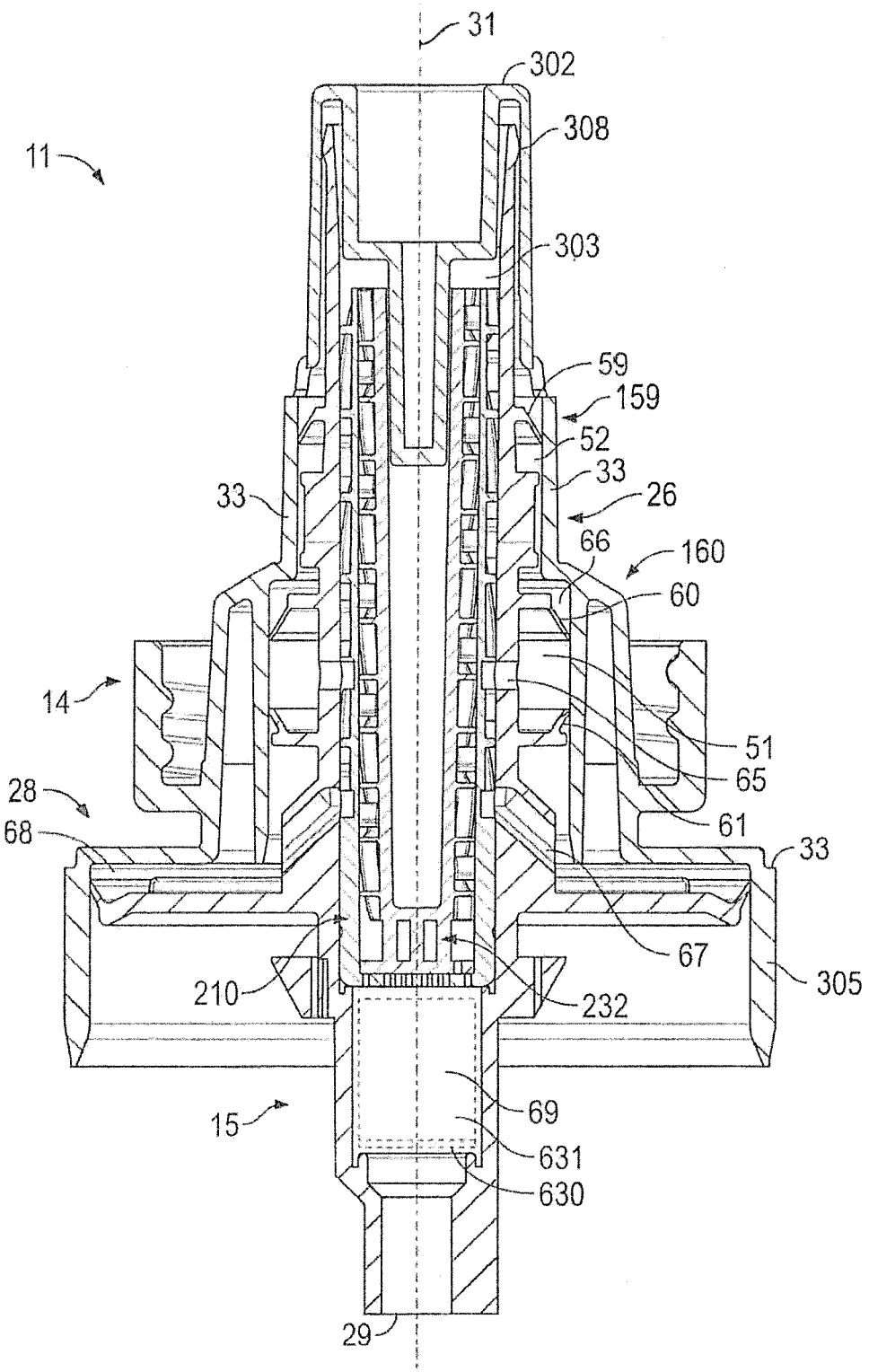
FIG. 19 is a cross-sectional side view of the foaming pump assembly in FIG. 17 in a retracted position.
Figure 20:
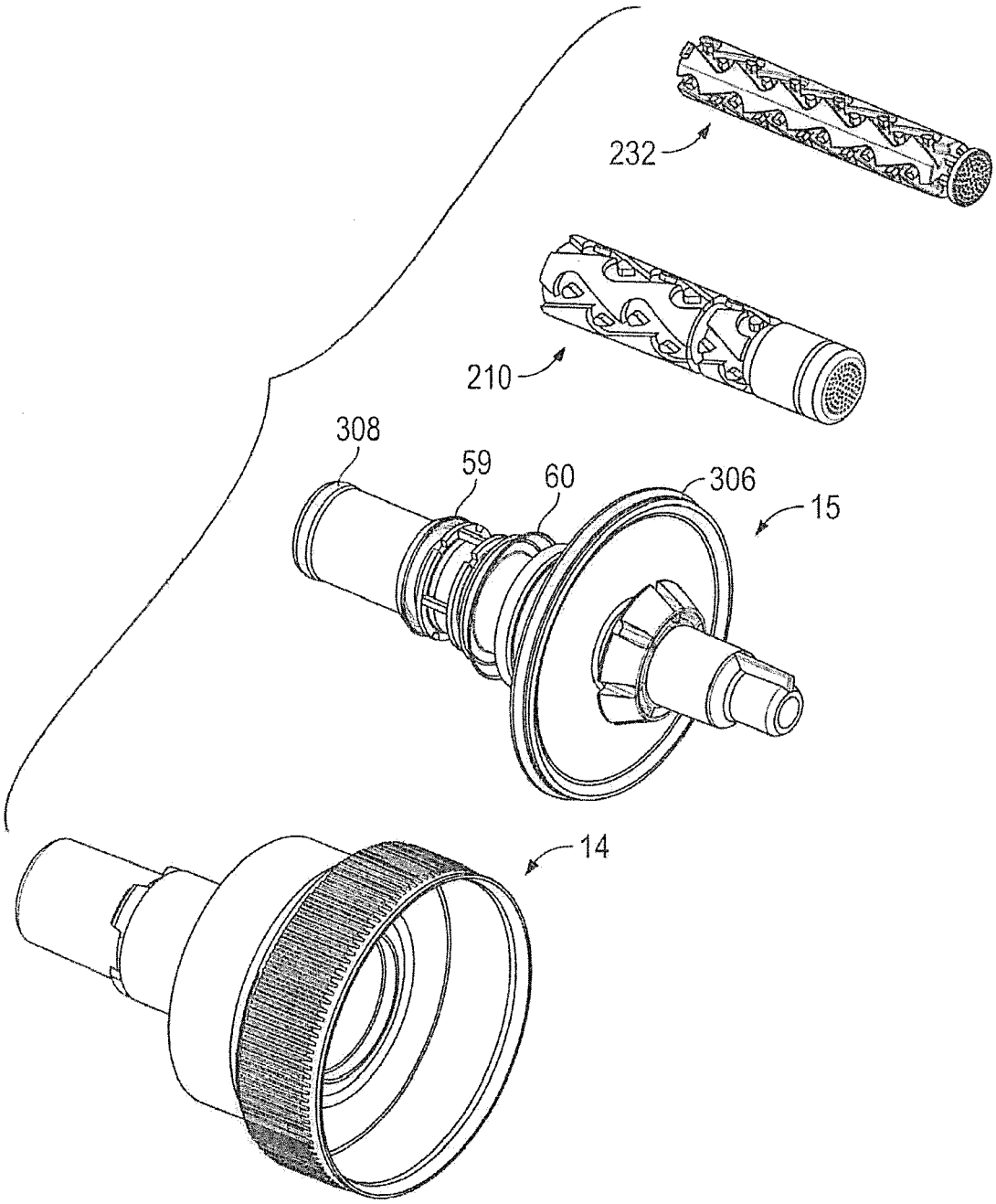
FIG. 20 is a pictorial exploded view of the foaming pump assembly of FIG. 17 as seen from below.
Figure 21:
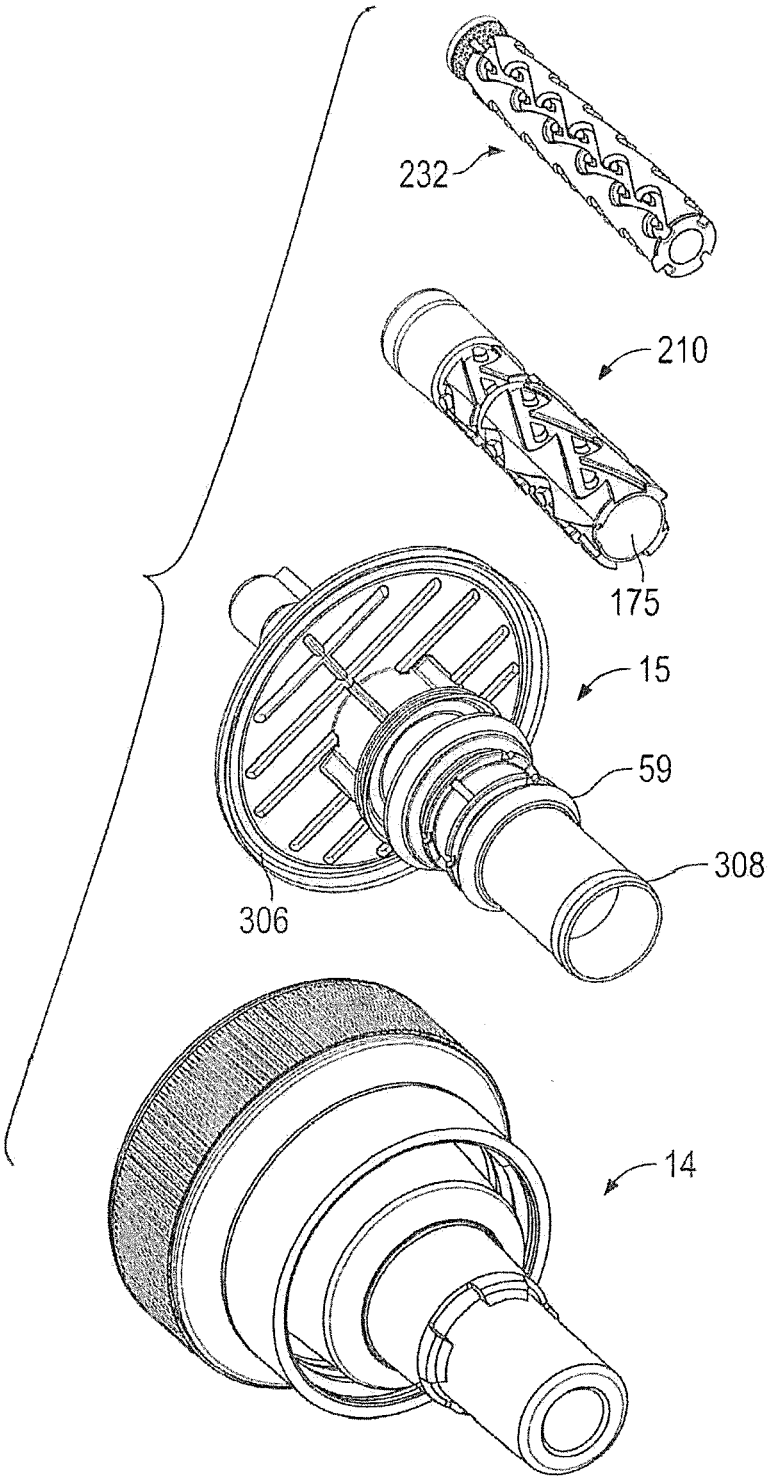
FIG. 21 is an exploded perspective view of the foaming pump assembly of FIG. 17 as seen from above.

These four major elements are assembled with the sleeve member 210 and the plug member 232 affixed to the piston-forming element 15 forming a piston member P and with the piston-forming element 15 of the piston member P coupled to the piston chamber-forming body 14 for movement between an extended position as seen in FIGS. 18 and a retracted position as seen in FIG. 19.

A liquid pump 26 is formed by the interaction of the piston-forming element 15 and the piston chamber-forming body 14 and an air pump 28 is formed notably by interaction of the piston-forming element 15 and the piston chamber-forming body 14. In moving from the extended position of FIG. 25 to the retracted position of FIG. 26, the liquid pump 26 discharges the fluid 13 from the reservoir 12 simultaneously with the air pump 28 discharging air such that air and the fluid 13 are simultaneously passed through a foam generator 80 out a discharge outlet 29. In moving from the retracted position of FIG. 19 to the extended position of FIG. 18, atmospheric air is drawn in by the air pump 28. An air relief valve 30 is provided between the piston-forming element 15 and the piston chamber-forming body 14 to permit atmospheric air to flow from the atmosphere into the interior 19 of the reservoir 12 to relieve any vacuum that may develop within the reservoir 12.

The piston chamber-forming body 14 is disposed about a central axis 31 and has an axially inner end 32 and an axially outer end 29. The piston chamber-forming body 14 includes a center tube 33 disposed coaxially about the axis 31, open at the axially outer end 129 and closed at an axially inner end 32 by an end wall 302 including a center locating tube 301. The collar tube 22 extends upwardly from the center tube 33 coaxially radially outwardly about the center tube 33.

Inside the center tube 33, there is defined an axially outer air chamber 300, a stepped fluid chamber 50, and a transfer chamber 303.

The stepped fluid chamber 50 is defined having a cylindrical axially outer chamber 51 and a cylindrical axially inner chamber 52 with the diameter of the inner chamber 52 being less than the diameter of the outer chamber 51. Each chamber 51 and 52 is coaxial about the axis 31. Each chamber 51 and 52 has a cylindrical chamber wall, an inner end and an outer end. The axial outer end of the inner chamber 52 opens into the axial inner end of the outer chamber 51. An annular shoulder 53 closes the inner end of the inner chamber 52 about the outer end of the outer chamber 51.

The inner chamber 52 is open at an axial inner end 55 of the fluid chamber 50 into the transfer chamber 303 at the axially inner end 32 of the piston chamber-forming body 14 closed by the end wall 302. Transfer ports 304 extend radially through the center tube 33 to provide communication between the interior 19 of the reservoir 12 and the interior of the center tube 33 into the inner chamber 52.

The air chamber 300 is defined within the center tube 33 open axially outwardly to the axially outer end 29. The axially outer end of the outer chamber 51 opens into the air chamber 300. The air chamber 300 is defined within an outer wall portion 305 of the center tube 33 having a larger diameter than the diameter of the outer chamber 51.

As best seen in FIG. 18, the piston-forming element 15 is coaxially slidably received within the piston chamber-forming body 14 providing the liquid pump 26 therebetween. The piston-forming element 15 has a central stem 58 from which there extends radially outwardly an annular inner disc 59, an annular intermediate disc 60 and an annular outer disc 61. The stem 58 defines internally an axially extending internal passageway 62 extending from an axially inner open end 63 to an axially outer open end 64. Liquid ports 65 extends radially through the central stem 58 providing communication between the internal passageway 62 and the outer chamber 51 axially between the intermediate disc 60 and the outer disc 61.

The piston-forming element 15 is coaxially slidable relative to the piston chamber-forming body 14 between a retracted position as seen in FIG. 19 and an extended position as seen in FIG. 18. In a cycle of operation, the piston-forming element 15 is moved relative to the piston chamber-forming body 14 from the extended position to the retracted position in a retraction stroke and from the retracted position to the extended position in a withdrawal stroke. During a cycle of operation, the inner disc 59 is maintained within the inner chamber 52 and the intermediate disc 60 and the outer disc 61 are maintained within the outer chamber 51. The inner disc 59 with the inner chamber 51 form a first one-way liquid valve 159 permitting liquid flow merely outwardly therebetween. The inner disc 59 has an elastically deformable edge portion for engagement with the inner wall of the inner chamber 52. The inner disc 59 is biased outwardly into the wall of the inner chamber 52 to prevent fluid flow axially inwardly therepast, however, the inner disc 59 has its end portion deflect radially inwardly away from the wall of the inner chamber 52 to permit fluid flow axially outwardly therepast.

The outer disc 61 engages the side wall of the outer chamber 51 in a manner to substantially prevent fluid flow axially inwardly or outwardly therepast. The intermediate disc 60 has an elastically deformable edge portion which engages the side wall of the outer chamber 51 to substantially prevent fluid flow axially inwardly therepast yet to deflect away from the side wall of the outer chamber 51 to permit fluid to pass axially outwardly therepast. The intermediate disc 60 with the outer chamber 52 form a second one-way liquid valve 160 permitting liquid flow merely outwardly therebetween.

An annular fluid compartment 66 is defined in the fluid chamber 50 radially between the center tube 33 and the piston-forming element 15 axially between the inner disc 59 and the outer disc 61 with a volume that varies in a stroke of operation with axial movement of the piston-forming element 15 relative to the piston chamber-forming body 14. The fluid compartment 66 has a volume in the extended position greater than its volume in the retracted position. Operation of the liquid pump 26 is such that in a retraction stroke, the volume of the fluid compartment 66 decreases creating a pressure within the fluid compartment 66 which permits fluid flow radially outwardly past the inner disc 59 and axially outwardly past the intermediate disc 60 such that fluid is discharged axially outwardly past the intermediate disc 60 and via the liquid ports 65 into the internal passageway 62. In a withdrawal stroke, the volume of the liquid compartment 66 increases such that with the intermediate disc 60 preventing fluid flow axially outwardly therepast, the increasing volume.

Figure 25:
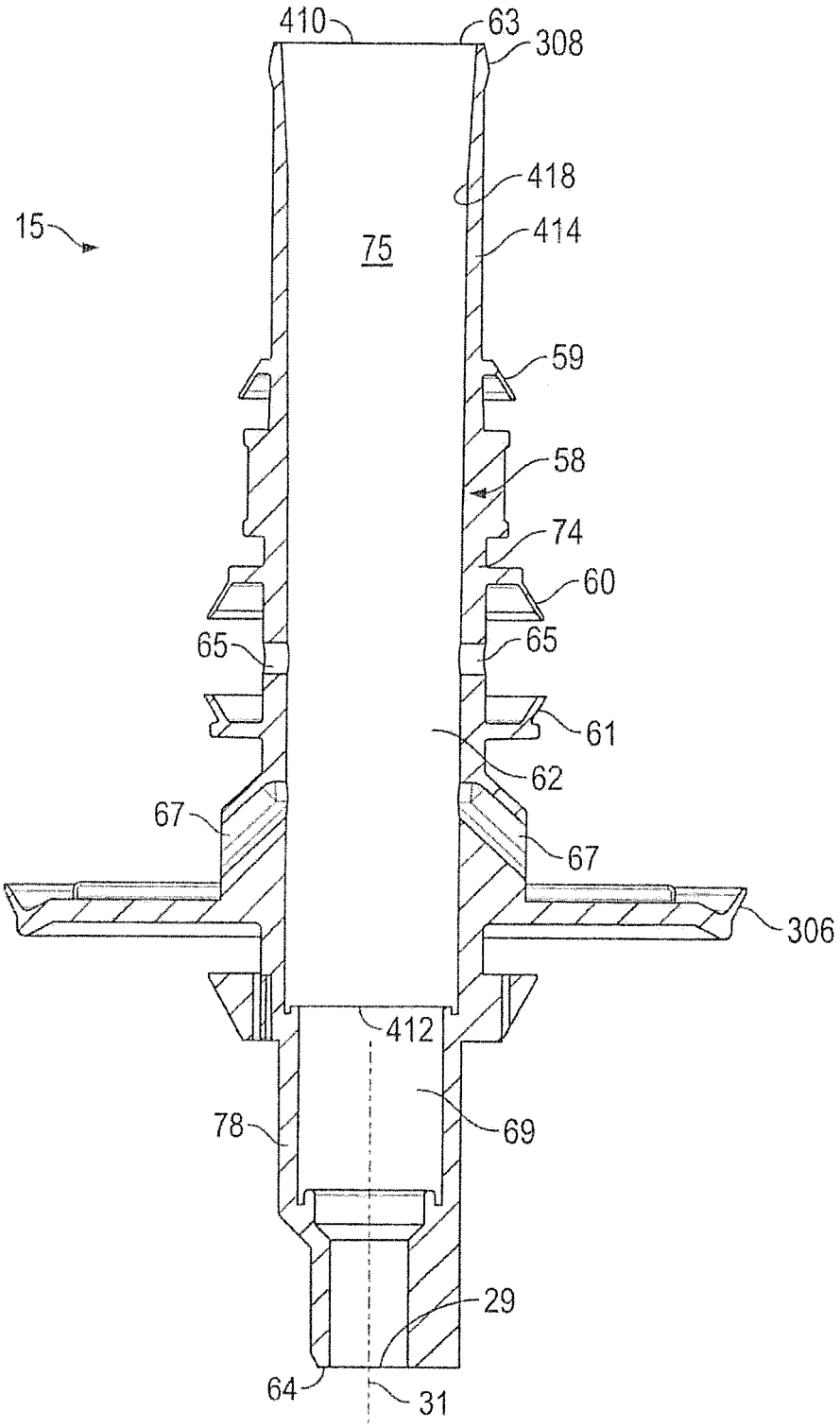
FIG. 25 is a cross-sectional side view of a piston-forming element in the same cross-section as in FIGS. 18 and 19.

As best seen in FIG. 25, the piston-forming element 15 has on the central stem 58 axially outwardly of the annular outer disc 61 an air disc 306 which extends radially outwardly into sealed engagement with the outer wall portion 305 of the center tube 33. The piston-forming element 15 includes on its central stem 58 axially between the outer disc 61 and the air disc 306 air ports 67 providing for communication between the internal passageway 62 of the stem radially through the central stem 58 with an air compartment 68 defined between the piston-forming element 15 and the piston chamber-forming body 14.

The air compartment 68 is defined radially between the center tube 33 and the stem 58 axially between the outer disc 61 and the air disc 306 with a volume that varies in a stroke of operation with axial movement of the piston-forming element 15 relative to the piston chamber-forming body 14. The air compartment 68 has a volume in the extended position greater than its volume in the retracted position. Operation of the air pump 28 is such that in a retraction stroke, the volume of the air compartment 68 decreases creating a pressure within the air compartment 68 which discharge air via the air ports 67 into the internal passageway 62. In a withdrawal stroke, the volume of the air compartment 68 draws air and the fluid from the internal passageway 62.

The piston-forming element 15 has on the central stem 58 axially inwardly of the annular inner disc 59 a vent disc 308 which extends radially outwardly into sealed engagement with an interior wall 309 of the transfer chamber 303 of the center tube 33 axially inwardly of the transfer ports 304. The vent disc 308 and interior wall 309 cooperate in a manner as described in the above noted Canadian Patent Application 2,875,105, to provide the air relief valve 30 such that if a sufficient vacuum condition may exist in the reservoir 12, flow is permitted between the vent disc 308 and the interior wall 309 from the internal passageway 62 into the interior 19 of the reservoir 12, such that with the internal passageway 62 open to the atmosphere through the discharge outlet 29, atmospheric air may relieve a vacuum condition in the reservoir 12.

In the use of the foam dispenser 10 as shown in FIG. 18, in a retraction stroke, the liquid pump 26 forces the fluid from the reservoir 12 from the liquid compartment 66 through the liquid ports 65 into the internal passageway 62 of the central stem 58 simultaneously with air pump 28 forcing air from the air compartment 68 through the air ports 67 into the internal passageway 62 of the central stem 58 and, hence, each of the discharged fluid and air are simultaneously passed to and through the foam generator 80 to discharge as foam out the discharge outlet 29. In the withdrawal stroke from the position of FIG. 18 to the position of FIG. 19, the volume of the air compartment 68 increases drawing atmospheric air into the air compartment 68 via the discharge outlet 29, through the foam generator 80, the internal passageway 62, and the air ports 67.

The internal passageway 62 within the central stem 58 includes proximate the outer open end 64 an enlarged foaming chamber 69. While not shown, one or more additional foam generating components may optionally be provided in foaming chamber 69, for example, as screens and a porous foam inducing sponge that may extend across the internal passageway 62, for example, supported at an axially inner end of the foaming chamber 69 in a manner as described in the above noted Canadian Patent Application 2,875,105. On FIG. 19, an optional such one screen 630 and an optional porous foam inducing sponge 631 are shown in broken lines.

Figure 24:
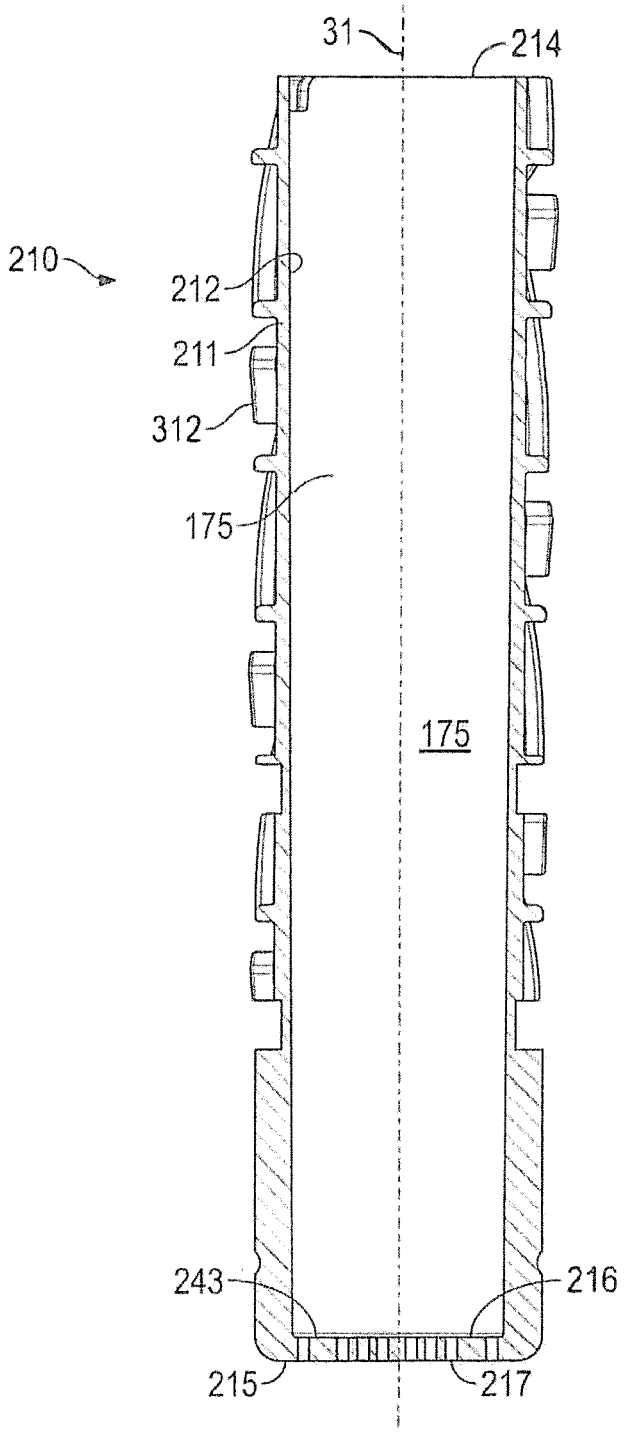
FIG. 24 is a cross-sectional view of the sleeve member of FIG. 23 along the same section line as in FIGS. 18 and 19.

As best seen in FIGS. 23 and 24, the elongate sleeve member 210 has a sleeve side wall 211 with a sleeve inner wall surface 212 and a sleeve outer wall surface 312.

The sleeve side wall 211 extends from a first sleeve end 214 to a second sleeve end 215 defining a central sleeve bore 175 within the sleeve member 210 extending along the axis 31. At the second sleeve end 215, the sleeve member 210 includes a radially extending sleeve end wall 216 closing the sleeve bore 75 at the second sleeve end 215 but for an array of end wall openings 217 axially through the sleeve end wall 216.

The sleeve inner wall surface 212 is circular in any cross-section, normal the longitudinal axis 31. In this regard, the sleeve inner wall surface 212 is preferably cylindrical.

The sleeve outer wall surface 312 of the sleeve member 210 is circular in any cross-section normal the axis 31 and preferably cylindrical between the first sleeve end 214 and the second sleeve end 215. Four air sleeve channelways 336, four mixing sleeve channelways 436 as well as an annular air manifold channelway 314 and an annular liquid manifold channelway 316 are provided in the sleeve outer wall surface 312. Each air sleeve channelway 336, mixing sleeve channelway 436, air manifold channelway 314 and liquid manifold channelway 316 is a channelway that is cut radially inwardly into the sleeve member 210 from the sleeve outer wall surface 312 forming a channelway in the sleeve outer wall surface 312 opening radially outwardly along the length of each channelway to the sleeve outer wall surface 312. Each annular air manifold channelway 314 and each annular liquid manifold channelway 316 extends annularly about the sleeve inner wall surface 312. Each air sleeve channelway 336 is open axially into the air manifold channelway 314 at an axially outer end and into the liquid manifold channelway 316 at an axially inner end. Each air sleeve channelway 336 provides communication between the air manifold channelway 314 and the liquid manifold channelway 316. Each mixing channelways 436 provides communication between the liquid manifold channelway 314 and the first sleeve end 214. The mixing channelways 436 are open axially at an axially inner end in the liquid manifold channelway 316 and at the first sleeve end 214.

Referring to FIG. 25, the stem 58 of the piston-farming element 15 provides the passageway 62 inside a central tube member 74 of the stem 58. A central tube bore 75 of the tube member 74 about the axis 31 forms the passageway 62 therethrough between a tube first end 410 and a tube second end 412. The central tube member 74 has a tube side wall 414 with a circumferentially inwardly directed tube inner wall surface 418 that is cylindrical and circular in cross-section normal the axis 31 defining the tube bore 75 extending along the axis 31. As seen in FIGS. 18 and 19 the sleeve member 210 is securely fixedly coupled to the piston-forming element 15 within the passageway 62 that is within the central tube bore 75 of the tube member 74.

With the sleeve member 210 received coaxially within the tube member 74, the cylindrical sleeve outer wall surface 312 is in opposed close opposition on engagement with the cylindrical tube inner wall surface 418 so as to prevent any substantial air or fluid flow therebetween other than through sleeve passageways generally indicated 320 defined between the tube inner wall surface 318 and each of the air manifold sleeve channelways 314, the air sleeve channelways 336, the annular liquid manifold channelway 316, and the mixing sleeve channelways 436. Such sleeve passageways 320 together provide for flow longitudinally between air manifold sleeve channelways 314 and the first sleeve end 214. The air sleeve channelways 336 and the mixing sleeve channelways 436 in the second embodiment are configured to be substantially the same as the plug channelways 336 in the first embodiment and configured to provide the sleeve passageways 320 with successive mixing portions in series along the sleeve passageway 320 that will mix any air and fluid that are passed downwardly axially inwardly therethrough in the same manner that the plug channelways 344 in the third embodiment mix any air and fluid that are passed downstream axially outwardly therethrough. Flow downstream, that is axially inwardly, through the sleeve passageways 320 where formed by the air sleeve channelways 336 and mixing sleeve channelways 436 that is towards the first sleeve end 214 increases the resistance to downstream flow of the fluid, and upstream flow that is axially outwardly, through sleeve passageways 320 where formed by the air sleeve channelways 336 and mixing sleeve channelways 436 that is the towards the second sleeve end 215 is relatively freely without the increased resistance to upstream flow that is caused by flow downstream through the splitting of the downstream flow. The flow upstream axially towards the first sleeve end 214 is to be considered flow in a first direction and the flow downstream axially towards the second sleeve end 215 is considered flow in a second direction opposite to the first direction.

As seen in FIG. 22, the elongate plug member 232 extends axially from a first plug end 233 axially outwardly to a second plug end 234. The plug member 232 has a plug outer wall surface 235 which is circular in any cross-section normal the axis 31 and is preferably cylindrical between the first plug end 233 and the second plug end 234. Four identical plug channelways 236 are provided in the plug outer wall surface 235, each plug channelway 236 is a channelway that is cut radially inwardly into the plug member 232 from the plug outer wall surface 235 forming a channelway that opens radially outwardly along the length of each plug channelway 236 to the plug outer wall surface 235. Each of the plug channelways 236 is open axially at the first plug end 233 and at the second plug end 234. The plug member 232 is securely fixedly coupled to the sleeve member 210 within the sleeve bore 175 yet permitting axial flow therebetween of air and fluid.

With the plug member 232 received coaxially within the sleeve member 210, the cylindrical plug outer wall surface 235 is in opposed engagement with the cylindrical sleeve inner wall surface 212 so as to prevent any substantial air or fluid flow therebetween other than through plug passageways 244 defined between each plug channelway 236 and the sleeve inner wall surface 212 for flow of fluid. Four such plug passageways 244 are provided with each providing for fluid flow longitudinally between an axially inner end of the plug passageway 244 opening axially inwardly at the first plug end 233 and an axially outwardly into the annular mixing cavity 241 at the second plug end 234.

The plug channelways 336 in the second embodiment are configured to be substantially the same as the plug channelways 336 in the first embodiment and configured to provide the plug passageways 244 that will mix any air and fluid that are passed downstream axially inwardly therethrough in the same manner that the plug passageways 244 in the first embodiment mix any air and fluid that are passed downstream axially inwardly therethrough. As in the first embodiment, in the second embodiment, the plug passageways 244 have left mixing portions 501 alternating with right mixing portions 502 providing in series successive mixing portions in the plug passageway 236. The plug passageways 244 in the second embodiment are thus configured to be substantially the same as the plug passageways 244 in the first embodiment and configured with successive mixing portions in series along the plug passageways 244 to mix the air and fluid that are simultaneously passed downstream axially outwardly therethrough and by such mixing of the air and liquid, foam of the air and fluid is generated. As in the first embodiment downstream flow from the first plug end 233 towards the second plug end 234 increases the resistance to flow of the fluid from the first plug end 233 to the second plug end 234, and upstream flow through the plug channelway 236 from the first plug end 233 to the second plug end 234, is relatively freely without the increased resistance to flow that is caused by downstream through the splitting of the downstream flow. As in the first embodiment, in the second embodiment, upstream flow from the second plug end 234 to the first plug end 233 is to be considered flow in a primary direction and the downstream flow from the first plug end 233 to the second plug end 234 may be considered flow in a secondary direction opposite to the primary direction.

Axially outwardly from the second plug end 234, plug member 232 carries an end flange 238 having an array of end flange openings 239 extending axially therethrough. The end flange 238 is coupled to the center plug member 232 by support beams 240 which effectively define between the second plug end 234 and the end flange 238, an annular mixing cavity 241.

In the second embodiment, the sleeve member 210 and the plug member 232 are fixed together in a desired rotational orientation against relative angular rotation by an arrangement not shown but preferably similar to the spline key 225 and the complementary keyway 248 described regarding the third embodiment.

The sleeve end wall 216 has an end wall inner surface 243 directed axially inwardly into the sleeve bore 175 with the end wall openings 217 passing through the end wall inner surface 243 with each opening 217 providing a respective cross-sectional area for fluid flow in the end wall inner surface 243. The end flange 238 of the plug member 232 has an end flange outer surface 344 directed axially outwardly. The end flange openings 239 pass through the end flange outer surface 344 with each end flange opening 239 providing a respective cross-sectional area for fluid flow in the end flange outer surface 344. The end flange outer surface 344 is engaged with the end wall inner surface 243 with each of the end flange openings 239 in overlapping registry with a respective one of the end wall openings 217 providing at the interface of the end flange outer surface 344 and the end wall inner surface 243 a cross-sectional area for fluid flow less than both the cross-sectional areas for fluid flow of the respective end flange openings 239 in the end flange outer surface 344 and the cross-sectional area for fluid flow of the respective end wall openings 217 in the end wall inner surface 243. As described with the first embodiment providing such a reduced cross-sectional area for fluid flow can assist in the advantageous production of advantageous foam of air and liquid simultaneously being passed therethrough.

In the preferred embodiment as illustrated, for example, in FIG. 18, the end flange 238 is axially adjacent and engaged with the sleeve end wall 216. This is not necessary and other configurations may be provided as, for example, with the end flange 238 located axially outwardly from the sleeve end wall 216 so as to provide a mixing cavity between the plug end flange 238 and the sleeve end wall 216. In addition, while not necessarily preferred, a separate foaming mechanism such as a porous member or sponge may be provided intermediate the end flange 238 and the sleeve end wall 216.

The radially extending sleeve end wall 216 closes the sleeve bore 175 at the second end 215 of the sleeve member 210 but for the end wall openings 217. When inserted into the sleeve bore 75, as shown in FIG. 25, the end flange 238 closes the sleeve bore 75 but for the end flange openings 239. In an alternative embodiment, either one or both of the end flange 238 and the end wall 216 may be eliminated.

As can best be seen in FIG. 18, in a retraction stroke the air pump 28 discharges air through the air ports 67 into the sleeve passageways 320 where formed by the annular air manifold channelway 314 for downstream flow via the sleeve passageways 320 where formed by the air sleeve channelways 336 to the sleeve passageways 320 where formed by the annular liquid manifold channelway 316, simultaneously with the liquid pump 26 discharging the fluid from the reservoir through the liquid ports 65 into the sleeve passageways 320 where formed by the annular liquid manifold channelway 316 for mixing with the discharged air. The discharged air and fluid are passed downstream axially inwardly longitudinally from the sleeve passageways 320 where formed by the annular liquid manifold channelway 316 through the sleeve passageways 320 where formed by the four mixing sleeve channelways 436 into the transfer chamber 303. The transfer chamber 303 is closed to flow axially inwardly therefrom by the end wall 302, the interior wall 309 of the transfer chamber 303 and the engagement of the vent disc 308 with the interior wall 309 of the transfer chamber 303, at the least when the transfer chamber 303 is pressurized by air and fluid the retraction stroke. The mixture of the air and fluid flows from the sleeve passageways 320 at the first sleeve end 214 into the transfer chamber 303, downstream through the transfer chamber 303 and from the transfer chamber 303 into the plug passageways 244 at the axially inner plug first end 233 of the plug member 232. The mixture of the air and fluid flows then flows downstream axially outwardly through the plug passageways 244 to exit the plug passageways 244 at the second plug end 234 where the mixture of air and the fluid flows downstream into an outer annular mixing chamber 276 formed within the annular mixing cavity 241 inside the sleeve bore 75. Subsequently, the mixture of air and liquid flows downstream axially outwardly through the plug end flange 238 and the sleeve end wall 216 through the overlapping portions of the end flange openings 239 and the end wall openings 217 and hence out the discharge outlet 29.

In the retraction stroke, the air pump 28 forces air through the air port 67 into the annular air channelway 314 which acts in the manner of an annular manifold header from which the air flows into the air sleeve channelways 336 and, hence, into the annular liquid channelway 316. Simultaneously, the liquid pump 26 forces the fluid into the annular liquid channelway 426. The annular liquid channelway 426 effectively serves as an initial mixing chamber for mixing of the air and the fluid and, as well, as a manifold header for directing the mixture of air and fluid simultaneously downstream into the mixing sleeve channelways 436. The mixture of air and fluid flows downstream through the mixing sleeve channelways 436 to the axially inner first sleeve end 214 of the sleeve member 210 and into the transfer chamber 303 which serves as another mixing chamber open to the axially inner openings of the plug passageways 236 following which the mixture flows downstream through the plug passageways 236 from the first plug end 233 to the second plug end 234 and, hence, into the annular mixing chamber 276 before passage through the plug end flange and the vent disc 208 and into a discharge mixing chamber 69 and, hence, to be discharged downstream out the discharge outlet 29 as foam.

The mixing of the air and the fluid from the reservoir provides for the formation of a foam of the air and the fluid which such mixing and foam generation assisted notably by the passage downstream through the sleeve passageways 320 where formed by the mixing sleeve channelways 436 and through the plug passageways 244 which can provide adequate foaming. The inclusion of the various mixing chambers such as the transfer chamber 303, the annular mixing chamber 276 and the discharge mixing chamber 69 as well as the overlapping screen structure formed by the end flange 238 and the sleeve end wall 217 and the openings therethrough can be advantageous, however, each is not necessary.

In a return stroke, in moving from a retracted condition such as shown in FIG. 19 to an extended position as shown in FIG. 18, atmospheric air is drawn into the air compartment 68 by the upstream flow of air via the dispensing outlet 29 through a discharge tube 78 through the openings 217 and 239 in the sleeve end wall 216 and the end flange 238 through the outer mixing compartment 276, through the plug passageways 244, the transfer chamber 303, the sleeve passageways 320, the air ports 67 into the air compartment 68. In the drawing of air into the air compartment 68 upstream through the plug passageways 244 from the second plug end 234 to the first plug end 233, the air flow is upstream, that is in the primary direction, and the air is able to flow upstream relatively freely through the plug passageways 244, and similarly in the drawing of air into the air compartment 68 upstream through the sleeve passageways 230 from the second sleeve end 215 to the first sleeve end 214, the air flow is upstream, that is in the first direction, and the air is able to flow upstream relatively freely through the sleeve passageways 230. In the drawing of air into the air compartment 68 upstream through both the plug passageways 244 and the sleeve passageways 230, any foam and liquid may be drawn back, for example, to sit as in a sump formed in the air compartment 68 axially inwardly of the air disc 306 for discharge in the next stroke of operation.

Figure 26:
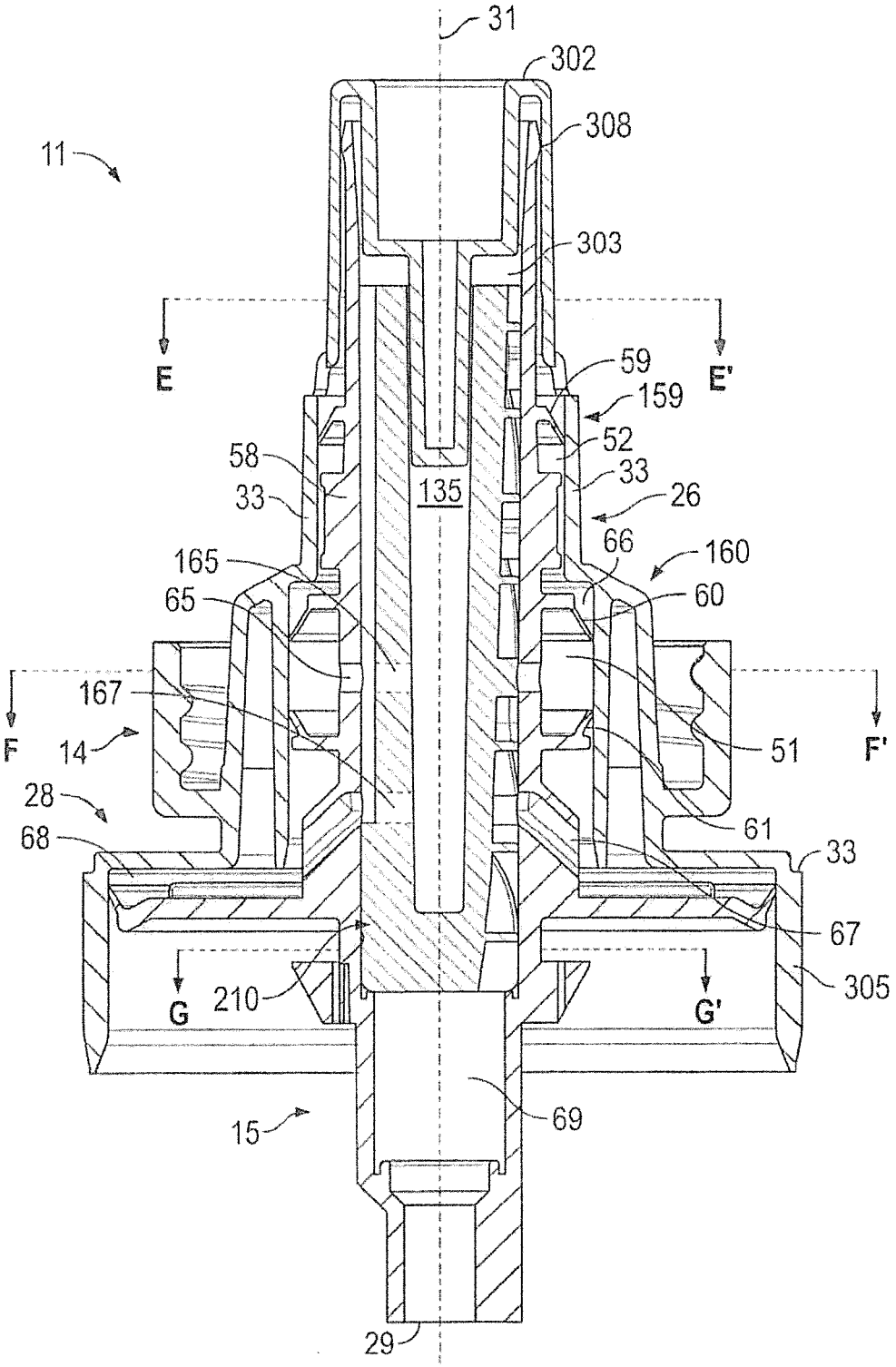
FIG. 26 is a perspective view of a foaming pump assembly in accordance with a third embodiment of the present invention.

Reference is made to FIGS. 26 to 29 and FIG. 31 which illustrate a third embodiment of the foaming pump assembly 11 in accordance with the present invention. FIG. 26 is a cross-sectional side view of the third embodiment in a retracted position substantially the same as FIG. 19 showing the second embodiment in side view. The third embodiment of FIG. 26 is identical to the second embodiment of FIG. 19 with the exception that, while the third embodiment has both a sleeve member 210 and a plug member 232 inside the piston-forming element 15, in the third embodiment of FIG. 26 there is provided merely a plug member 232 inside the piston-forming element 15.

Figure 30:
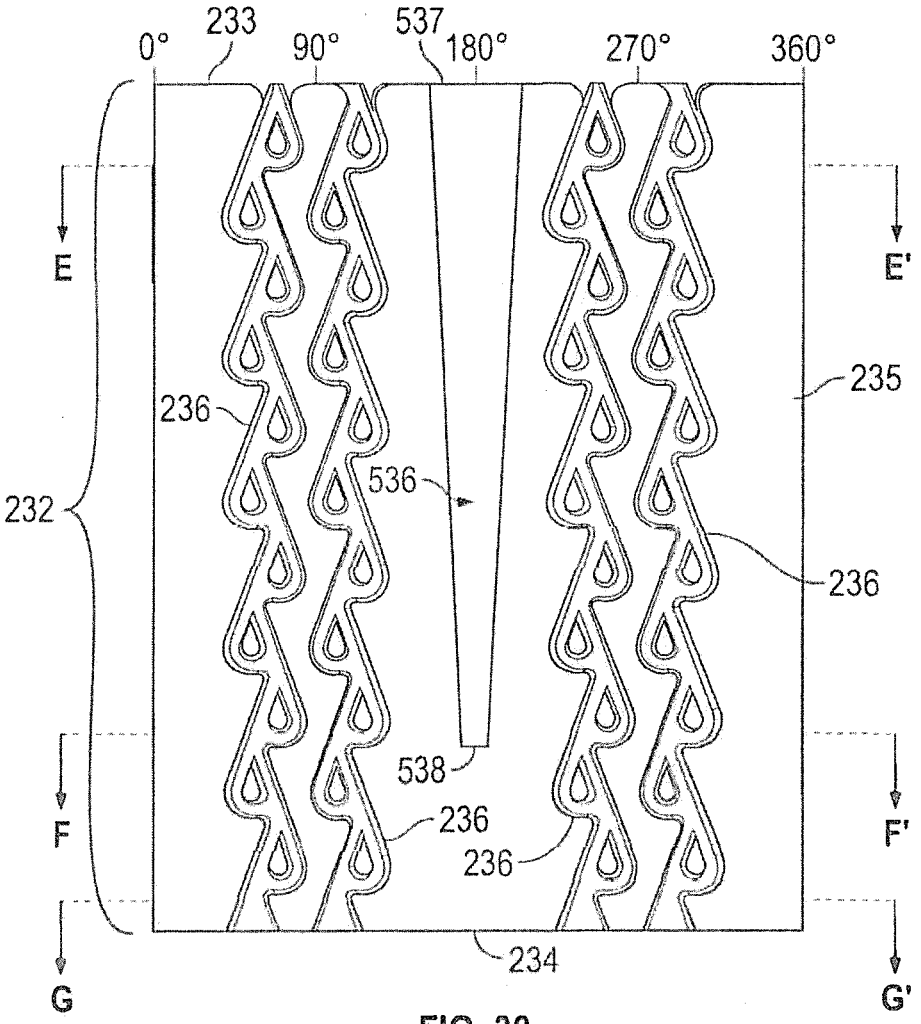
FIG. 30 shows an orthographic projection similar to that of FIG. 16 but of a plug member of a piston-forming element of FIG. 26.

Reference is made to FIG. 30 which shows an orthographic projection of the plug member 233 of FIG. 26 which is similar to the orthographic projection shown in FIG. 16 in showing four plug channelways 236 extending axially from a first plug end 232 to a second plug end 234. Each of the plug channelways 236 is open at a first plug end 233 and at the second plug end 234. Each of the four plug channelways comprise Tesla valvular conduits the same as in FIG. 16. However, on FIG. 30, a fifth plug channelway 536 is shown extending axially centered on the 180 degree location and open at a second end 538 at the first plug end 233. The plug channelway 536 extends axially towards the second plug end 234 but terminates at a first blind end 537. The plug member 232 is fixedly received within the piston-forming element 15 in a desired position against angular rotation about the axis 31 such that, as seen on FIG. 26, a single air port 67 through the piston-forming element 15 and a single liquid port 65 to the piston-forming element align and communicate with the plug channelway 536. The plug channelway 536 thus provides for communication between each of the air compartment 68 and the liquid compartment 66 to the transfer chamber 303. The four plug channelways 236 provide for communication between the transfer chamber 303 and the discharge outlet 29. In the plug channelways 536, fluid flow in a downstream direction is from the first blind end 537 towards the open second end 538. In the channelways 236, flow in a downward direction is from the first plug end 233 towards the second plug end 234. The single plug member 232 in FIG. 26 provides for the plug channelways 236 and 536 in the same plug outer wall surface 235 to flow downstream from the liquid pump 26 and the air pump 28 to the transfer chamber 303, that is, axially inwardly and then reversing direction to provide for flow from the transfer chamber 303 in a downstream direction axially outwardly to the discharge outlet 29.

Figure 27:
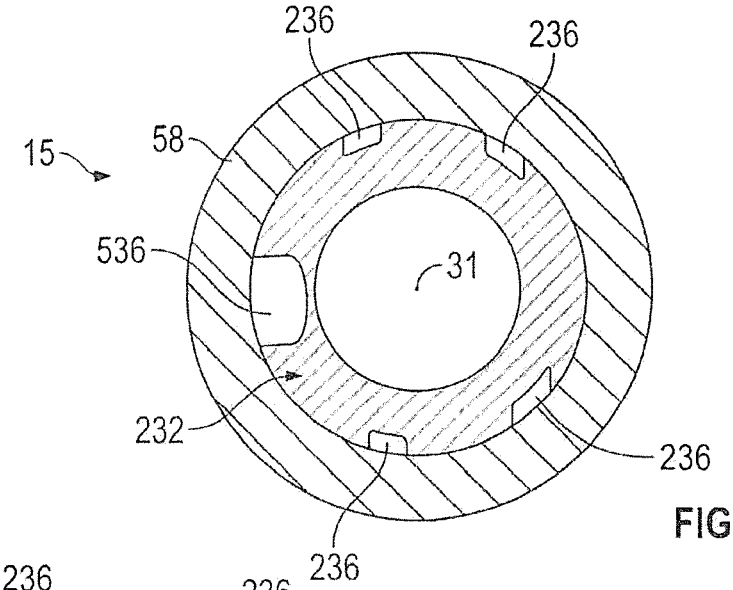
FIGS. 27, 28 and 29 are cross-sectional views of a piston member of the foaming pump assembly of FIG. 26 as seen along respective section lines E-E'; F-F' and G-G' in FIG. 26.
Figure 28:
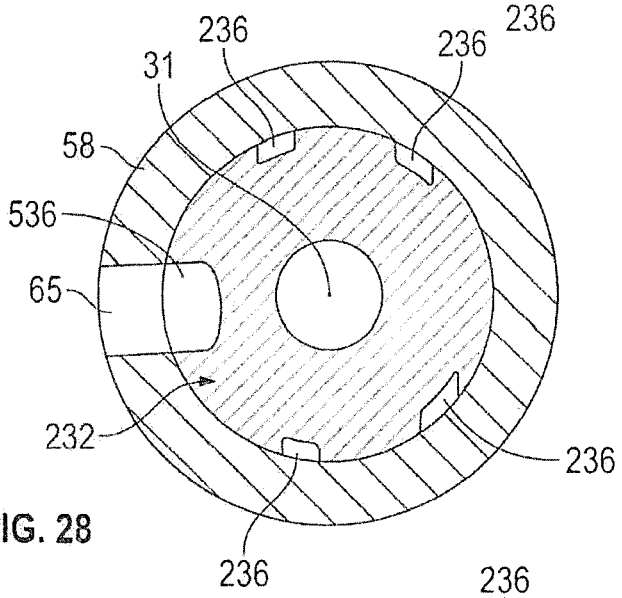
Figure 29:
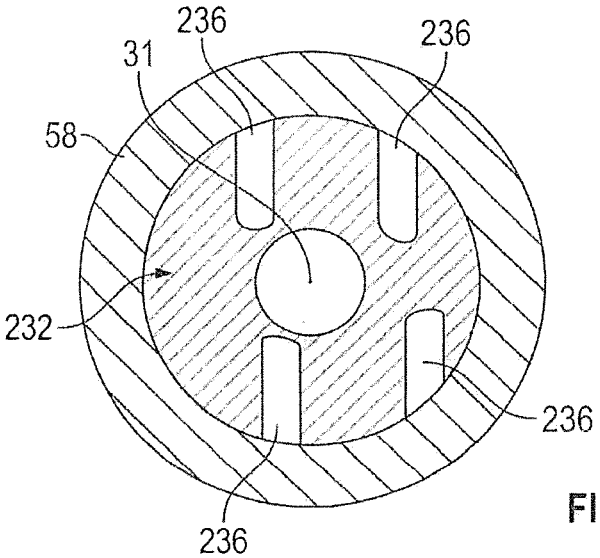
Figure 31:
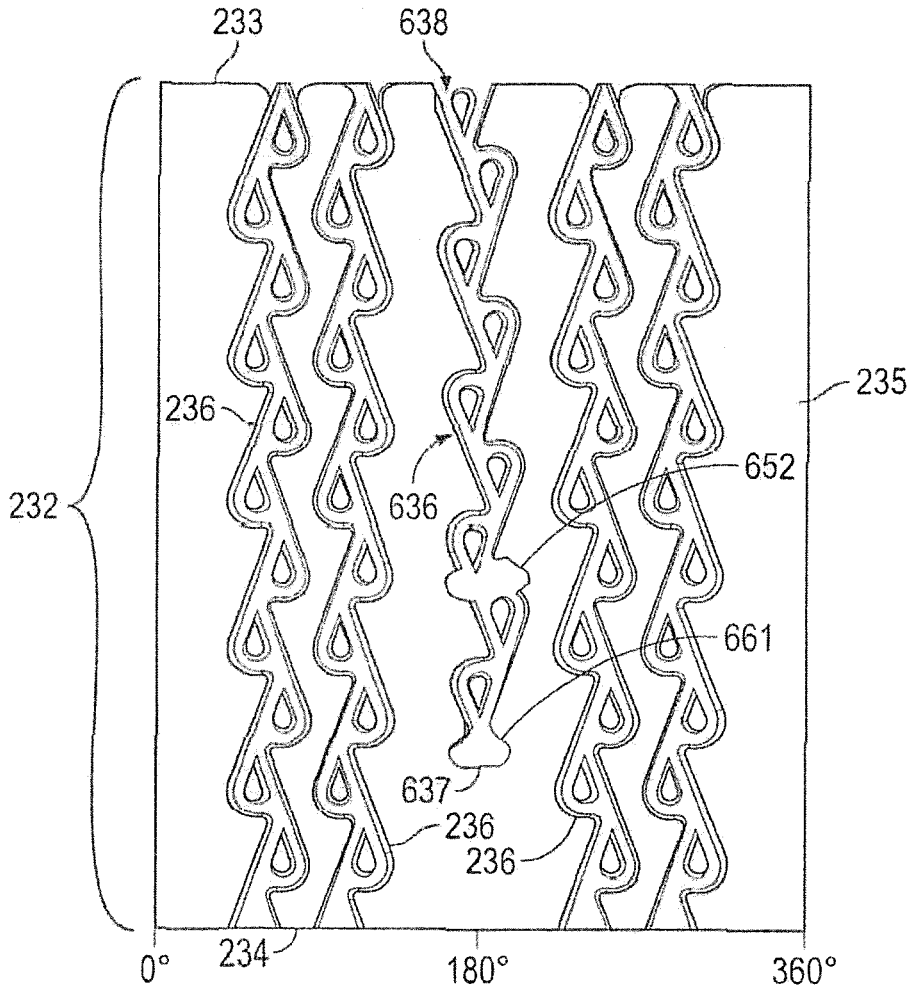
FIG. 31 shows an alternate orthographic projection to the orthographic projection of FIG. 30.

FIG. 27 illustrates a cross-sectional view through the piston member P formed by the piston-forming element 15 and the plug member 232 along section line E-E' on FIGS. 26 and 31 through the liquid port 65. FIG. 28 shows a similar cross-section to that of FIG. 27 but along section line F-F' on FIGS. 26 and 31. FIG. 29 shows a similar cross-section to that of FIG. 27 but along section line G-G' in FIGS. 26 and 31.

As can be seen, the radial depth of plug channelway 536 increases from its first end 537 to its second end 538 and, as well, the circumferential width of the plug channelway 536 increases from its first end 537 to its second end 538. Thus, the cross-sectional area of the plug channelway 536 normal the axis 31 increases from its first end 537 to its second end 538. As well, the radial depth of each of the plug passageways 236 increases from the first plug end 233 to the second plug end 234 thus increasing the cross-sectional area of each plug passageway 236 normal the axis 31 so as to accommodate in the flow in a downward direction from the transfer chamber 303 towards the discharge outlet 29 an increase in volume of the mixture of the fluid and air as can be advantageous with the sequential generation of foam in flow in the downward direction through each plug passageway 236.

Reference is made to FIG. 31 which illustrates an orthographic projection of an alternative version of the plug member 232 in FIG. 26, however, in which the plug channelway 536 of FIG. 30 is replaced by a Tesla valvular conduit 636 having a configuration substantially the same as the other plug passageways 236, however, arranged for mixing and increased resistance to fluid flow in a direction from the blind first end 637 toward the open second end 638. The plug channelway 636 includes enlarged portions identified as 661 and 662 where the air port 67 and the liquid port 65 are to communicate with the plug passageway 636. Merely one such plug passageway 636 may be spaced circumferentially about the plug member 232 spaced circumferentially between the other plug passageways 236.

In the embodiment of FIG. 26, the plug passageway 536 provides communication from each of the air port 67 and liquid port 65 axially inwardly to the transfer chamber 303. An alternative configuration to provide for communication between the air port 67 and the liquid port 65 and the transfer chamber 303 is to eliminate the plug passageway 536 and to provide in communication with the air port 67 an opening 167 radially through the plug member 232 as indicated by dashed lines in FIG. 26 into an internal center passage 135 within the plug member 232 for flow within the internal center passage 135 to the transfer chamber 303. Similarly, an opening 165 shown in dashed lines may be provided radially through the plug member 232 in communication with the liquid port 65 to provide flow from the liquid port 65 into the center passage 135 and, hence, by the center passage 135 to the transfer port.

Figure 32:
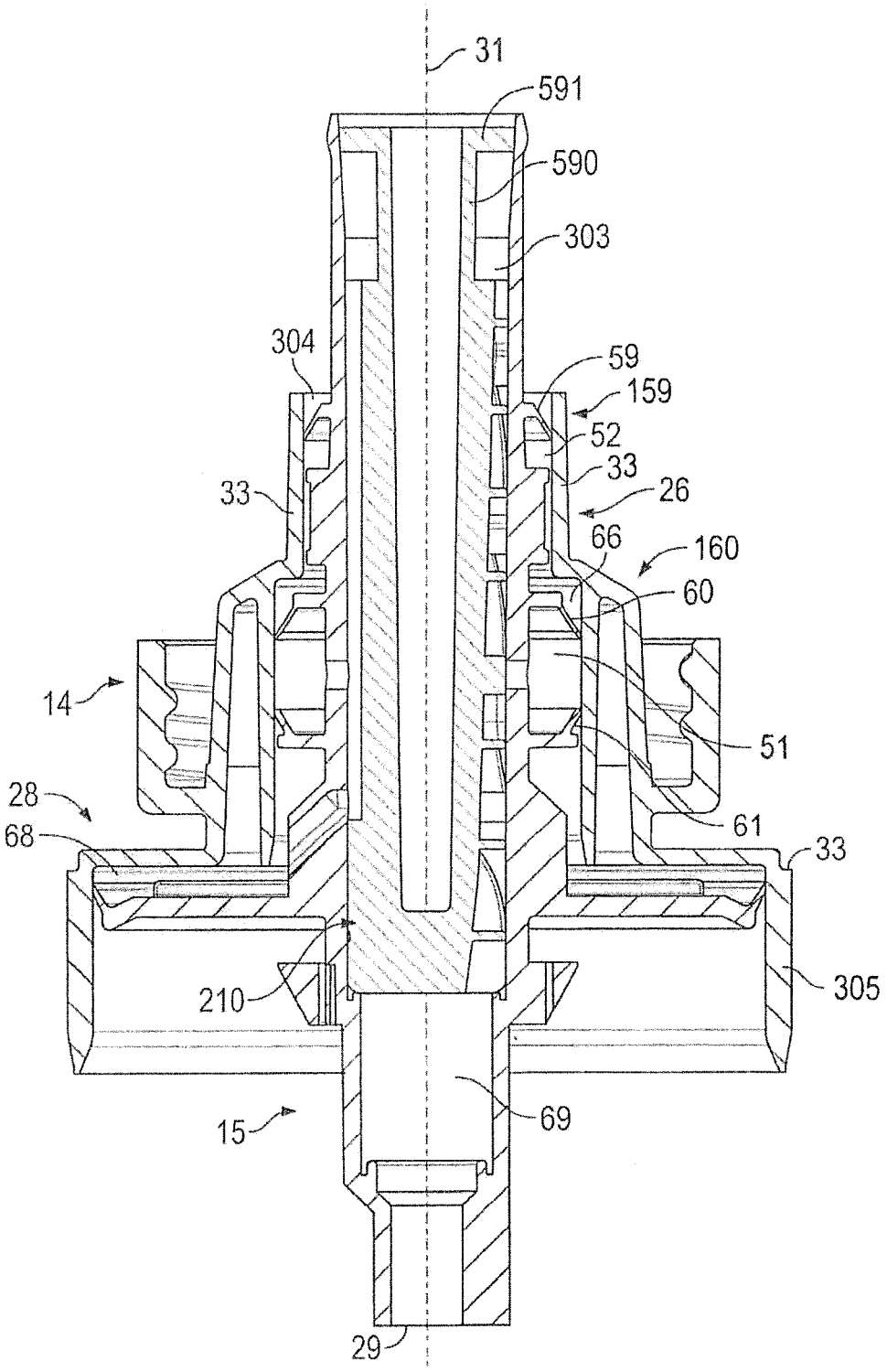
FIG. 32 is a perspective view of a foaming pump assembly in accordance with a fourth embodiment of the present invention.

Reference is made to FIG. 32 showing a fourth embodiment of the foaming pump assembly 11 having close similarities to the foaming pump assembly of the third embodiment. The foaming pump assembly 11 of FIG. 32 does not provide an equivalent to an air relief valve 30 as in the third embodiment and, as such, the central stem 58 terminates at the transfer ports 304. The plug member 232 in FIG. 32 is the same as the plug member 232 in FIG. 26, however, includes an axially inwardly extending tube portion 590 from the axial inner end of the plug member 232 terminating at a radially outwardly extending stop flange 591 sealably engaged with the inner end of the piston-forming element 15 to form the annular transfer chamber 303.

Figure 33:
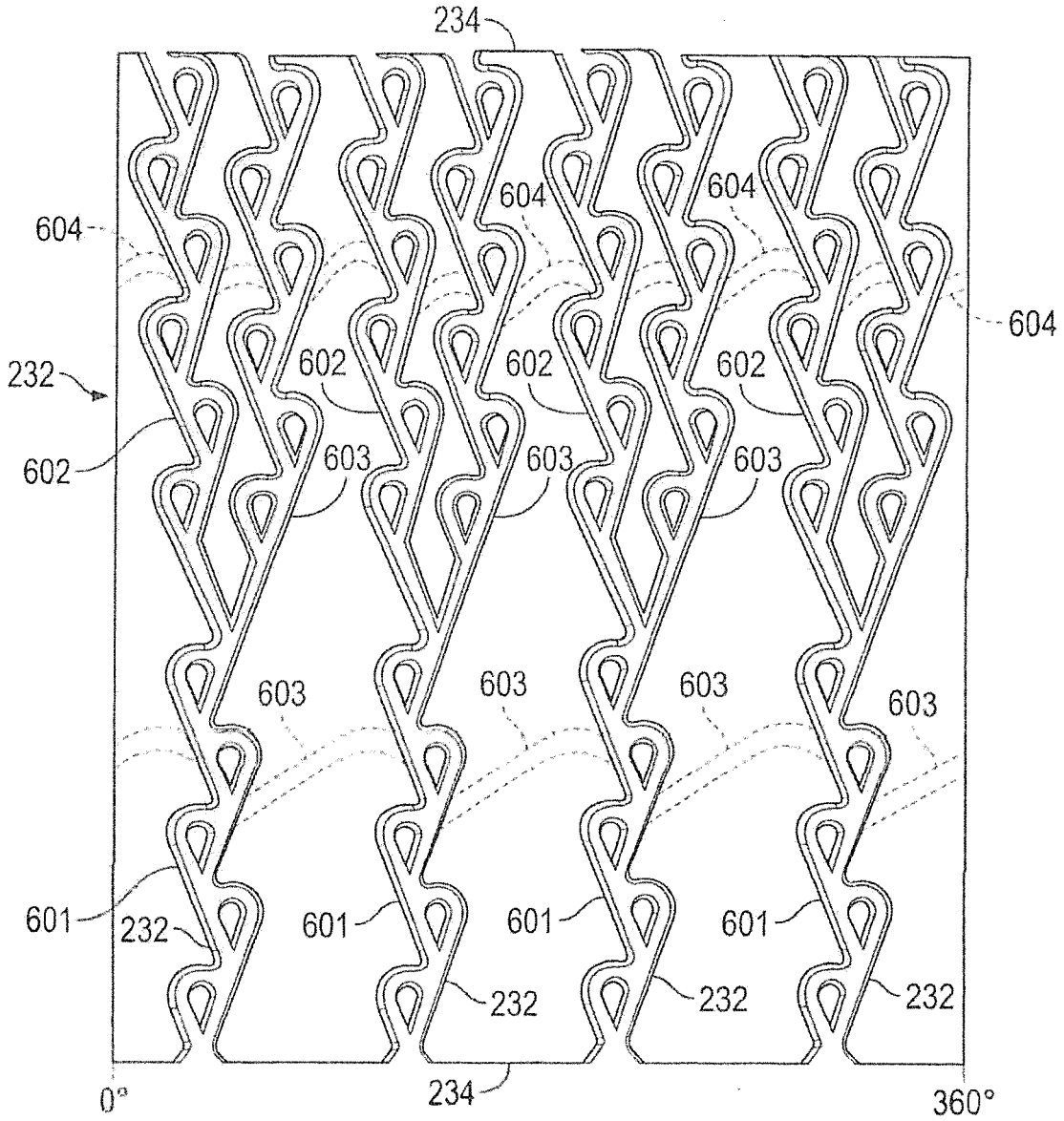
FIG. 33 shows an alternate orthographic projection to the orthographic projection of FIG. 16.

Reference is made to FIG. 33 which shows an orthographic projection of plug channelways 232 for a plug member 232 similar to the orthographic projection of FIG. 16 which can be used on the plug member 232 of the piston-forming element, for example, of FIG. 10. Similar to that in FIG. 16, proximate the first plug end 233, the plug channelways comprise four circumferentially spaced plug channelways 232, each having a first portion 601, each first portion 601 split at 602 into two downstream portions 602 and 603. In addition, there are shown in dashed lines a number of additional connecting channels 603 that can be provided to laterally connect adjacent of the channelways over the first channel portions 601 and also a series of optional interconnecting plug channelways 604 to connect adjacent of the downstream portions 602 and 603. FIG. 33 thus illustrates manners of splitting and interconnecting the various plug channelways as, for example, to achieve different objectives such as interconnecting the plug channelways to provide for uniform pressure drop and flow through plug passageways and/or to increase the cross-sectional area for flow by increasing the number of passageways. As with the other embodiments, the cross-sectional areas of each of the channelways may be increased by increasing either the circumferential width of each channelway or their radial depth of the outer plug surface.

In the preferred embodiments, the reservoir 12 is shown as being a non-collapsible reservoir with an air relief valve 30 to permit atmospheric air to relieve any vacuum that may be developed in the reservoir. The reservoir 12, notably as in the fourth embodiment of FIG. 26, need not be a non-collapsible reservoir and may well, for example, comprise a collapsible reservoir in which there is no need for the air relief valve 30.

The preferred embodiments illustrate arrangements in which air is drawn into the air compartment 68 by drawing atmospheric air upstream through the foam generator 80 into the air compartment. This can be advantageous as, for example, to draw back air foam and the liquid from the foam generator 80 and notably from the discharge outlet 29 so as to prevent possible dripping from the discharge outlet 29 when the pump assembly 11 is not used, however, this is not necessary. Rather, a separate arrangement may be provided to permit atmospheric air to be drawn into the air compartment 68. For example, a separate air pump one-way inlet valve could be provided, for example, through where the tube 33 defines the air compartment 68.

In each of the embodiments, the liquid pump 26 and the air pump 28 are illustrated as being in phase, that is, each is operated in the same stroke of operation, in each of the embodiments illustrated in the retraction stroke. Firstly, pumps could be arranged in which there is simultaneous discharge of air and liquid and both the liquid pump 26 and the air pump in a withdrawal stroke. As well, the liquid pump 26 and the air pump 28 can be arranged to operate out of phase as, for example, with the liquid from the liquid pump 26 being injected into a liquid sump, for example, in the air compartment 68 and operation of the air pump 28 serving to simultaneously discharge the fluid in the sump together with air into the foam generator.

In each of the embodiments, the plug member 232 is shown as having an outer surface 235 which is circular in any cross-section along the axis 31 and preferably cylindrical and adapted to complementarily mate in the sleeve bore 175 having its sleeve inner wall surface that is circular in any cross-section along the axis. Various cross-sectional shapes along the axis could be provided other than circular which would provide for closely opposed or engaged interaction between the plug outer wall surface 235 and the sleeve inner wall surface 212 so as to permit plug passageways 244 to be defined therebetween. Such shapes could include, for example, oval shapes and other parts which are arcuate or polygonal shapes accommodating receipt of a tubular plug member 232 coaxially within a complementary sleeve bore 175. Insofar as the complementary cross-sectional shapes are not circular, then their engagement may provide for suitable relative rotational location of the plug member 232 within the sleeve member 210 as can be advantageous.

In the second embodiment as illustrated in FIGS. 17 to 25, an air relief valve 30 is provided formed between the vent disc 308 and the interior wall 309 of the transfer chamber 303 in a manner as described in above-noted Canadian Patent Application 2,875,105. The provision of such an air relief valve 30 is advantageous but not necessary as, for example, if the reservoir 12 is a collapsible reservoir or if there is some other air relief valve provided to relieve vacuum conditions in the reservoir 12. For example, what is referred to as a vent disc 308 may merely engage the interior wall 309 so as to prevent any fluid flow inwardly or outwardly therethrough.

While the invention has been described with reference to preferred embodiments, many modifications and variations will now occur to a person skilled in the art. For a definition of the invention, reference is made to the following claims.

We claim:

1. A foaming pump discharging a hand cleaning fluid mixed with air as a foam from a discharge outlet having:

a piston [liquid] chamber-forming body about a longitudinal axis, a piston member, a foam generator carried by the piston member having a passageway with an entrance and an [outlet] *exit*, the piston member coupled to the piston [liquid] chamber-forming body with the piston member reciprocally coaxially slidable about the axis relative the piston [liquid] chamber-forming body in a cycle of operation between a retracted position and an extended position to define therebetween both:

(a) an air pump having an air compartment having a variable volume to draw in atmospheric air into the air compartment and discharge the air into the entrance; and (b) a liquid pump having a liquid compartment having a variable volume to draw a fluid from a fluid reservoir and discharge the fluid to the entrance, wherein with reciprocal movement of the piston member axially relative the piston chamber-forming body air discharged by the air pump and fluid discharged by the liquid pump are simultaneously forced through the entrance into the passageway, downstream through the passageway, and out the exit to [a] *the* discharge outlet, characterized by:

the piston member comprising an elongate sleeve member and an elongate center plug member, the sleeve member extending from a first sleeve end to a second sleeve end about the axis, the plug member extending from a first plug end to a second plug end about the axis, the sleeve member having a sleeve side wall with a circumferential radially inwardly directed sleeve inner wall surface about the axis defining a sleeve bore within the sleeve member extending along the axis, the plug member having a circumferential radially outwardly directed plug outer wall surface about the axis, at least one plug channelway in the plug outer wall surface of the plug member open radially outwardly relative the axis along its length to the plug outer wall surface of the plug member, the plug member received coaxially within [in] the sleeve bore with first plug end proximate the first sleeve end and the plug outer wall surface of the plug member in opposed engagement with the sleeve inner wall surface of the sleeve member defining between each plug channelway and the sleeve inner wall surface of the sleeve member a plug passageway forming a first portion of the passageway, each plug passageway defined between each plug channelway and the sleeve inner wall surface of the sleeve member to have plug passageway interior walls, the plug passageway interior walls configured to provide a plurality of mixing portions in series within the plug passageway, each mixing portion configured to split flow downstream from an upstream main channel into a first channel and a second channel separate from the first channel, the first channel merging with the second channel into a downstream main channel with the first channel directing flow through the first channel where the first channel merges with the second channel in a first direction and the second channel where the second channel merges with the first channel directing flow through the second channel in a second direction different than the first direction to mix the flow through the first channel and the flow through the second channel on the first channel merging with the second channel, wherein in passage of the air and the fluid downstream through the plurality of mixing portions, the air and the first fluid are mixed to form a foam of the air and the fluid discharged from the exit and out the discharge outlet downstream from the exit.

2. A foaming pump as claimed in claim 1 wherein:

the inwardly directed sleeve inner wall surface is circular in cross-section normal the axis, and the outwardly directed plug outer wall surface is circular in cross-section normal the axis.

3. A foaming pump as claimed in claim [2] *1* wherein:

the discharge outlet is open to atmospheric air, and the air pump draws in the atmospheric air via the discharge outlet upstream through the foam generator into the air compartment.

4. A foaming pump as claimed in claim 1 wherein each mixing portion having the upstream main channel, a fork, the first channel, the second channel separate from the first channel, a merge, and the downstream main channel, each mixing portion configured to split the flow from the upstream main channel at the fork into the first channel and the second channel separate from the first channel, the first channel merging at the merge with the second channel into the downstream main channel with the first channel directing flow through the first channel at the merge in the first direction and the second channel directing flow through the second channel at the merge in the second direction different than the first direction, the second direction being different from the first direction to mix the flow through the first channel and the flow through the second channel at the merge.

5. A foaming pump as claimed in claim 1 wherein the interior walls are configured so that flow downstream provides a downstream resistance to flow downstream and flow up stream opposite to flow downstream provides an upstream resistance to flow that is less than the downstream resistance to flow.

6. A foaming pump as claimed in claim 1 wherein the second direction and the first direction form a merge angle therebetween of at least 90 degrees so that flow downstream provides a downstream resistance to flow and flow upstream opposite to flow *downstream* provides an upstream resistance to flow that is less than the downstream resistance to flow.

7. A foaming pump as claimed in claim 1 wherein the interior walls are configured to permit the relatively free passage of fluid upstream but to subject the fluid to rapid reversals of direction when the fluid is forced through the passageway downstream to thereby increase resistance to movement of the fluid through the passageway downstream compared to resistance to movement of the fluid upstream.

8. A foaming pump as claimed in claim 1 wherein:

the at least one plug channelway comprises a plurality of the plug channelways circumferentially spaced from each other about the plug member, and each plug passageway extends longitudinally along the plug member.

9. A foaming pump as claimed in claim 1 including:

an elongate tube member, the tube member extending from a tube first end to a tube second end about the longitudinal axis, the tube member having a tube side wall with a circumferential inwardly directed tube inner wall surface circular in cross-section normal the axis defining a tube bore within the tube member extending along the axis, the sleeve member having a cylindrical circumferential outwardly directed sleeve outer wall surface circular in cross-section normal the axis, at least one sleeve channelway in the sleeve outer wall surface of the sleeve member open radially outwardly along its length to the sleeve outer wall surface, the sleeve member received coaxially within the tube bore with *the tube* first [plug] end proximate the first sleeve end and the sleeve outer wall surface of the sleeve member in opposed engagement with the tube inner wall surface of the tube member defining between each sleeve channelway and the tube inner wall surface of the tube member a sleeve passageway forming a second portion of the passageway, each sleeve passageway defined between each sleeve channelway and the tube inner wall surface of the tube member to have sleeve passageway interior walls, the sleeve passageway interior walls configured to provide a plurality of the mixing portions in series along the sleeve passageway.

10. A foaming pump as claimed in claim 9 wherein:

the at least one sleeve channelway comprises a plurality of the sleeve channelways circumferentially spaced from each other about the sleeve member, and each sleeve passageway extends longitudinally along the sleeve member.

11. A foaming pump as claimed in claim 9 including a transfer passage directing flow of the fluid radially between each plug passageway at the first *plug* end of the plug member and each sleeve passageway at the first *sleeve* end of the sleeve member, downstream flow in the plug passageways being axially from the [second] *first plug* end of the plug member towards the [first] *second plug* end of the plug member, and downstream flow in the sleeve passageway being axially from the [first] *second sleeve* end of the sleeve member towards the [second] *first sleeve* end of the sleeve member.

12. A foaming pump as claimed in claim 9 wherein downstream flow in the sleeve passageway being axially from the [first] *second sleeve* end of the sleeve member toward the [second] *first sleeve* end of the sleeve member, the sleeve member including a radially extending sleeve end wall closing the sleeve bore at the second *sleeve* end of the sleeve member but for an array of end wall openings axially through the sleeve end wall, the end wall openings in communication with the plug passageway at the second *sleeve* end of the sleeve member.

13. A foaming pump as claimed in claim 9 wherein downstream flow in the plug passageways being axially from the [second] *first plug* end of the plug member toward the [first] *second plug* end of the plug member;

the plug member including a radially extending end flange at the second *plug* end of the plug member received in the sleeve bore at the second *sleeve* end to close the sleeve bore but for an array of end flange openings axially through the end flange, the end flange openings in communication with the plug passageway at the second *sleeve* end of the sleeve member.

14. A foaming pump as claimed in claim [13] *12*wherein the plug member including a radially extending end flange at the second *plug* end of the plug member received in the sleeve bore at the second *sleeve* end axially inwardly of the end wall to close the sleeve bore but for an array of end flange openings axially through the end flange, the end flange openings in communication with the plug passageway at the second *sleeve* end of the sleeve member, the end wall openings in communication with the plug passageway at the second *sleeve* end of the sleeve member via the end flange openings.

15. A foaming pump as claimed in claim [11] *12*wherein the tube bore is closed at the *tube* first end of the tube member, the first *sleeve* end of the sleeve member is spaced axially away from the *tube* first end of the tube member toward the *tube* second end of the tube member, and the transfer passage is defined axially between the closed *tube* first end of the tube member and the first *sleeve* end of the sleeve member, at the second *sleeve* end of the sleeve member, the sleeve outer wall surface [sealable] *sealably* engaging with the tube inner wall surface to form a circumferential seal preventing fluid flow axially between the sleeve member and the tube member, spaced toward the second *sleeve* end of the sleeve member from the sleeve passageways, and the tube bore is open at the *tube* second end of the tube member, the tube member extending beyond the end wall of the sleeve member, the tube bore beyond the end wall of the sleeve member providing a discharge passage extending to the discharge outlet provided as an open *tube* second end of the tube member.

*16. A foaming pump as claimed in claim 5 wherein:*

*the discharge outlet is open to atmospheric air, and the air pump draws in the atmospheric air via the discharge outlet upstream through the foam generator into the air compartment.*

*17. A foaming pump as claimed in claim 7 wherein:*

*the discharge outlet is open to atmospheric air, and the air pump draws in the atmospheric air via the discharge outlet upstream through the foam generator into the air compartment.*

*18. A foaming pump as claimed in claim 10 wherein:*

*the discharge outlet is open to atmospheric air, and the air pump draws in the atmospheric air via the discharge outlet upstream through the foam generator into the air compartment.*

*19. A foaming pump as claimed in claim 14 wherein:*

*the discharge outlet is open to atmospheric air, and the air pump draws in the atmospheric air via the discharge outlet upstream through the foam generator into the air compartment.*

*20. A foaming pump as claimed in claim 15 wherein:*

*the discharge outlet is open to atmospheric air, and the air pump draws in the atmospheric air via the discharge outlet upstream through the foam generator into the air compartment.*

* * * * *